(12) United States Patent
Bollman

(10) Patent No.: US 10,781,841 B1
(45) Date of Patent: Sep. 22, 2020

(54) THREE-DIMENSIONAL POSITIONING AND HOLDING MODULE SYSTEM FOR MODULAR WORKSTATIONS

(71) Applicant: Clifford Bollman, Vancouver, WA (US)

(72) Inventor: Clifford Bollman, Vancouver, WA (US)

( * ) Notice: Subject to any disclaimer, the term of this patent is extended or adjusted under 35 U.S.C. 154(b) by 0 days.

(21) Appl. No.: 16/404,614

(22) Filed: May 6, 2019

Related U.S. Application Data

(63) Continuation-in-part of application No. 15/823,302, filed on Nov. 27, 2017, now Pat. No. 10,280,961, which is a continuation-in-part of application No. 15/466,609, filed on Mar. 22, 2017, now Pat. No. 9,829,025, which is a continuation of application No. 15/080,506, filed on Mar. 24, 2016, now Pat. No. 9,637,921.

(60) Provisional application No. 62/590,983, filed on Nov. 27, 2017.

(51) Int. Cl.
| | |
|---|---|
| *F16M 13/00* | (2006.01) |
| *F16B 12/44* | (2006.01) |
| *A47B 13/02* | (2006.01) |
| *E04C 3/04* | (2006.01) |
| *E04C 3/29* | (2006.01) |
| *A47B 21/04* | (2006.01) |
| *F16B 7/18* | (2006.01) |

(52) U.S. Cl.
CPC .............. *F16B 12/44* (2013.01); *A47B 13/02* (2013.01); *A47B 21/04* (2013.01); *E04C 3/04* (2013.01); *E04C 3/29* (2013.01); *A47B 2200/0016* (2013.01); *E04C 2003/0413* (2013.01); *E04C 2003/0421* (2013.01); *E04C 2003/0439* (2013.01); *E04C 2003/0465* (2013.01); *F16B 7/187* (2013.01)

(58) Field of Classification Search
CPC ........ A47B 57/565; E04H 15/44; E04D 13/15
See application file for complete search history.

(56) References Cited

U.S. PATENT DOCUMENTS

| | | | | |
|---|---|---|---|---|
| 3,250,584 A | * | 5/1966 | Tassell ................. | A47B 57/565 312/247 |
| 3,308,596 A | * | 3/1967 | Cooper ................... | E04D 13/15 52/630 |
| 2009/0314323 A1 | * | 12/2009 | Park ....................... | E04H 15/44 135/145 |

* cited by examiner

*Primary Examiner* — Amy J. Sterling
(74) *Attorney, Agent, or Firm* — Rylander & Associates, PC; Philip R. M. Hunt

(57) ABSTRACT

A Three-Dimensional Positioning and Holding Modular System for office and industrial work stations including embodiments of multi-rail beams and rail-arm-leg modules. The embodiments have tubes, bars, or channels arranged and connected in ways that provide improved ability to transmit torque along a long axis of the multi-rail beam while providing improved resistance to twisting under the forces of the torque.

3 Claims, 53 Drawing Sheets

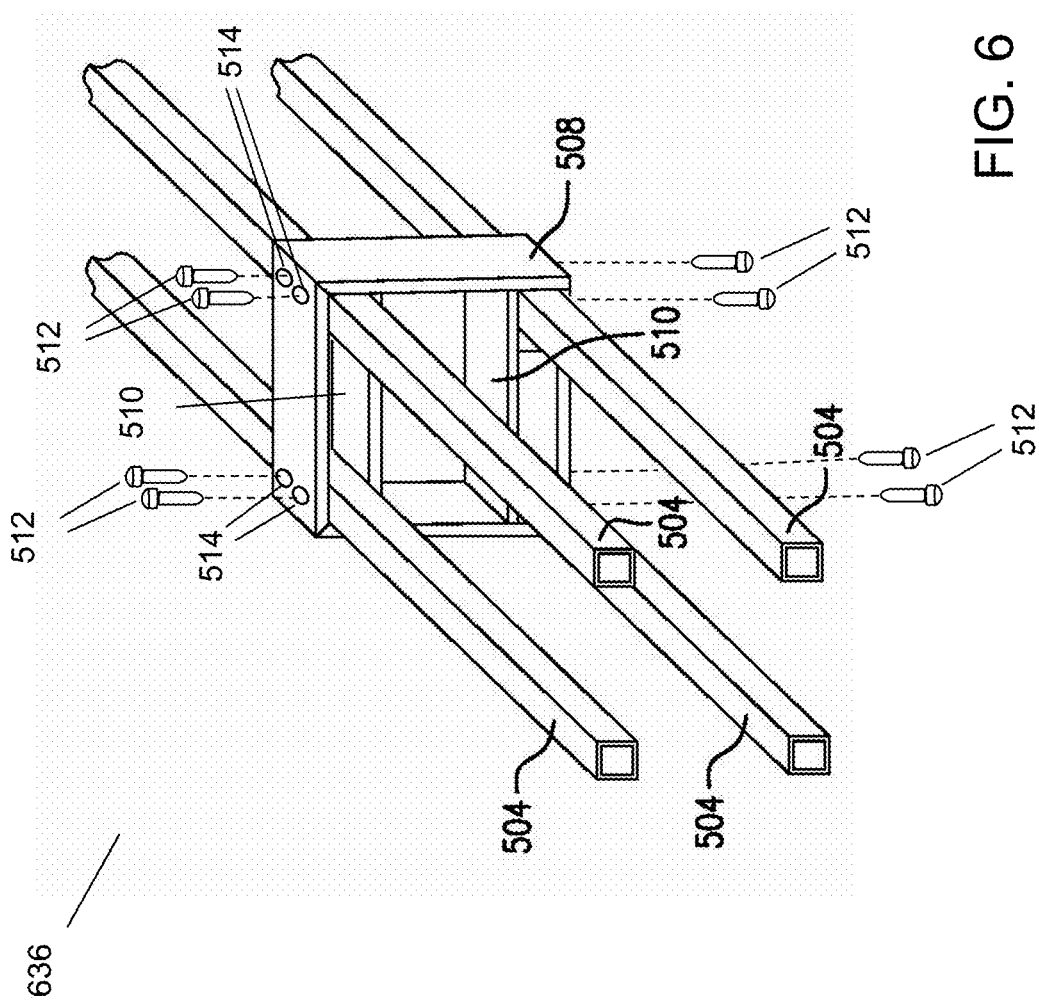

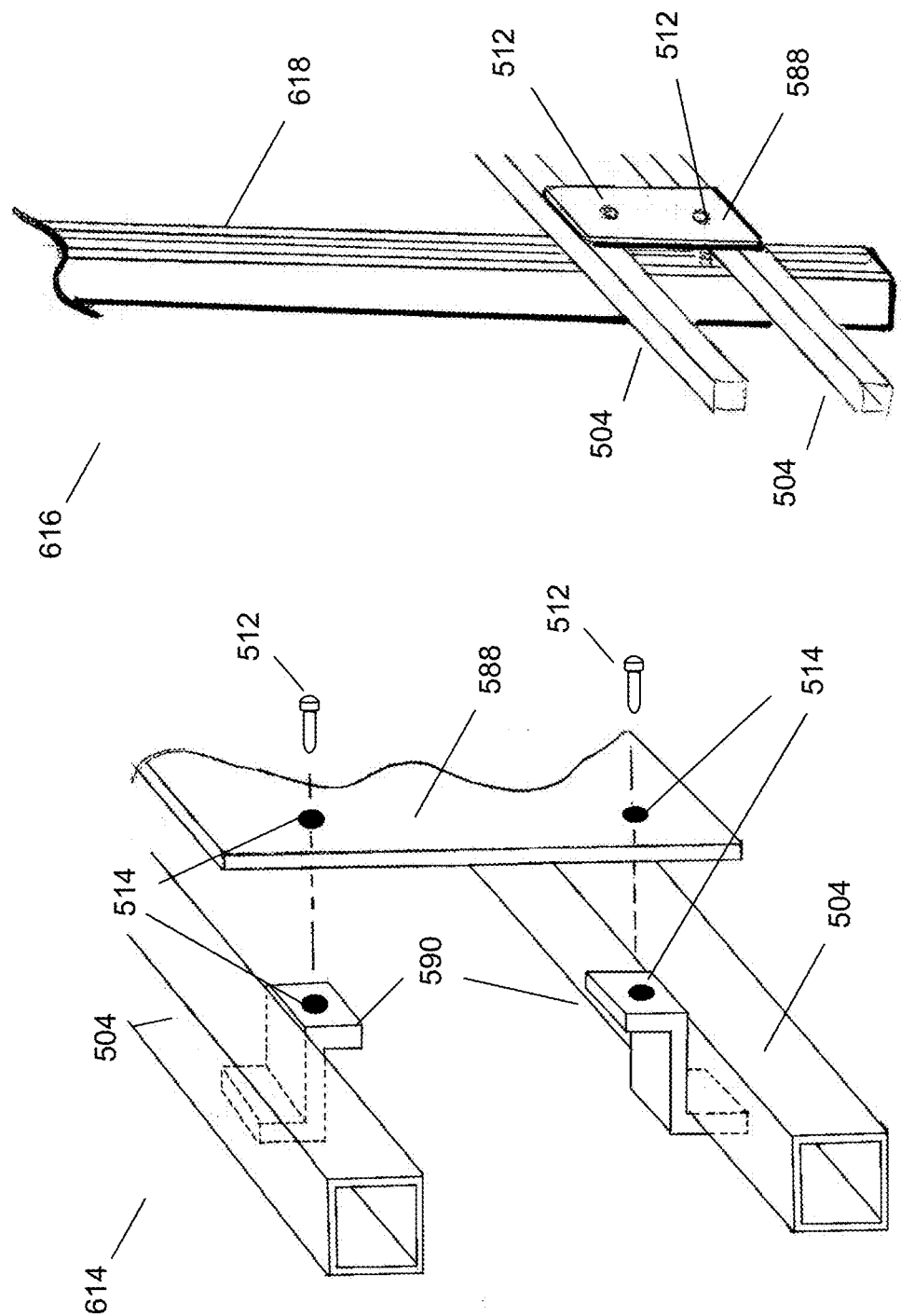

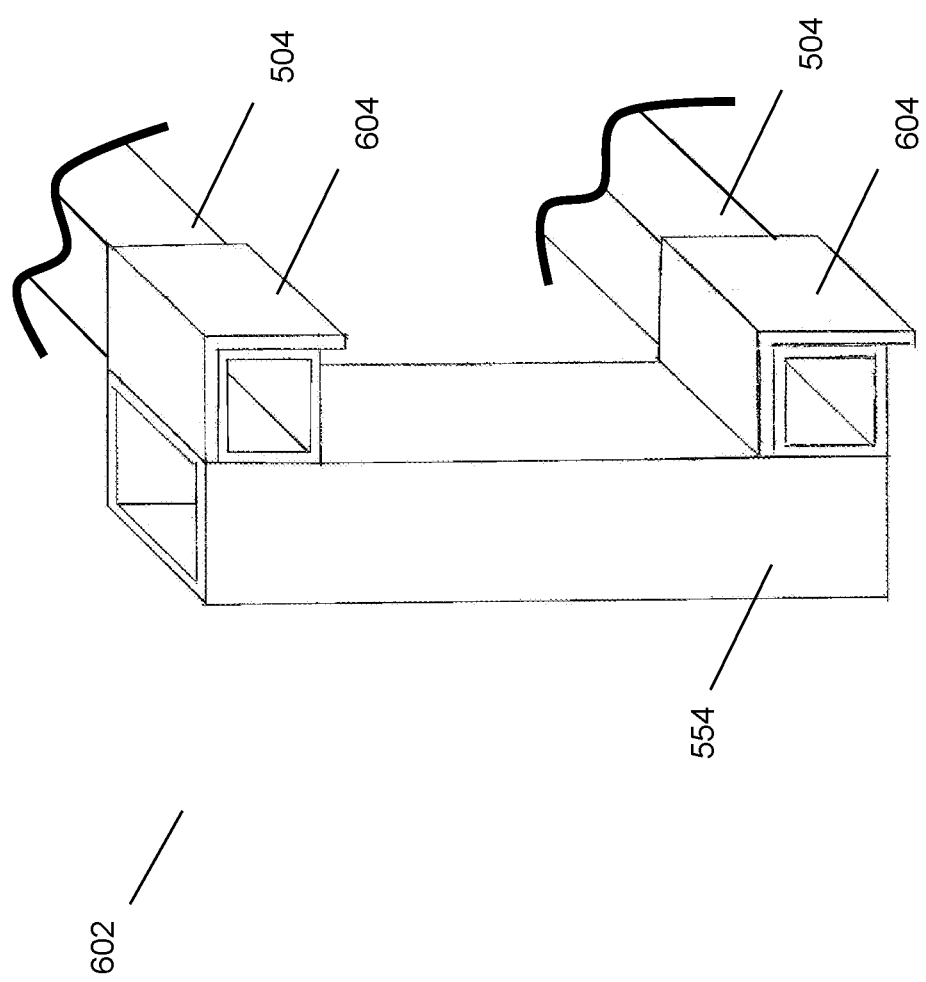

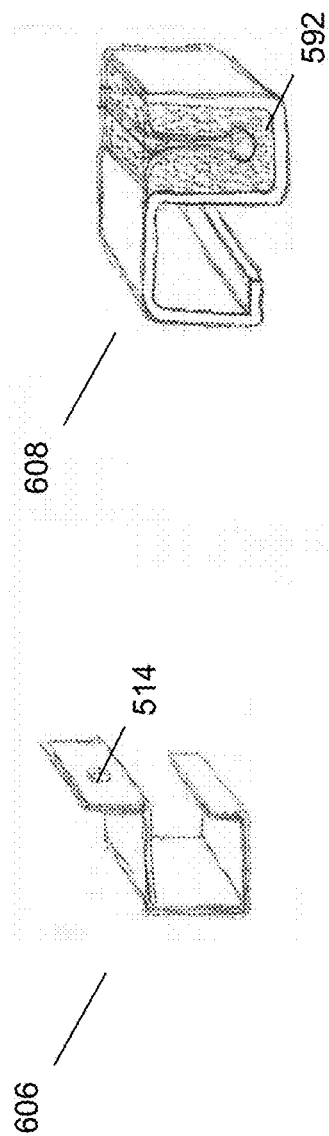
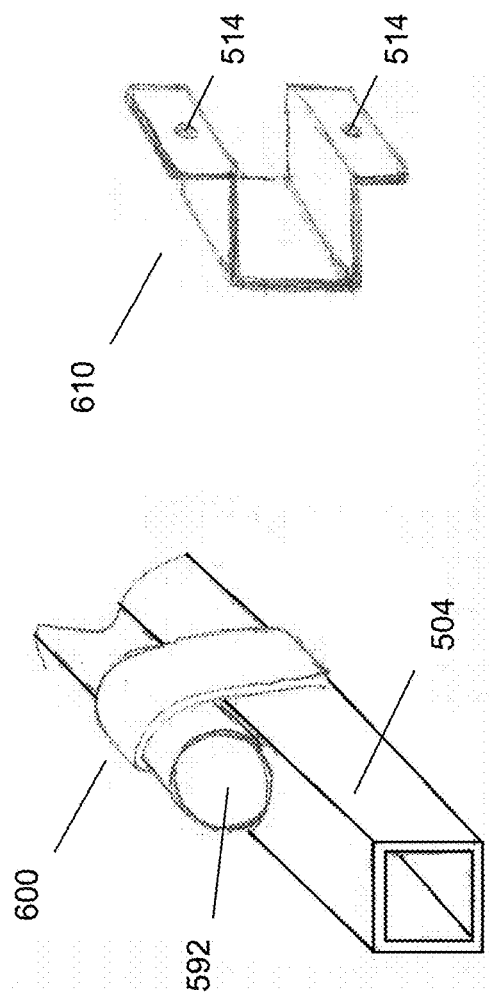

THREE-DIMENSIONAL POSITIONING AND HOLDING MODULE SYSTEM FOR MODULAR WORKSTATIONS

CROSS-REFERENCE TO RELATED APPLICATION

The present application is a continuation-in-part application of application Ser. No. 15/823,302, filed 2017 Dec. 8, which is a continuation-in-part application of application Ser. No. 15/466,609, filed 2017 Mar. 22, now U.S. Pat. No. 9,829,025, issued 2017 Nov. 28, which is a continuation of application Ser. No. 15/080,506, filed 2016 Mar. 24, now U.S. Pat. No. 9,637,921, issued 2017 May 2, all incorporated herein by reference. This application also claims the benefit of U.S. Provisional Application No. 62/590,983, filed 2017 Nov. 27, incorporated herein by reference.

TECHNICAL FIELD

The present invention relates to modular assembly systems. More particularly, the present invention relates to modular assembly systems for office and industrial work stations.

BACKGROUND

Modular building assembly systems have long been available to for the construction and erection of various structures such as office cubicles, industrial work stations, and scaffolding. Such modular building assembly systems usually have some type of standard beam that can be joined to other beams and to which various accessories can be attached. Solid bars, of circular or regular polygonal shape (such as square or hexagonal) may be used but are inferior to tubes of the same shape because tubes have a better resistance to torsion for the same mass of material than do solid bars. Circular or regular polygons lack an easy point of attachment for accessories and other beams, so more complex shapes are preferred. One such complex shaped beam is a cruciform beam (see U.S. Pat. No. 5,481,842 to Gautreau, FIG. 1). The cruciform beam comprises a center tube surrounded by four angle bars arranged in a square pattern in cross-section and each joined to the center tube with a web or fin, the fins forming a cross when the beam is viewed in cross-section. Accessories can be attached along the cruciform beam by clamping the accessory to one of the angle bars or in a longitudinal groove defined by the spaces between the fins and angle bars. The cruciform beam is relatively strong in resisting buckling when torsion is applied to the beam around an axis orthogonal to the long axis of the cruciform beam because in cross-section, a substantial amount of the beam material is distant from the center longitudinal axis. Such torsion occurs when the cruciform beam spans a space and a load is attached to the beam somewhere in the middle. However, the cruciform beam is not relatively strong when torsion is applied around the long axis of the cruciform beam. Such torsion occurs when a load is cantilevered from the side of the cruciform beam. Since a cruciform beam for a given size and weight does not have good resistance to torsion around its long axis, accessories are usually not cantilevered from the side of the cruciform beam.

What is needed is a modular building system with a beam that has strong resistance to torsion around its long axis.

BRIEF DESCRIPTION OF THE DRAWINGS

The accompanying drawings, which are incorporated into and constitute a part of this specification, illustrate one or more embodiments of the inventive subject matter and, together with the detailed description, serve to explain the principles and implementations thereof. Like reference numbers and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

FIG. 6 shows a perspective view of a collar splice.

FIG. 18 shows an S clip mounting.

FIG. 19 shows a channel-to-rail mounting.

FIG. 20 shows a single drop-on rail clip bracket.

FIG. 21A shows a perspective view of a single rail single fastener clip.

FIG. 21B show a perspective view of a single rail double fastener clip.

FIG. 22A shows a perspective view of a single rail wire holding clip.

FIG. 22B which shows a perspective view of a Velcro strip holding a service cable to a rail.

DETAILED DESCRIPTION

In describing the one or more representative embodiments of the inventive subject matter, use of directional terms such as "upper," "lower," "above," "below", "in front of" "behind," etc., unless otherwise stated, are intended to describe the positions and/or orientations of various components relative to one another as shown in the various Figures and are not intended to impose limitations on any position and/or orientation of any component relative to any reference point external to the Figures.

In the interest of clarity, not all of the routine features of representative embodiments of the inventive subject matter described herein are shown and described. It will, of course, be appreciated that in the development of any such actual implementation, numerous implementation-specific decisions must be made in order to achieve specific goals, such as compliance with application and business-related constraints, and that these specific goals will vary from one implementation to another and from one developer to another. Those skilled in the art will recognize that numerous modifications and changes may be made to the representative embodiment(s) without departing from the scope of the claims. It will, of course, be understood that modifications of the representative embodiments will be apparent to those skilled in the art, some being apparent only after study, others being matters of routine mechanical, chemical and electronic design. No single feature, function or property of the representative embodiments is essential. In addition to the embodiments described, other embodiments of the inventive subject matter are possible, their specific designs depending upon the particular application. As such, the scope of the inventive subject matter should not be limited by the particular embodiments herein described but should be defined only by the appended claims and equivalents thereof.

Three-Dimensional Positioning and Holding Modular System

The Three-Dimensional Positioning and Holding Modular System is a flexible system for building ergonomic working stations that maximizes three-dimensional utilization of a workspace. The Three-Dimensional Positioning and Holding Modular System comprises substructure modules and positioning holders. The substructure modules provide the foundation on which the positioning holders may be mounted. The positioning holders hold physical components needed for the work of the work station, such as table tops or other work surfaces, lighting fixtures, computer monitors, cable management, and storage bins.

Rails

Figure 50B:
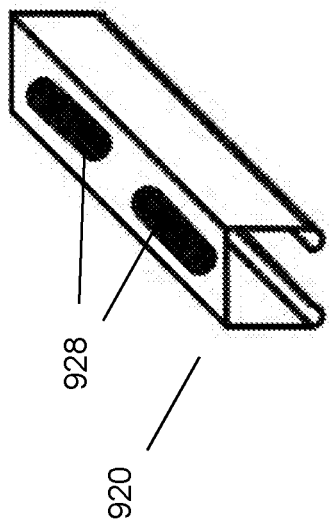
FIG. 50B shows a slotted strut channel rail.
Figure 50D:
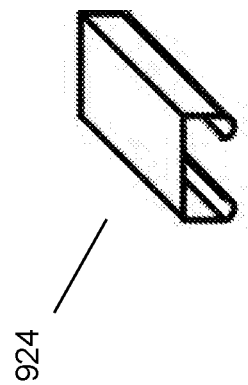
FIG. 50D shows a half-height strut channel rail.
Figure 50A:
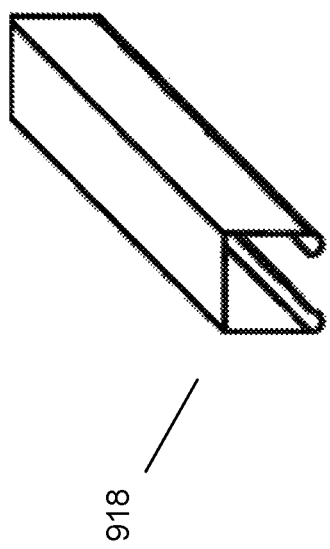
FIG. 50A shows a strut channel rail.
Figure 50C:
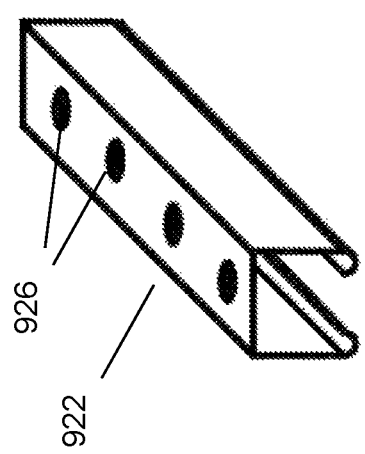
FIG. 50C shows a perforated strut channel rail.

Rails are the primary horizontal strength members in the Three-Dimensional Positioning and Holding Modular System. A rail is a tube, typically rectangular or square in cross section (see e.g. rail 504 in FIG. 1). In alternative embodiments, a rail may have a different cross-section, such as circular. Square tube rails are typically 1¼ inch square cross-section, 14-gauge tube thickness, but may have other suitable dimensions. Length of rails are typically 30 to 120 inches. In some alternative embodiments, a rail is a channel bar, rectangular or square in cross-section. In yet other alternative embodiments, the rail is a strut channel, rectangular or square in cross-section, with inwards-curving lips to facilitate mounting of components (see e.g. strut channel rail 918 in FIG. 50A). Strut channel rails typically have a 1⅝ by 1⅝ inch square cross section but may have other suitable dimensions. In some embodiments, the strut channel rails have reinforcing bars across the open front of the channel at intervals along the length of the rail. In some embodiments, a rail may have fastener holes spaced at intervals along the rail to facilitate coupling to other rails, to position holders, slices, etc. (See e.g. rail 504 with fastener holes 514 in FIG. 3 and FIG. 4 and perforated strut channel rail 922 with fastener holes 926 in FIG. 50C). The fastener holes typically penetrate through the rail orthogonal to the long axis of the rail. The fastener holes are typically circular but may be elongated slots in some embodiments (see e.g. slotted strut channel rail 920 with slots 928 in FIG. 50B). Perforated rails typically have fastener holes at 2-inch intervals. The fastener holes in the rails are typically unthreaded, but some may be threaded. A rail is typically made of metal, such as steel, but may be made of other suitable materials. In some embodiments, the rails may have end plates with fastener holes that may be threaded.

Quad-Rail Beam Module

Figure 1:
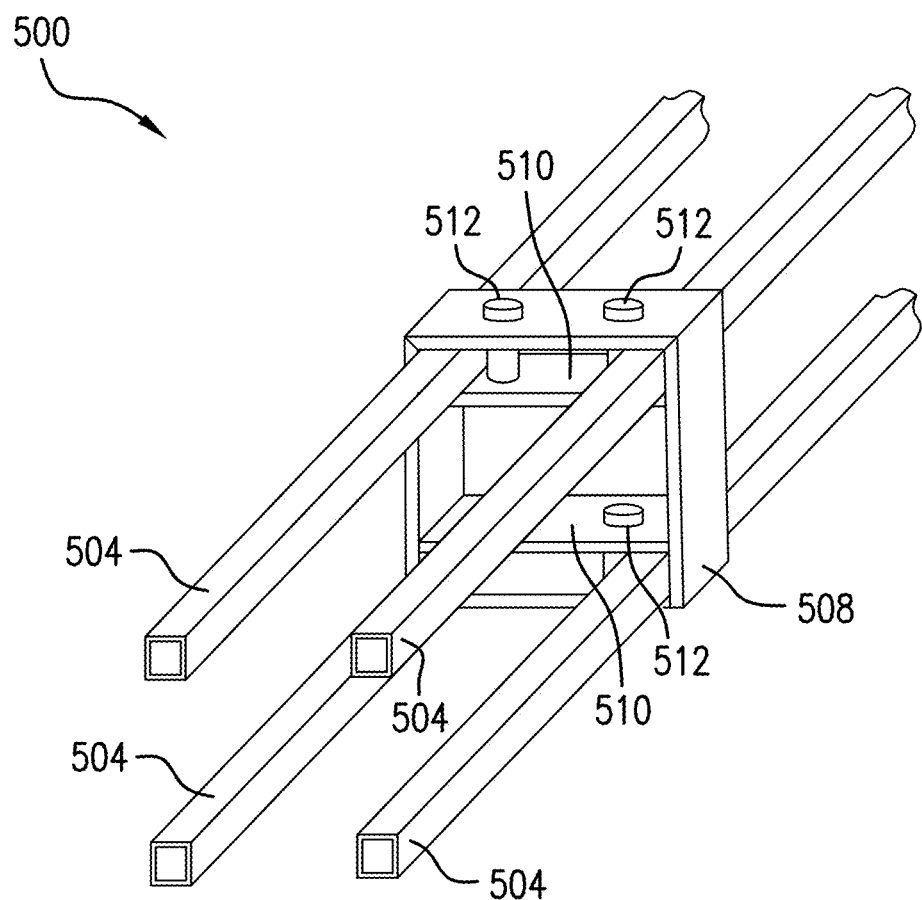
FIG. 1 shows a first representative embodiment of a quad-rail beam.

One substructure module for use with the Three-Dimensional Positioning and Holding Modular System is a quad-rail beam 500. FIG. 1 shows a representative embodiment of a quad-rail beam 500. The quad-rail beam 500 comprises four rails 504 coupled by at least one peripheral binding structure such as the rail support bracket 508, clamp plate 510 and fasteners 512 shown in FIG. 1, which are configured to hold each of four rails 504 in a rectangular pattern.

The rail support bracket 508 is typically a rectangular tube, typically square in cross section, but in alternative embodiments, may have a different cross-section. The rail support bracket 508 has a bracket interior that conforms to the rectangular pattern. The rail support bracket 508 is typically used with at least one, or more typically, two clamp plates 510. Each clamp plate 510 and one or more sides of the rail support bracket 508 each have at least one, or more typically, two fastener holes 514. The fastener holes 514 are typically unthreaded, but in some embodiments may be threaded. Each clamp plate 510 is used to secure one, or more typically, two rails 504 to the rail support bracket 508. Each clamp plate 510 is secured to the rail support bracket 508 with at least one fastener 512, but two are typically used. Each fastener 512 passes through one of the fastener holes 514 in the rail support bracket 508 and a matching fastener hole 514 in the clamp plate 510. Each fastener 512 and associated fastener holes 514 are positioned to hold an adjacent rail 504 between the fastener 512 and an adjacent side of the rail support bracket 508 with at least a sliding fit. However, the rails 504 are primarily held in place by friction induced by tension in the fasteners 512 drawing the clamp plate 510 and the rail support bracket 508 together. Therefore, in some embodiments, the fasteners 512 may not necessarily be adjacent and in sliding contact with the rails 504.

The first exemplary embodiment quad-rail beam 500 is configured so that between any two of the four of rails 504 of the quad-rail beam 500 there is a gap (beam gap) that is at least as large as a largest cross-sectional dimension of one of the four rails. This is to ensure that the rails 504 are far enough apart to give the first exemplary embodiment quad-rail beam 500 good resistance to torsional twisting.

The quad-rail beam 500 has a cavity therein defined as an area between the inside corners of the four rails 504 and running a length of the four rails 504. The cavity contains no load bearing structure connecting the rails that runs for more than a total of a half of the length of the rails. This arrangement makes efficient use of mass since structure in the cavity will have little resistance to torque induced twist.

Typically, each rail 504 has dimensions of 1 inch per side in cross-section, 14-gauge thickness and 40 inches long. The rail support bracket 508 has typical dimensions of 6 inches per side in the interior of the bracket. These dimensions provide 4 inch gaps between the rails 504, which provides good resistance to twist induced by torque, and which also provides a convenient sized gap into which a typical worker can reach into and attach, detach or adjust accessory brackets and other attachments. However, in alternative embodiments, other dimensions of rails 504 and rail support brackets 508 may be used.

The quad-rail beam 500 has a structure that for its weight is highly resistant to twist induced by torque about its long axis (parallel to the rails 504). For example, a torque is applied to the first representative embodiment quad-rail beam 500, when a force is applied to one or more of the rails 504 in a direction that is orthogonal to the long axis of the quad-rail beam 500 but does not pass through the long axis. The torque is transmitted along the rail 504 to the nearest rail support brackets 508. The rail support brackets 508 transfer the torque to the other rails 504. All the rails 504 and the rail support brackets 508 play a role in resisting the twist induced by the torque. Resistance to torque is proportional to the mass of an object times the distance of the mass from the torque axis. Most of the mass in the quad-rail beam 500 is fairly distant from its long axis, so for its mass, it offers a high degree of resistance to being twisted by torque. Resistance to twist from torque can be increased by adding additional rail support brackets 508 to the quad-rail beam 500 and/or decreasing the distance between them. Since each rail 504 is itself a tube, it also offers a high degree of resistance to twisting from torque induced by forces applied to the rail 504 in a direction that does not pass through the long axis of the rail 504.

Open Quad Rail-Arm-Leg (RAL) Module

Figure 2A:
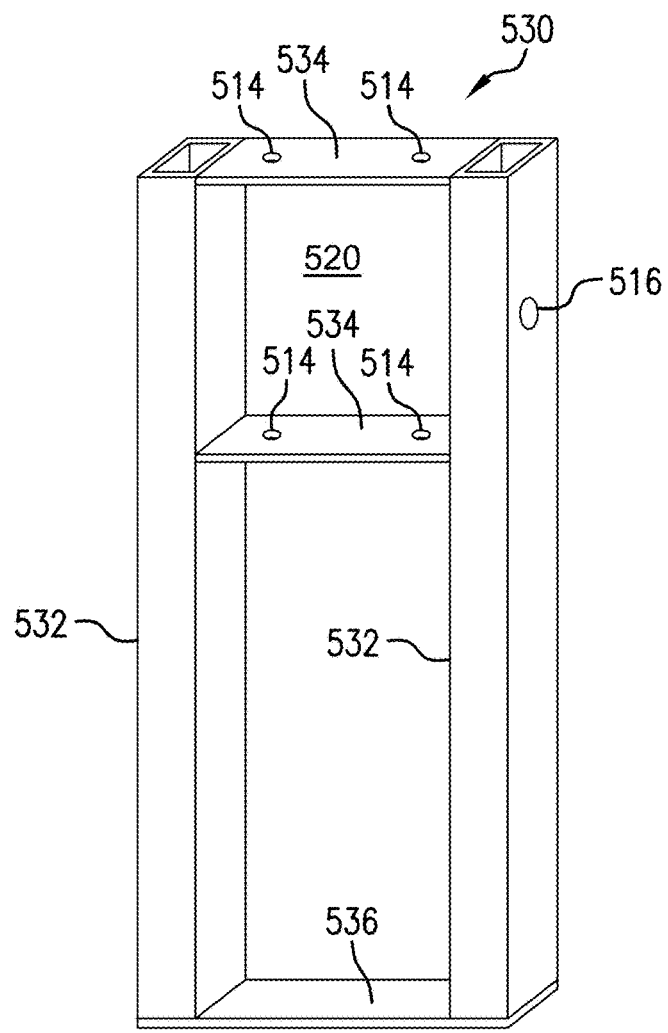
FIGS. 2A and 2B show a first embodiment of a rail-arm-leg (RAL) module.
Figure 2B:
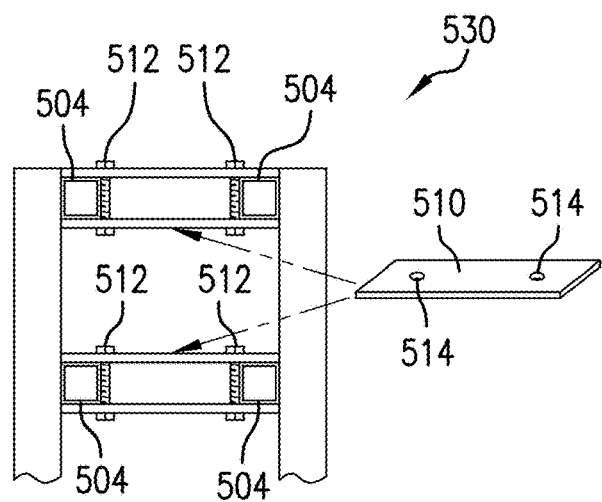

Another substructure for use with the Three-Dimensional Positioning and Holding Modular System is an open quad rail-arm-leg (RAL) module 530. FIGS. 2A and 2B show a representative embodiment of an open quad rail-arm-leg module 530. The open quad rail-arm-leg module 530 is named for what it is configured to have attached to it—rails, arms and legs. The open quad rail-arm-leg module 530 is part of a peripheral binding structure that also includes two clamp plates 510 and a plurality of fasteners 512 and is configured to hold each of four rails 504 in a rectangular pattern. The open quad rail-arm-leg module 530 comprises two columns 532 coupled by two cross plates 534 and a bottom plate 536. The columns 532 are typically orthogonal from the cross plates 534 and the bottom plate 536, with the two columns 532 arranged vertically in parallel and the two cross plates 534 and bottom plate 536 arranged horizontally in parallel. The columns 532 and the cross plates 534 define a module interior 520 that is open with a perimeter conforming to the rectangular pattern. The columns 532, the cross plates 534, and the bottom plate 536 are typically made of metal, such as steel, and coupled by welding, but may be made of other suitable materials and joined by other methods.

The columns 532 are hollow tubes with open top and bottom ends. In some embodiments, the bottom ends of the column 532 are closed off. Each column 532 has one or more threaded hole 516, typically in the outside of the column 532. The threaded hole 516 allows for insertion of a set screw to secure accessories inserted inside the column 532. Each column 532 is typically rectangular in cross-section and may be square. In other embodiments, other suitable cross-sections, such as circular, may be used.

The open quad rail-arm-leg module 530 is typically used with at least one, or more typically, two clamp plates 510. Each clamp plate 510 is typically the same size and shape as the cross plates 534. The clamp plates 510 and the cross plates 534 have at least one, or more typically, two fastener holes 514. The fastener holes 514 are typically unthreaded, but in some embodiments, may be threaded. Each clamp plate 510 is used to secure one, or more typically, two rails 504 to the open quad rail-arm-leg module 530. Each clamp plate 510 is secured to one of the cross plates 534 with at least one fastener 512, but two are typically used. Each fastener 512 passes through one of the fastener holes 514 in the cross plate 534 and a matching fastener hole 514 in the clamp plate 510. Each fastener 512 and associated fastener holes 514 are positioned to hold an adjacent rail 504 between the fastener 512 and an adjacent column 532 with at least a sliding fit. However, the rails 504 are primarily held in place by friction induced by tension in the fasteners 512 drawing the clamp plate 510 and the rail support bracket 508 together. Therefore, in some embodiments, the fasteners 512 may not necessarily be adjacent and in sliding contact with the rails 504.

The typical dimensions for the open quad rail-arm-leg module 530 are 20 inches high and 8½ inches wide across the front. The interior space of the open quad rail-arm-leg module 530 is typically 6 inches wide between the columns 532, 6 inches between the two cross plates 534, and 1½ inches deep. These dimensions are convenient for building industrial workstations, but other dimensions may be used. The cross plate 534 nearest the top of the open quad rail-arm-leg module 530 is typically flush with the top of the columns 532, but in some embodiments, may be positioned lower.

Rail Splices

Rail splices are used to couple two or more rails. At least three different rail splices may be used in the Three-Dimensional Positioning and Holding Modular System—an in-line splice 624, a perpendicular rail splice 628, and a clip splice 634.

Figure 3:
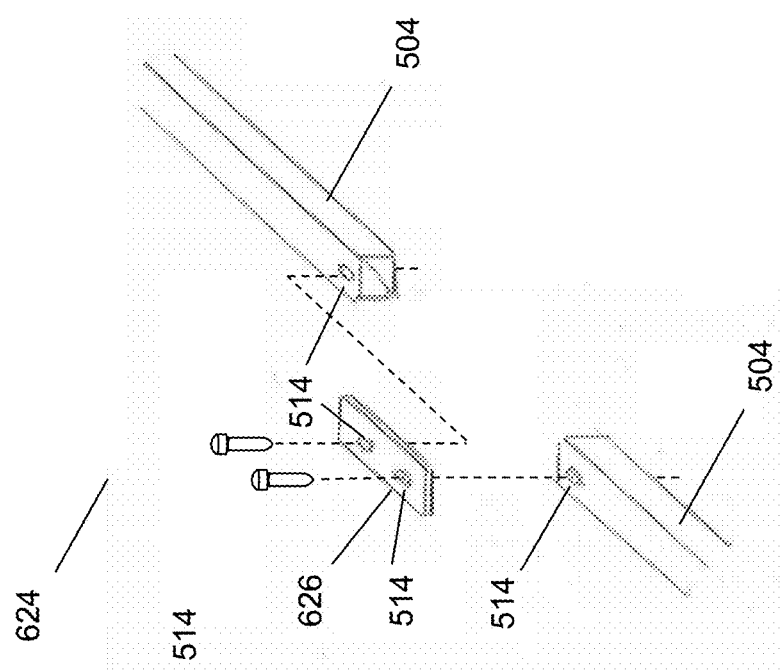
FIG. 3 shows an exploded perspective view of an in-line splice.

FIG. 3 shows an exploded perspective view of an in-line splice 624 connecting two rails 504 that are in-line which each other and abut each other. The in-line rail splice 624 comprises two fasteners 512 and a nut plate 626 with a first fastener hole 514 and a second fastener hole 514. When coupling the two rails 504, the first fastener hole 514 is configured to line up with a fastener hole 514 in one rail 504 through which one of the fasteners 512 is passed. The second fastener hole 514 is configured to line up with a fastener hole 514 in the other rail 504 through which the other fastener 512 is passed. The fastener 512 may be a rivet, a threaded cap screw and nut or other appropriate type of fastener. The fastener holes 514 are typically unthreaded but may be threaded. In some embodiments, each in-line rail splice 624 has two nut plates 626, one above the rails 504 and the other below.

Figure 4:
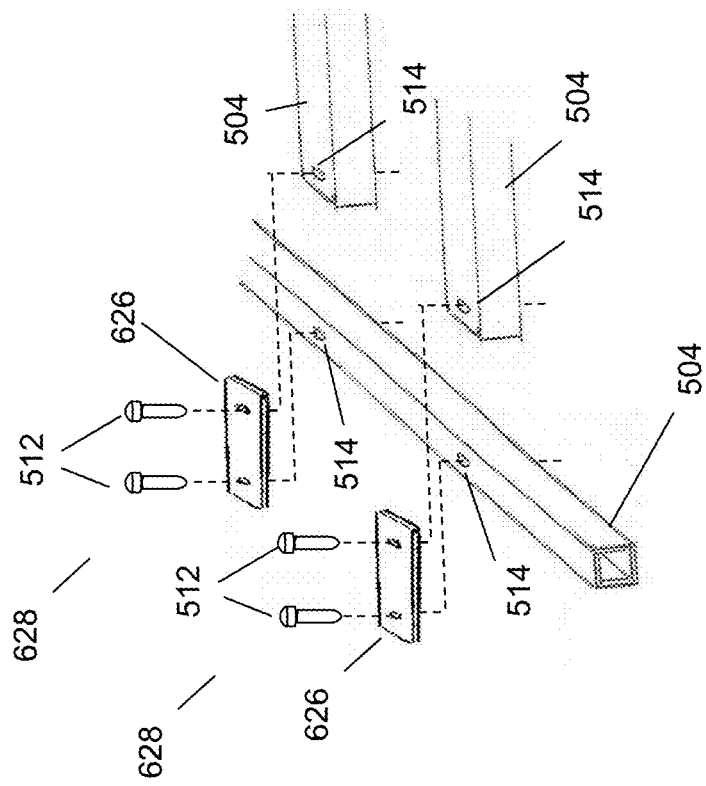
FIG. 4 shows an exploded perspective view of two perpendicular rail splices.

FIG. 4 shows an exploded perspective view of two perpendicular rail splices 628 connecting a single rail 504 to a pair of parallel rails 504 that are parallel to each other and perpendicular to the single rail 504. Each perpendicular rail splice 628 comprises two fasteners 512 and a nut plate 626 with a first fastener hole 514 and a second fastener hole 514. When coupling the single rail 504 to the set of parallel rails, the first fastener hole 514 is configured to line up with a fastener hole 514 in the single rail 504 through which one of the fasteners 512 is passed. The second fastener hole 514 is configured to line up with a fastener hole 514 in one of the rails 504 in the parallel set of rails 504 through which the other fastener 512 is passed. The fastener 512 may be a rivet, a threaded cap screw and nut or other appropriate type of fastener. The fastener holes 514 are typically unthreaded but may be threaded. In some embodiments, each perpendicular rail splice 628 has two nut plates 626, one above the rails 504 and the other below.

Figure 5:
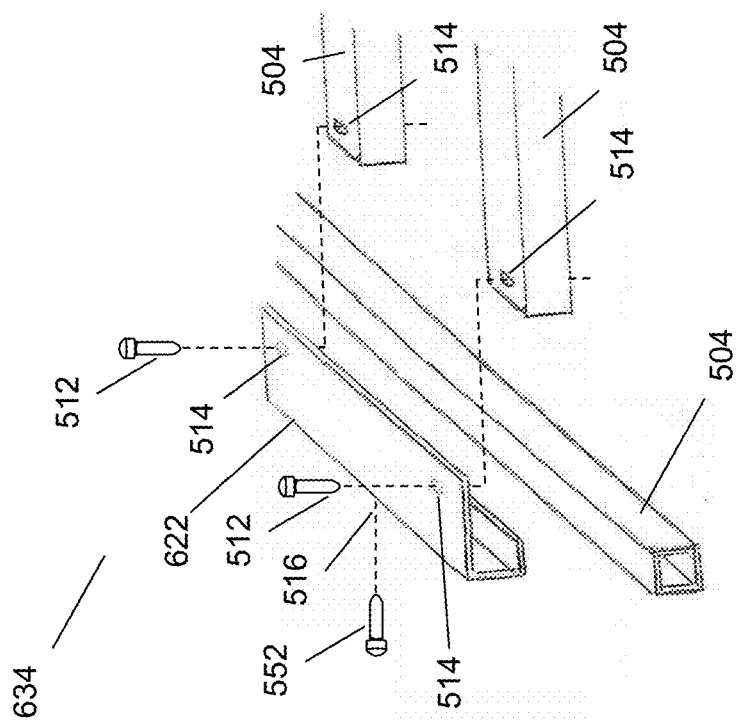
FIG. 5 shows an exploded perspective view of a clip splice.

FIG. 5 shows an exploded perspective view of a clip splice 634. The clip splice 634 connects a single rail 504 to a set of parallel rails 504 that are parallel to each other and perpendicular to the single rail 504. The clip splice 634 comprises a double-rail-to-single-rail clip 622 having a cross-sectional with three sides of a rectangle that allows the single rail 504 to nest therein with a sliding fit. The parallel rails 504 have fastener holes 514 near the ends closest to the double-rail-to-single-rail clip 622, which has two fastener holes 514 in a lip that overhangs the single bar 504 when the single rail 504 is nested within the double-rail-to-single-rail clip 622. With the double-rail-to-single-rail clip 622 clipped on to the single rail 504, two fasteners 512, such as a threaded screws, rivets or other fastening mechanisms pass through the two fastener holes 514 of the double-rail-to-single-rail clip 622 and the parallel rails 504, securing the parallel rails 504 to the single rail 504. The double-rail-to-single-rail clip 622 allows the parallel rails 504 to slide laterally relative to the single rail 504. In some embodiments, the clip splice 634 has a threaded hole 516 with a set screw 552 inserted therein. The set screw 552 can be tightened to engage the rail 504, holding the clip splice 634 in place on the single rail 504, or loosened to disengage from the single rail 504, allowing the clip splice 634 to slide along the single rail 504.

FIG. 6 shows a perspective view of a collar splice 636. The collar splice 636 is used to connect a first set of four rails 504 to a second set of four rails 504. The collar splice 636 is similar to the rail support bracket 508, but the fasteners 512 are in different places and the collar splice 636 has additional fasteners 512. Positioned near each corner of the collar splice 636 are two fastener holes 514. Fasteners 512 of the collar splice 636 pass through fastener holes 514 in the rail support bracket 508 and through fastener holes (not shown) in the ends of the first and second set of rails 504 and through a clamp plate 510. The fastener 512 may be a rivet, a threaded cap screw and nut or other appropriate type of fastener. The fastener holes 514 are typically unthreaded but may be threaded.

First Embodiment Workstation Module (H Module)

Figure 7A:
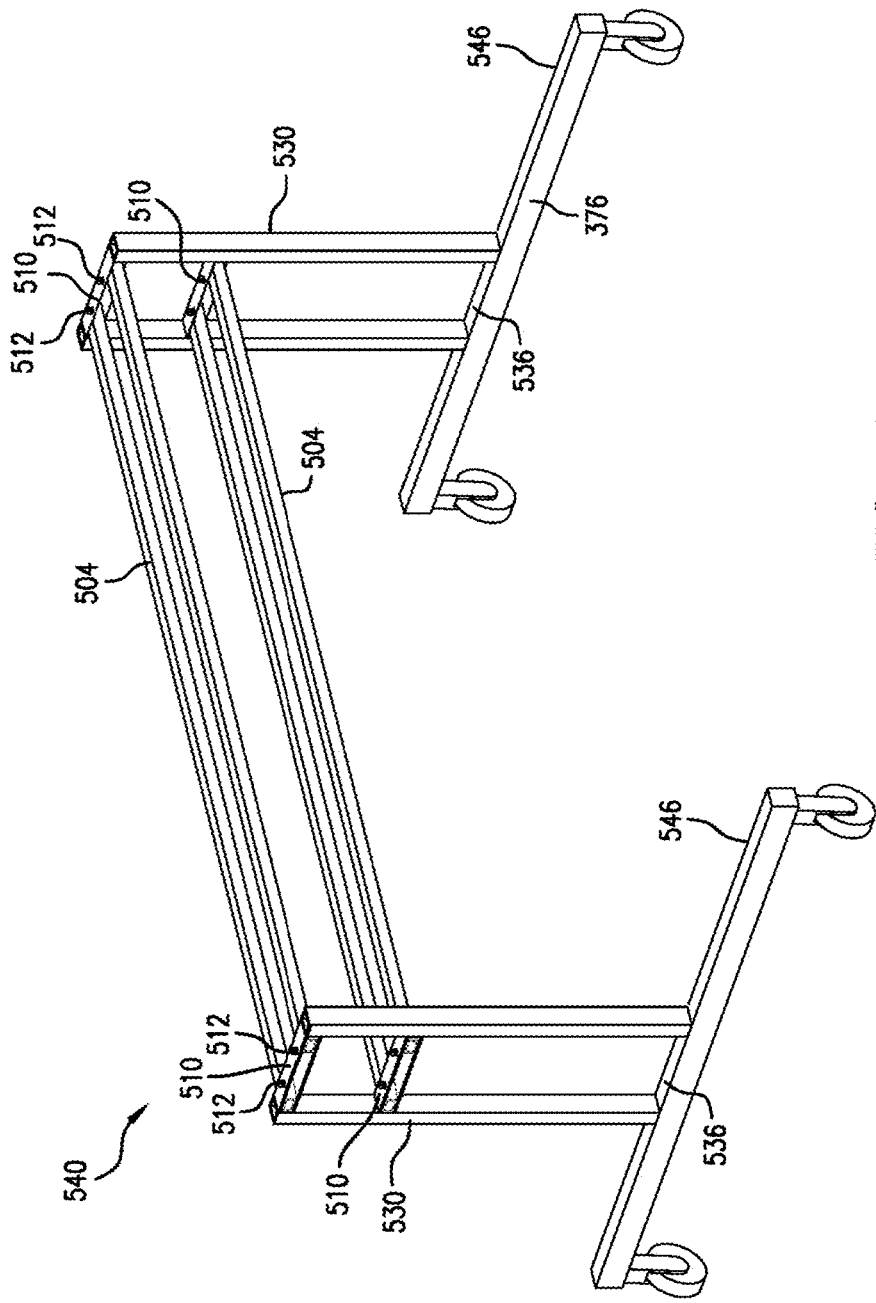
FIGS. 7A and 7B show a first embodiment of a workstation module.
Figure 7B:
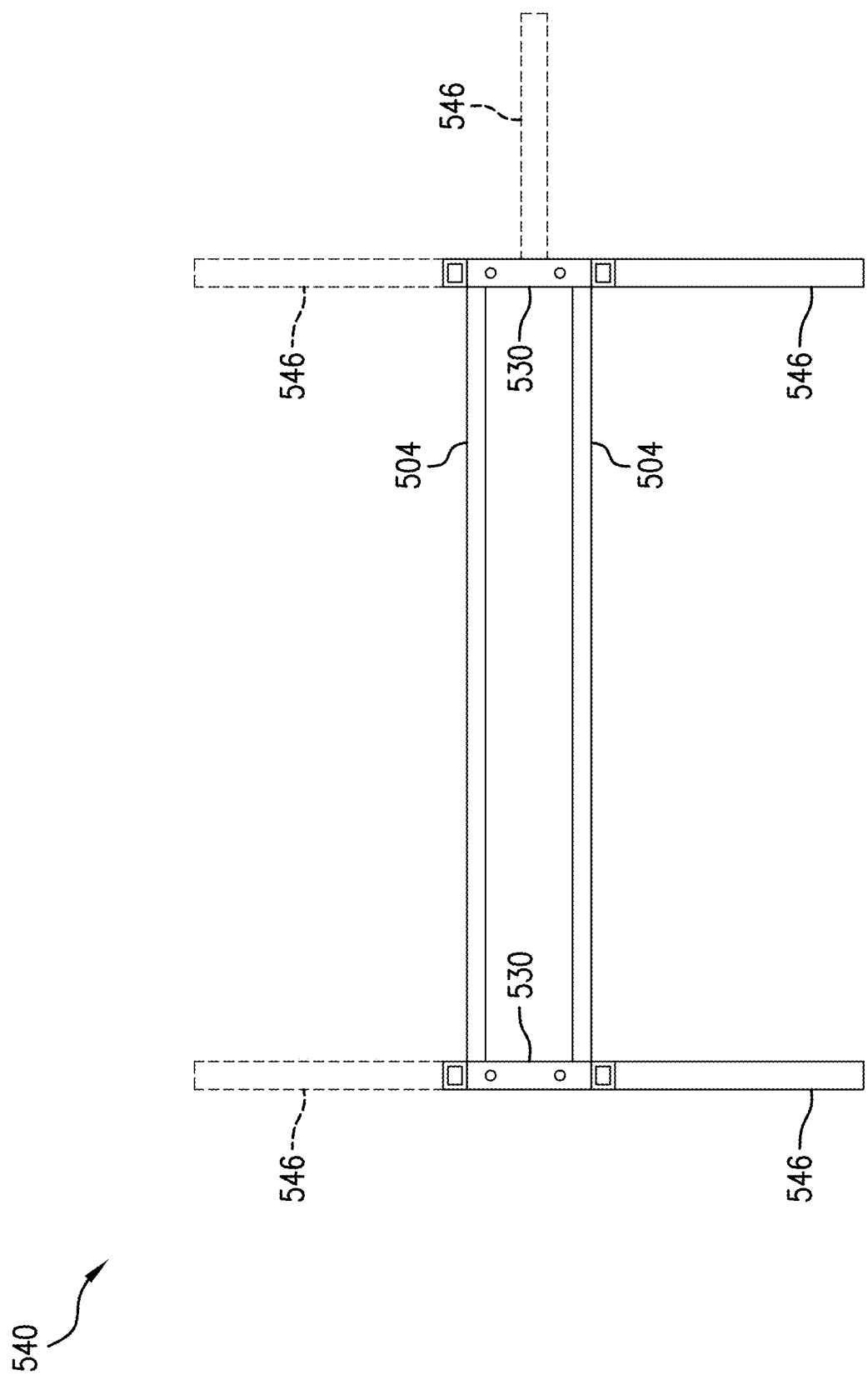

FIGS. 7A and 7B show a first embodiment of a workstation module 540, also referred herein as an H module. The H module 540 comprises two quad rail-arm-leg modules 530 and four rails 504. The rails 504 are secured to the quad rail-arm-leg modules 530 with cross plates 534 and fasteners 512 as described elsewhere herein. While the H module 540 may be freestanding without them, typically it has one or more sets of horizontal legs 546 to give it greater stability. The sets of horizontal legs 546 are coupled to the bottom of the open quad rail-arm-leg module 530. Typically, the horizontal legs 546 extend out horizontally to either side of the open quad rail-arm-leg module 530. The set of horizontal legs 546 typically has two vertical posts that are positioned and sized to slidingly insert into the bottom openings of the columns 532 of an open quad rail-arm-leg module 530, held in place by gravity, a set screw, or some other suitable mechanism. In other embodiments, the set of horizontal legs 546 is more permanently coupled to the open quad rail-arm-leg module 530 by welding, fasteners or other suitable mechanism.

The H module 540 has a cavity therein defined as an area between the inside corners of the four rails 504 and running a length of the four rails 504. The cavity contains no load bearing structure connecting the rails that runs for more than a total of a half of the length of the rails. This arrangement makes efficient use of mass since structure in the cavity will have little resistance to torque induced twist.

Second Embodiment Workstation Module (I Module)

Figure 8:
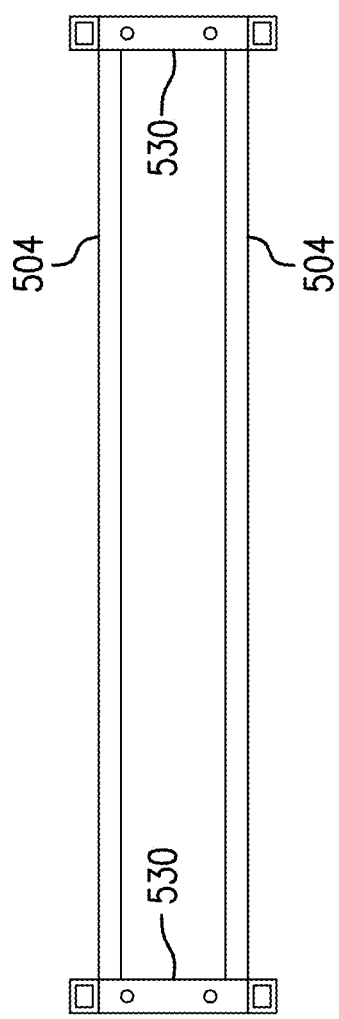
FIG. 8 shows an overhead view of a second embodiment of a workstation module (I module).

FIG. 8 shows an overhead view of a second embodiment of a workstation module 620 referred herein as an "I" module. The I module 620 comprises two quad rail-arm-leg modules 530 connected by set of four rails 504. It is similar to the H module 540, but without the horizontal legs 546. Without the horizontal leg 546, I module 540 does not have as much inherent stability but is useful in situations where stability is provided by other means, such as by attaching the quad rail-arm-leg modules 530 of the I module 620 to a floor by bolts or other attachment mechanisms.

Third Embodiment Workstation Module (L Module)

Figure 9A:
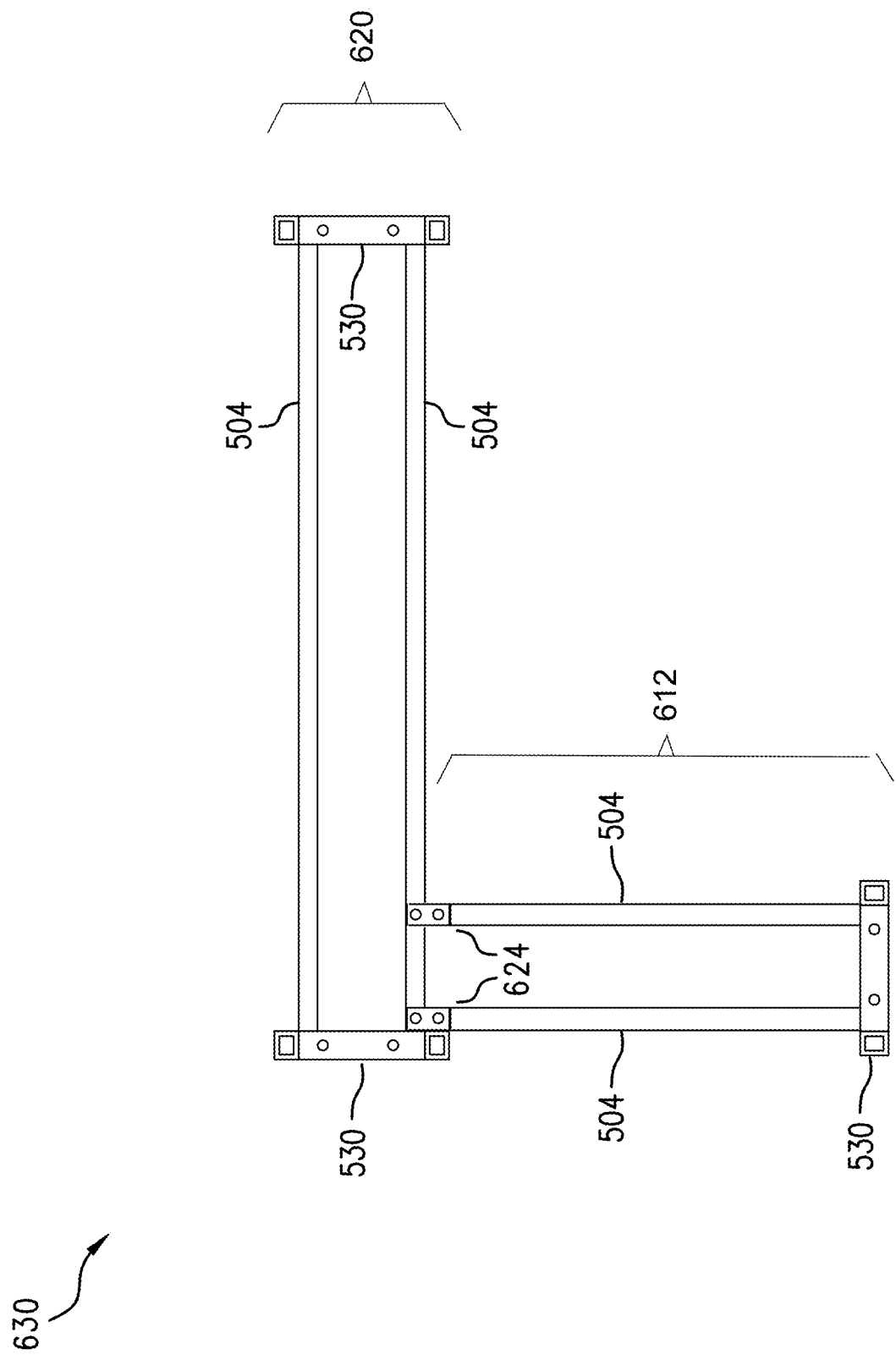
FIG. 9A shows an overhead view of a third embodiment of a workstation module (L module).

FIG. 9A shows an overhead view of a third embodiment of a workstation module 630 referred herein as an "L" module. The L module 630 comprises an I module 620 coupled with a truncated I module 612. The I module 620 portion of the L module 630 comprises two quad rail-arm-leg modules 530 connected by first set of four rails 504 The truncated I module 612 portion of the L module 630 comprises an open quad rail-arm-leg module 530 connected to a second set of rails 504 (typically four), essentially an I module 620 with one open quad rail-arm-leg module 530 removed. The rails 504 of the truncated I module 612 portion are connected to the rails 504 of the I module 620 portion by a plurality of perpendicular nut plate splices 628 such that the one of the rails 504 of the truncated I module 612 is adjacent or in contact with the one of the quad rail-arm-leg modules 530 of the I module 620 portion. Typically, two upper rails 504 of the truncated I module 612 are coupled to one of two upper rails 504 of the I module portion 620 and lower rails 504 of the truncated I module 612 are coupled to one of two lower rails 504 of the I module 620 directly below the upper rail 504 that is coupled to the truncated I module 612.

Figure 9B:
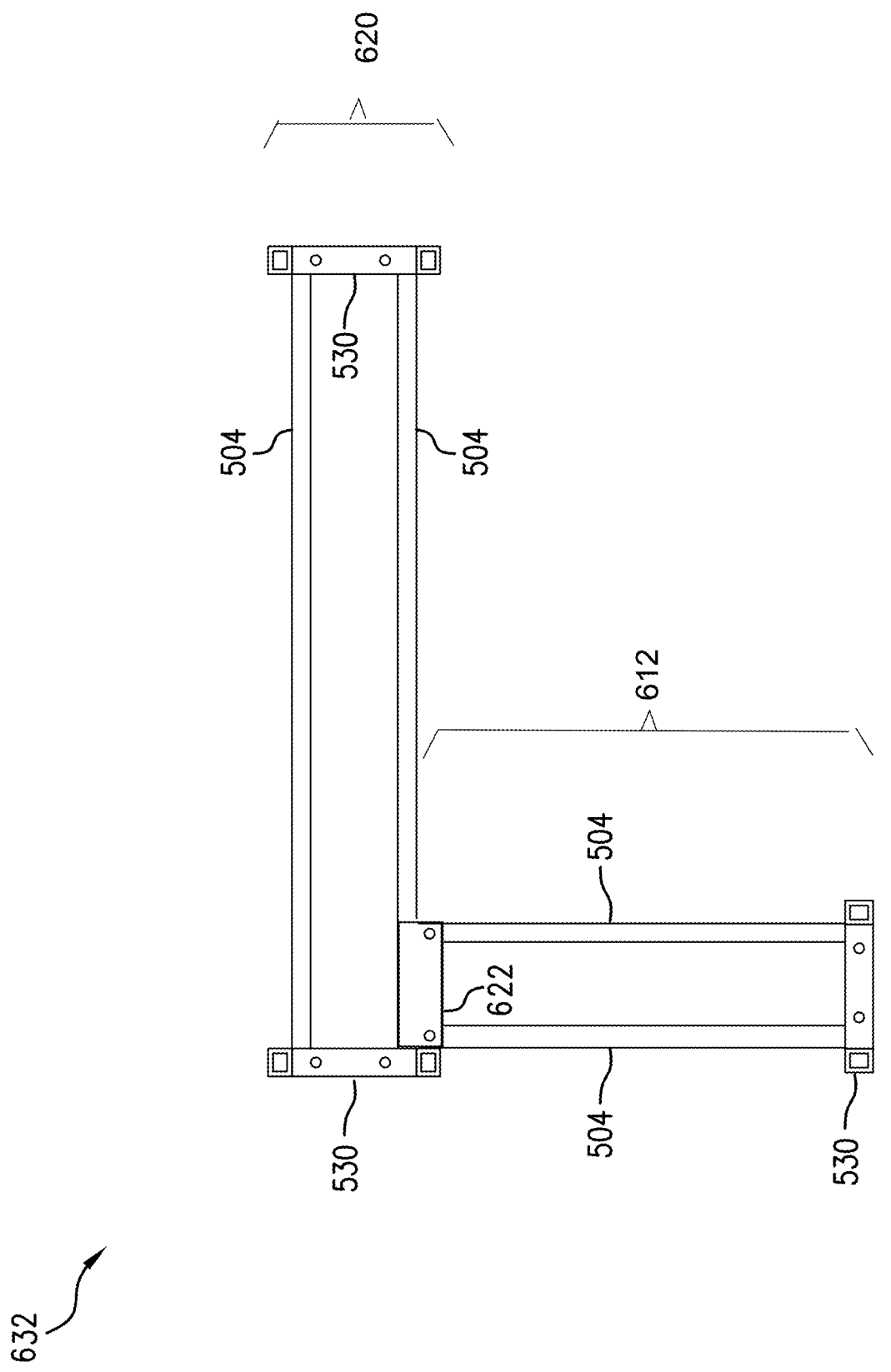
FIG. 9B shows an overhead view of an alternative third embodiment of a workstation module (alternative L module).

FIG. 9B shows an overhead view of an alternative version of the third embodiment of a workstation module 632 (alternative L module). In the alternative L module 632, the second set of rails (part of the truncated I module 612) is connected to the first set of rails 504 (part of the I module 620) by one or more clip splices 634 (typically two) instead of the plurality of perpendicular nut plate splices 628. The clip splice 634 may slide along the first set of rails 504 of the I module 620 portion of the L module 630.

Fourth Embodiment Workstation Module (T Module)

Figure 10A:
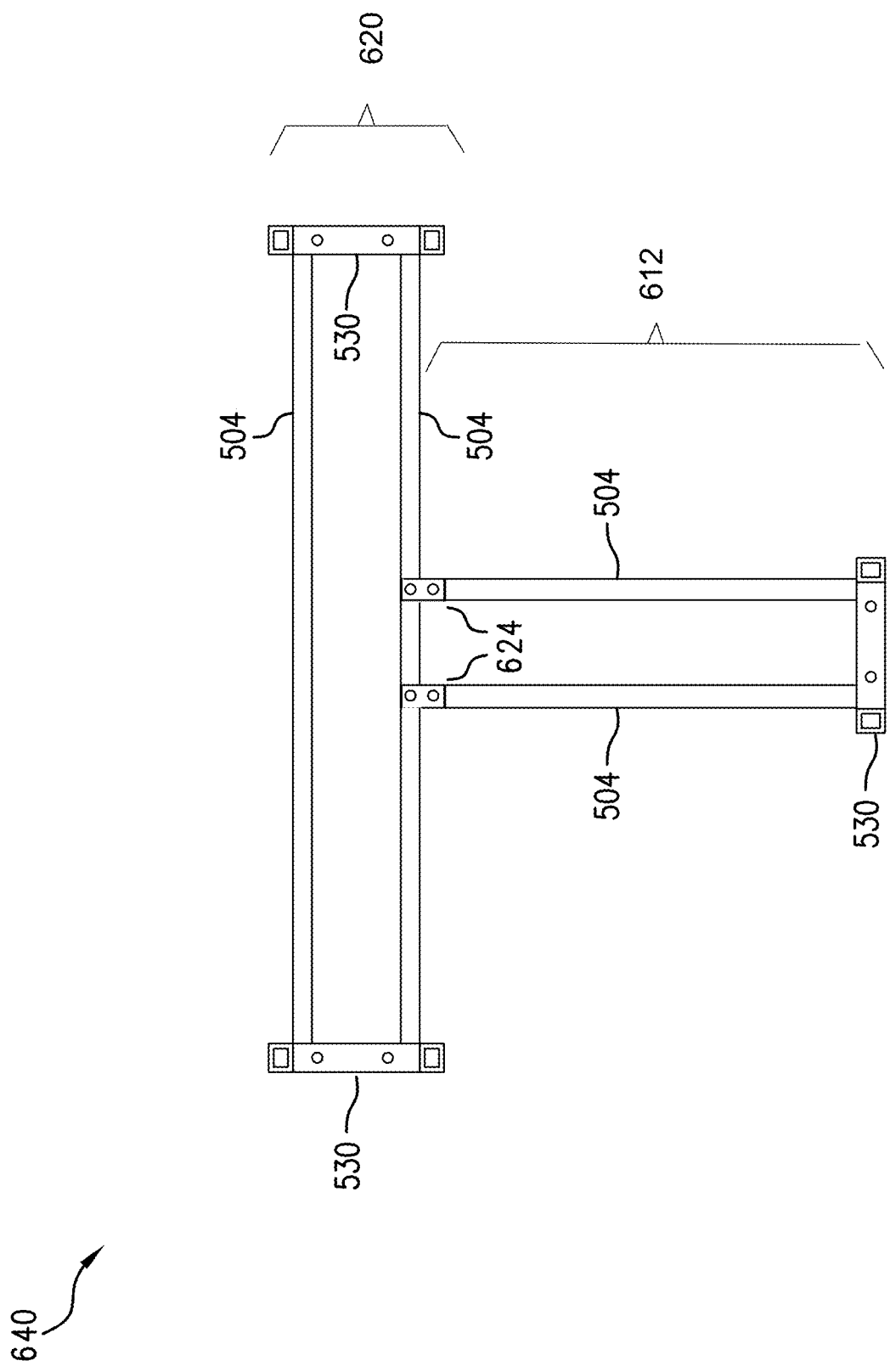
FIG. 10A shows an overhead view of a fourth embodiment of a workstation module (T module).

FIG. 10A shows an overhead view of a fourth embodiment of a workstation module 640 referred herein as a "T" module. The T module 640 is similar to the L module 630, but the second set of rails 504 (part of the truncated I module 612) are connected at or near the middle of the first set of rails 504 (part of the I module 620). In the T module 640, the second set of rails is coupled to the first set of rails with a plurality of perpendicular nut plate splices 628, typically four, one for each of the four rails 504 in the second set of rails 504.

Figure 10B:
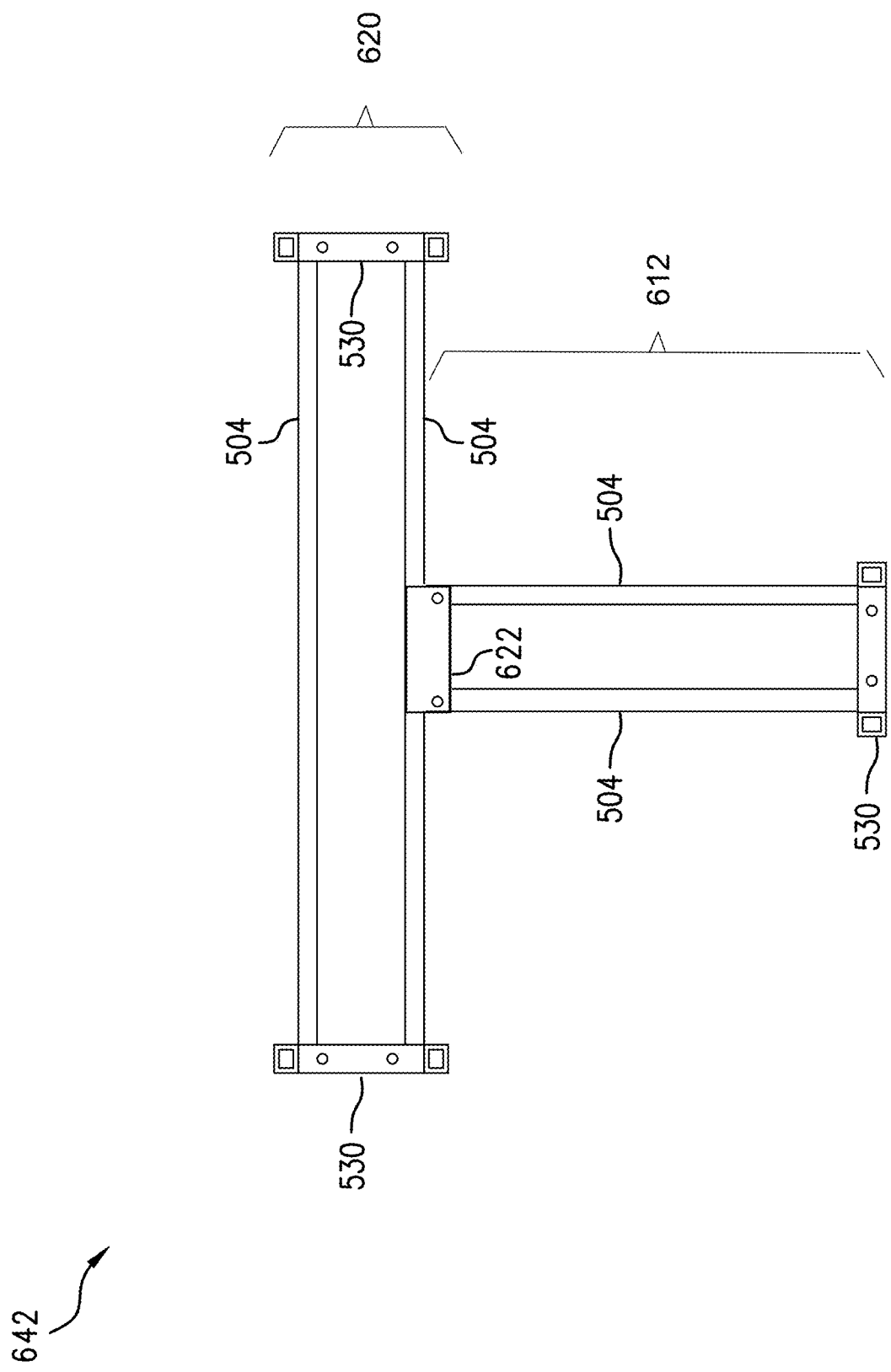
FIG. 10B shows an overhead view of an alternative version of the fourth embodiment of a workstation module (alternative T module).

FIG. 10B shows an overhead view of an alternative version of the fourth embodiment of a workstation module 642 (alternative T module). In the alternative T module 642, the second set of rails 504 (part of the truncated I module 612) is connected to the first set of rails 504 (part of the I module 620) by one or more double-rail-to-single-rail clips 622 (typically two) instead of the plurality of perpendicular nut plate splices 628. The double-rail-to-single-rail clips 622 may slide along the first set of rails 504.

Fifth Embodiment Workstation Module (X Module)

Figure 11A:
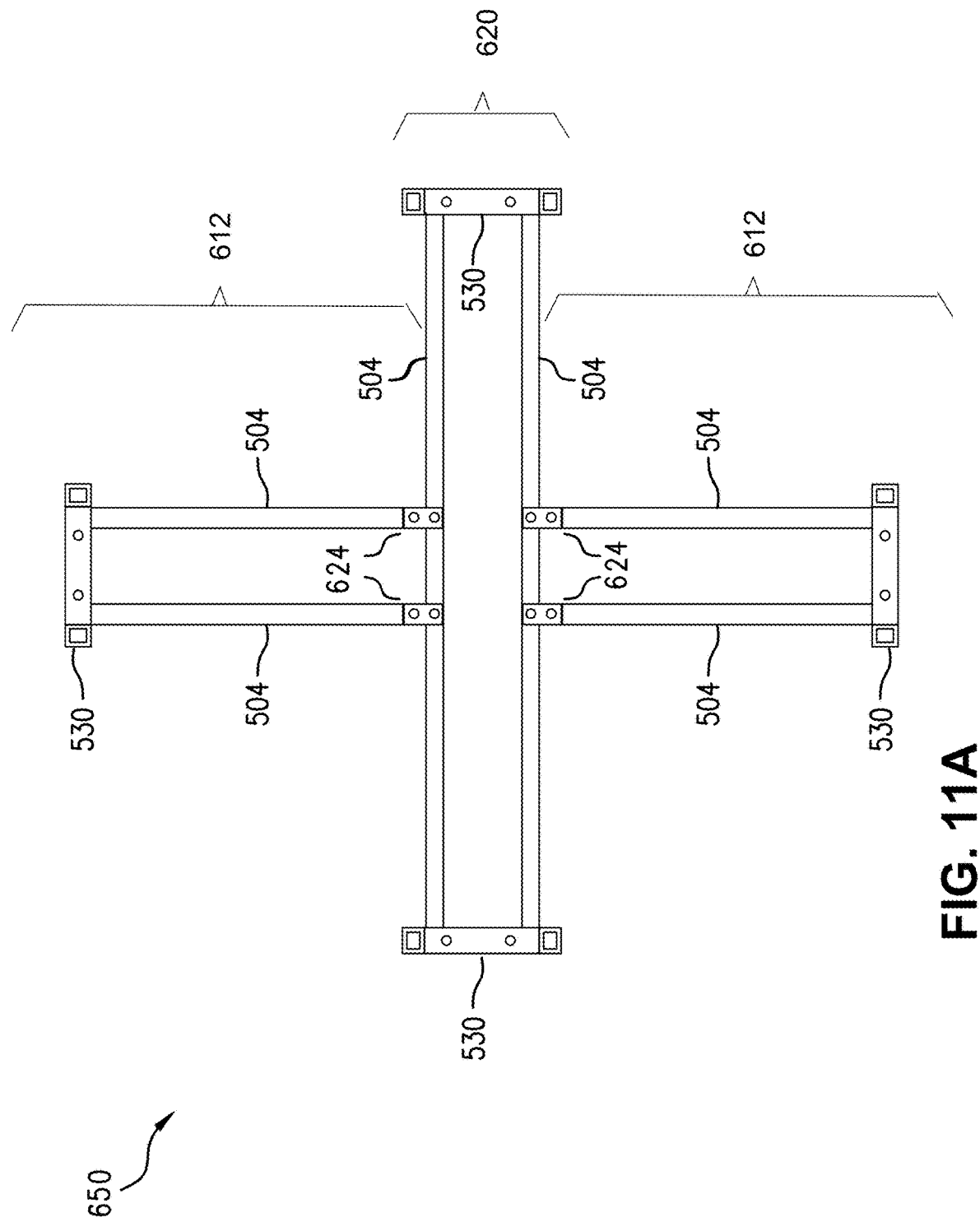
FIG. 11A shows an overhead view of a fifth embodiment of a workstation module (X module).

FIG. 11A shows an overhead view of a fifth embodiment of a workstation module 650 referred herein as an "X" module. The X module 650 is similar to the T module 640, but has a third set of rails 504 (part of a second truncated I module 612) that are connected to the first set of rails 504 (part of the I module 620) at or near the middle of the first set of rails 504 opposite the second set of rails 504. In the fifth embodiment workstation module 650, the third set of rails is coupled to the first set of rails with a plurality of perpendicular nut plate splices 628, typically four, one for each of the four rail 504s in the third set of rails 504.

Figure 11B:
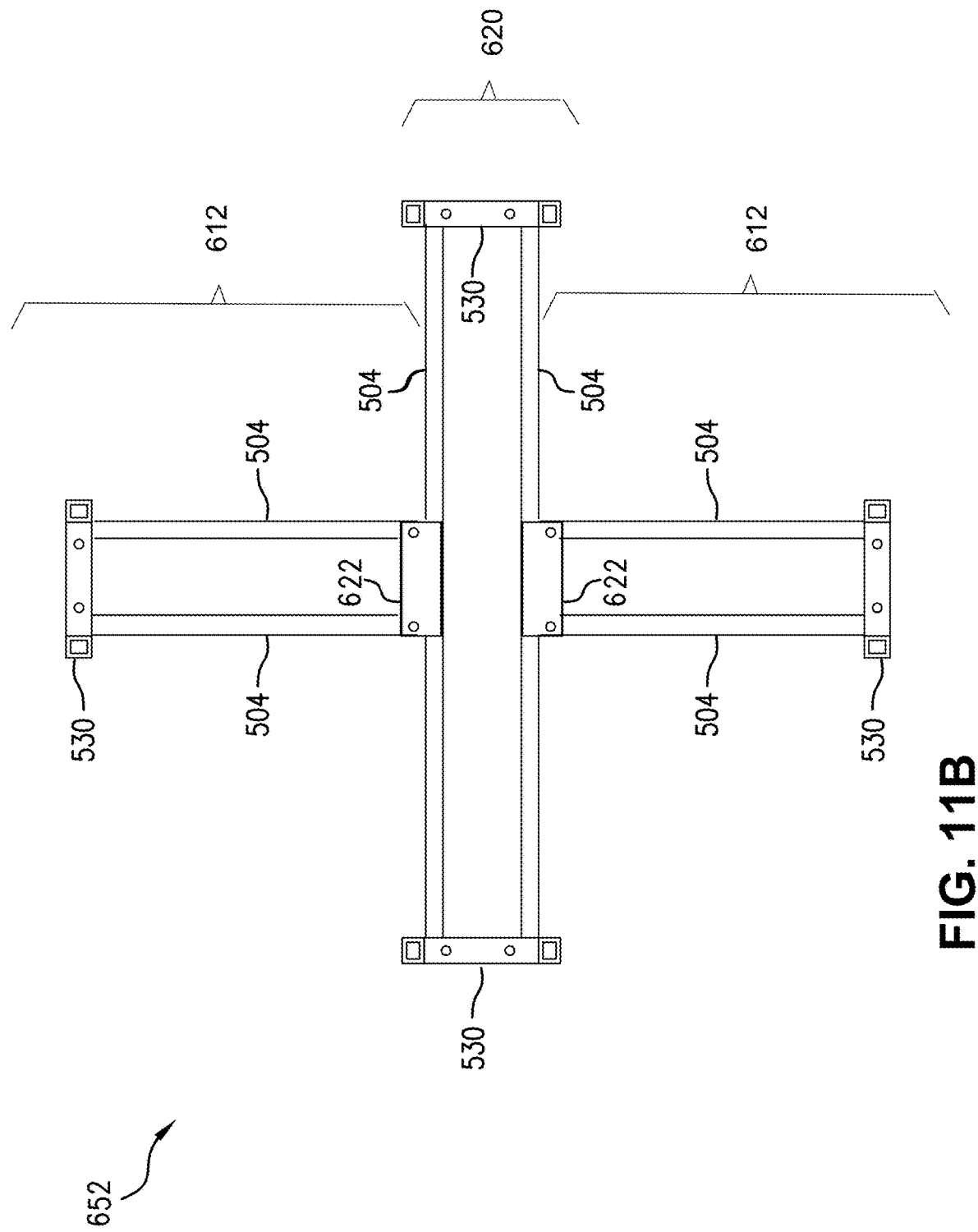
FIG. 11B shows an overhead view of an alternative version of the fifth embodiment workstation module (alternative X module).

FIG. 11B shows an overhead view of an alternative version of the fifth embodiment workstation module 652 (alternative X module). In the alternative X module 652, the third set of rails 504 (part of a second truncated I module 612) is connected to the first set of rails 504 (part of the I module 620) by one or more double-rail-to-single-rail clips 622 (typically two) instead of the plurality of perpendicular nut plate splices 628. The double-rail-to-single-rail clips 622 may slide along the first set of rails 504.

Sixth Embodiment Workstation Module (Y Module)

Figure 12:
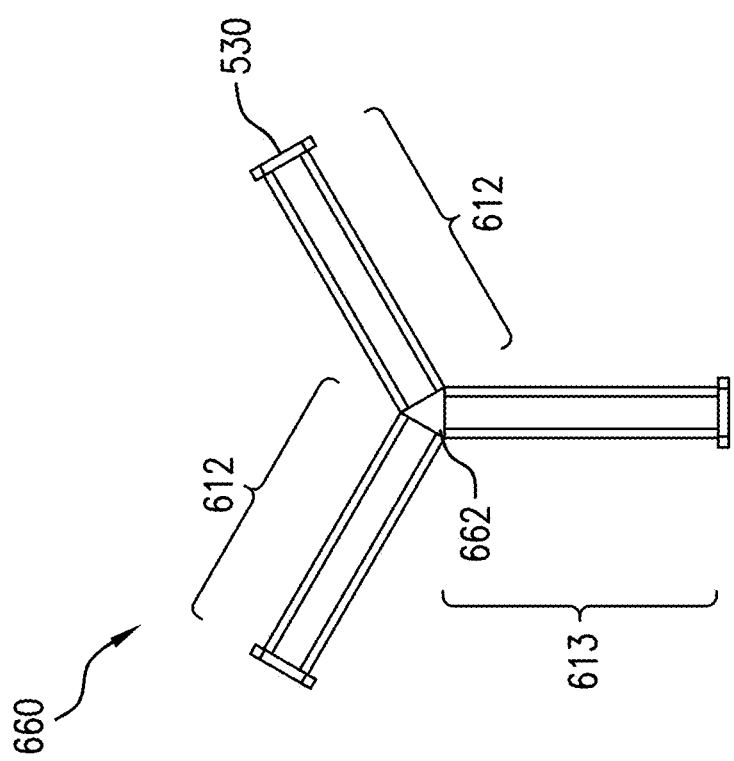
FIG. 12 shows an overhead view of a sixth embodiment of a workstation module (Y module).

FIG. 12 shows an overhead view of a sixth embodiment of a workstation module 660 referred herein as a "Y" module. The Y module 660 comprises three truncated I modules 612 coupled to two Y module center couplers 662. Each Y module center couplers 662 comprises three rails 504 coupled together, typically by welding, but in some embodiments by threaded fasteners or other suitable coupling mechanism. In some embodiments, the three rails 504 of the Y module center coupler 662 are forged as a single monolithic piece. The rails 504 of the truncated I modules 612 couple to the Y module center couplers 662 with perpendicular nut plate splices 628 or clip splices 634.

Seventh Embodiment Workstation Module
Pentagon Module

Figure 13:
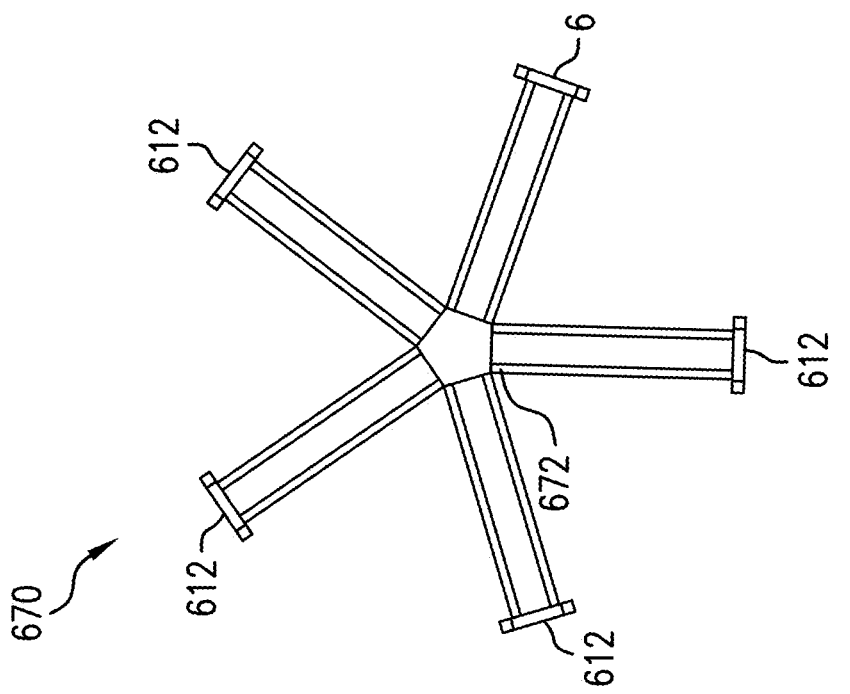
FIG. 13 shows a seventh embodiment of a workstation module ("pentagon" module).

FIG. 13 shows a seventh embodiment of a workstation module 670 referred herein as a "pentagon" module. The pentagon module 670 comprises five truncated I modules 612 coupled to two pentagon module center couplers 672. Each pentagon module center coupler 672 comprises five rails 504 coupled together, typically by welding, but in some embodiments by threaded fasteners or other suitable coupling mechanism. In some embodiments, the five rails 504 of the pentagon module center coupler 672 are forged as a single monolithic piece. The rails 504 of the truncated I modules 612 couple to the pentagon module center coupler 672 with perpendicular nut plate splices 628 or clip splices 634.

Split Quad Rail-Arm-Leg (RAL) Module

Figure 32:
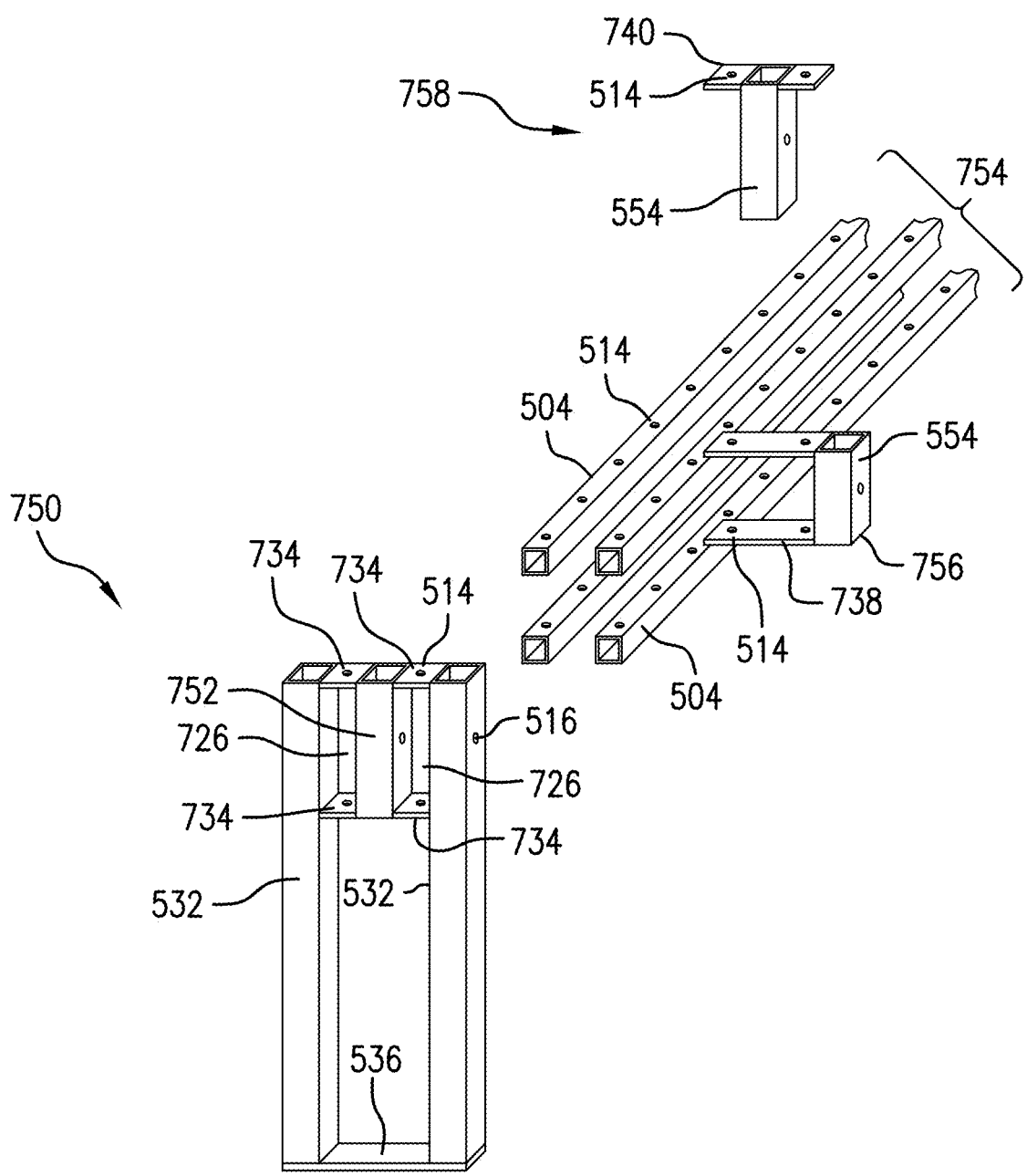
FIG. 32 shows a representative embodiment of a split quad rail-arm-leg module.

Another substructure for use with the Three-Dimensional Positioning and Holding Modular System is a split quad rail-arm-leg module 750. FIG. 32 shows a representative embodiment of a split quad rail-arm-leg module 750. The split quad rail-arm-leg module 750 is similar to the open quad rail-arm-leg module 530, but the module interior is split by a center column 752. The split quad rail-arm-leg module 750 comprises two columns 532 on either side coupled a bottom plate 736. Two cross plates 734, an upper and a lower, couple one of the columns 532 to the center column 752 and two more cross plates 734 couple the other column 532 to the center column 752. The columns 532 are orthogonal from the cross plates 734 and the bottom plate 736, with the two columns 532 on the sides and the center column 752 arranged vertically in parallel. The two cross plates 734 and the bottom plate 736 are arranged horizontally in parallel. The center column 752 has an open top and is similar in construction to the columns 732 on the sides of the split quad rail-arm-leg module 750. The center column 752 extends between the cross plates 734 in the exemplary embodiment, but in other embodiments, may extend to the bottom plate 736. The columns 732 and the cross plates 734 define a module interior 520 divided in two partial module interiors 726 by the center column 752 with each partial module interior 726 configured for receiving two rails 504. In the representative embodiment, each partial module interior 726 is slightly wider than a rail 504, providing a sliding fit between the column 532 and the center column 752, but in other embodiments, each partial module interior 726 may be wider and a looser fit may be provided. The columns 532, the cross plates 734, and the bottom plate 736 are typically made of metal, such as steel, and coupled by welding, but may be made of other suitable materials and joined by other methods. The columns 532 in the split quad rail-arm-leg module 750 are essentially identical to the columns 532 in the open quad rail-arm-leg module 530. The four cross plates 734 each have a fastener hole 514. The fastener holes 514 are typically unthreaded, but in some embodiments, may be threaded.

The rails 504 for use with the twin rail-arm-leg module 730 have fastener holes 514 spaced at periodic distances along the rail 504 like the rails 504 used with the twin rail-arm-leg module 730 but arranged in a second exemplary embodiment quad-rail beam 754 similar to the first exemplary embodiment quad-rail beam 500.

The split quad rail-arm-leg module 750 is configured to combine with the rails 504 to make work stations of various configurations. The split quad rail-arm-leg module 750 is configured for two rails 504 to be inserted into each of two partial module interiors 726 of the twin rail-arm-leg module 730. In each partial module interior 726 one rail 504 is attached to the underside of the upper cross plate 734 with a fastener passing through the fastener holes 514 in the rail 504 and the upper cross plate 734 and the other rail 504 is attached to the topside of the lower cross plate 734 with a fastener passing through the fastener holes 514 in the rail 504 and the lower cross plate 734.

The typical dimensions for the split quad rail-arm-leg module 750 are 20 inches high and 8½ inches wide across the front. Each partial module interior 726 of the twin rail-arm-leg module 730 is typically 1¼ inches wide between the column 532 and the center column 752, 6 inches between the two cross plates 534, and 1½ inches deep. These dimensions are convenient for building industrial workstations, but other dimensions may be used. The cross plates 734 nearest the top of the twin rail-arm-leg module 730 are typically flush with the top of the columns 532, but in some embodiments, may be positioned lower. While split quad rail-arm-leg module 750 may be freestanding, typically it has one or more horizontal legs (not shown) to give it greater stability.

The split quad rail-arm-leg module 750 may be used to make any of workstation embodiments based on the open quad rail-arm-leg module 530 described herein, the necessary changes being made, including the H module 540, the I module 620, the L module 630, the T module 640, the X module 650, the Y module 660, and the pentagon module 670.

Twin Rail-Arm-Leg (RAL) Module

Figure 29:
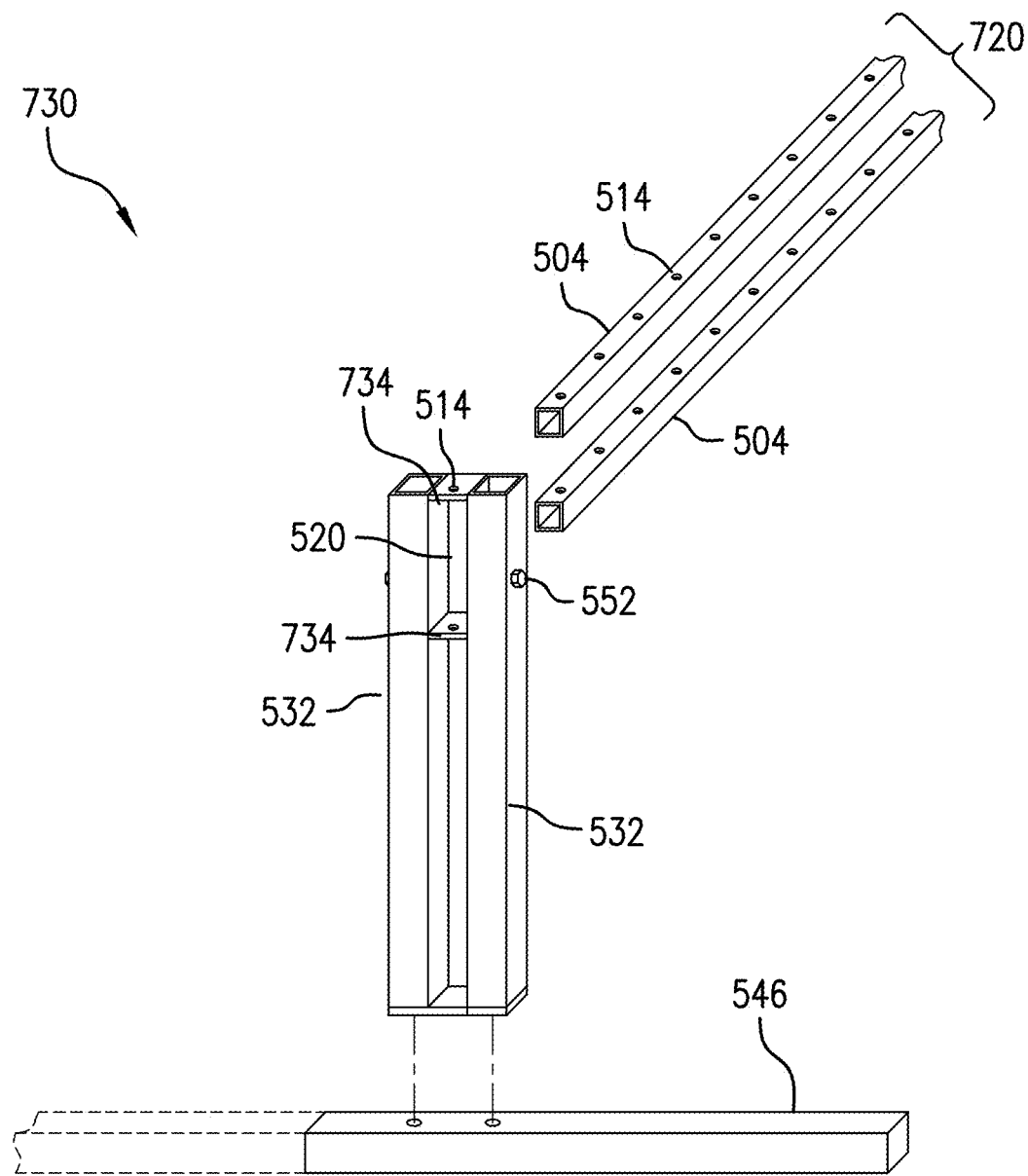
FIG. 29 shows a representative embodiment of a twin rail-arm-leg module.

Another substructure for use with the Three-Dimensional Positioning and Holding Modular System is a twin rail-arm-leg (RAL) module 730. FIG. 29 shows a representative embodiment of a twin rail-arm-leg module 730. The twin rail-arm-leg module 730 is similar to the open quad rail-arm-leg module 530, but is configured to hold two rails 504, one above the other to form a twin rail beam 720, rather than four rails 504 in a rectangular pattern forming a quad-rail beam 500. The twin rail-arm-leg module 730 comprises two columns 532 coupled by two cross plates 734 and a bottom plate 736. The columns 532 are orthogonal from the cross plates 734 and the bottom plate 736, with the two columns 532 arranged vertically in parallel. The two cross plates 734 and the bottom plate 736 are arranged horizontally in parallel. The columns 732 and the cross plates 734 define a module interior configured for receiving the two rails 504. In the representative embodiment, the module interior is slightly wider than a rail 504, providing a sliding fit, but in other embodiments, the module interior may be wider and a looser fit may be provided. The columns 532, the cross plates 734, and the bottom plate 736 are typically made of metal, such as steel, and coupled by welding, but may be made of other suitable materials and joined by other methods. The columns 532 in the twin rail-arm-leg module 730 are essentially identical to the columns 532 in the open quad rail-arm-leg module 530. The two cross plates 734 each have a fastener hole 514. The fastener holes 514 are typically unthreaded, but in some embodiments, may be threaded.

The rails 504 for use with the twin rail-arm-leg module 730 have fastener holes 514 spaced at periodic distances along the rail 504. The fastener holes 514 in the rails 504 are typically unthreaded, but in some embodiments, may be threaded.

The twin rail-arm-leg module 730 is configured to combine with the rails 504 to make work stations of various configurations. The twin rail-arm-leg module 730 is configured for two rails 504 to be inserted into the interior space of the twin rail-arm-leg module 730. One rail 504 is attached to the underside of the upper cross plate 734 with a fastener passing through the fastener holes 514 in the rail 504 and the upper cross plate 734. The other rail 504 is attached to the topside of the lower cross plate 734 with a fastener passing through the fastener holes 514 in the rail 504 and the lower cross plate 734.

While not having as much resistance to torque induced twist as the open quad rail-arm-leg module 530, the twin rail beam 720 still provides a good amount of torque resistance due to the space between the rails 504. The twin rail beam 720 is configured so that between the two rails there is a gap (beam gap) that is at least as large as a largest cross-sectional dimension of one of the two rails. This is to ensure that the rails 504 are far enough apart to give the twin rail beam 720 good resistance to torsional twisting.

The typical dimensions for the twin rail-arm-leg module 730 are 20 inches high and 3¾ inches wide across the front. The interior space of the twin rail-arm-leg module 730 is typically 1¼ inches wide between the columns 532, 6 inches between the two cross plates 534, and 1½ inches deep. These dimensions are convenient for building industrial workstations, but other dimensions may be used. The cross plate 734 nearest the top of the twin rail-arm-leg module 730 is typically flush with the top of the columns 532, but in some embodiments, may be positioned lower. The fastener holes 514 are ⅜-inch diameter and on the rail 504 have 2 inch spacing.

While twin rail-arm-leg module 730 may be freestanding, typically it has one or more horizontal legs 546 to give it greater stability. The horizontal legs 546 are coupled to the bottom of the twin rail-arm-leg module 730 by threaded fasteners, but in other embodiments may be coupled by other fasteners, welding, or other suitable mechanism.

The twin rail-arm-leg module 730 may be used to make any of workstation embodiments based on the open quad rail-arm-leg module 530 described herein, the necessary changes being made, including the H module 540, the I module 620, the L module 630, the T module 640, the X module 650, the Y module 660, and the pentagon module 670.

Twin Rail Sleeve Stanchion

Figure 53B:
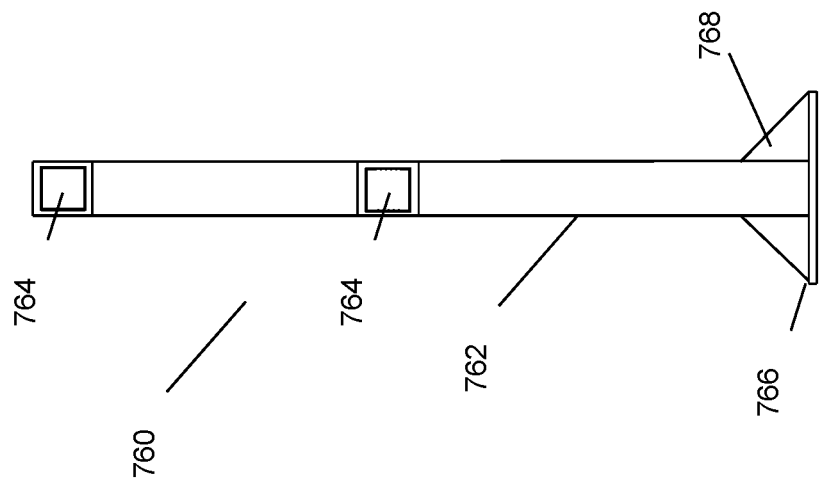
FIG. 53B shows a side view of an embodiment of a twin rail sleeve stanchion.
Figure 53A:
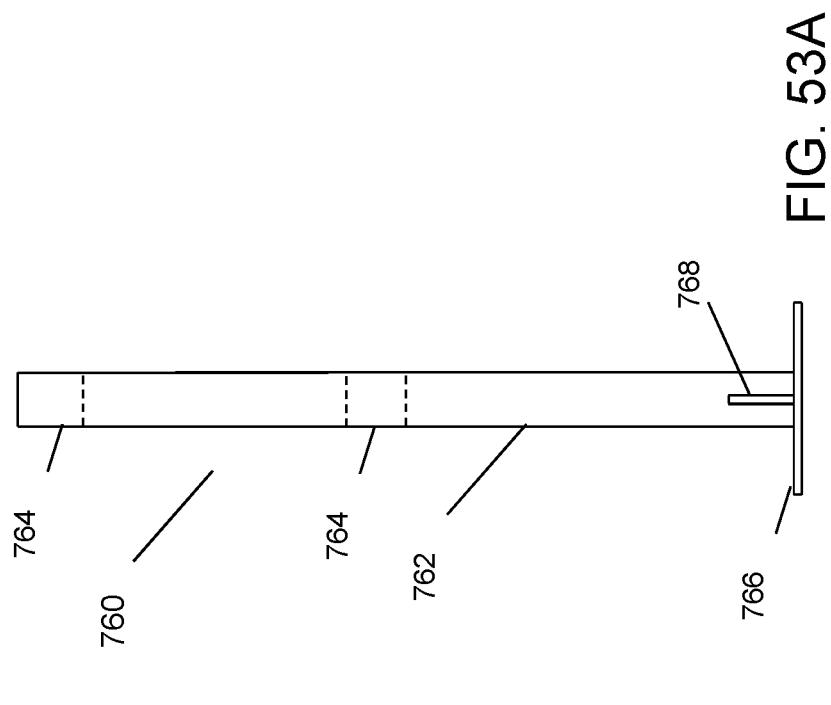
FIG. 53A shows a front view of an embodiment of a twin rail sleeve stanchion.
Figure 53C:
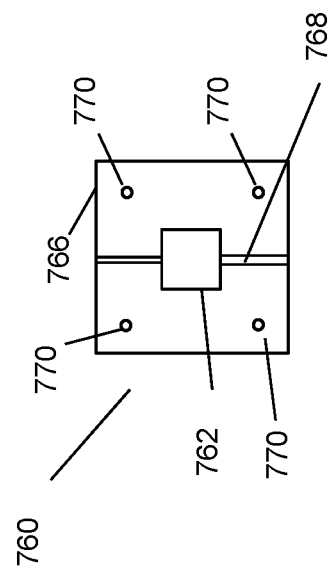
FIG. 53C shows a top view of an embodiment of a twin rail sleeve stanchion.

Another substructure for use with the Three-Dimensional Positioning and Holding Modular System is a twin rail sleeve stanchion 760. FIGS. 53A-53C show an embodiment of a twin rail sleeve stanchion 760. The twin rail sleeve stanchion 760 is similar to the twin rail-arm-leg module 730 in that it is configured to hold two rails, one above the other to form a twin rail beam. The twin rail sleeve stanchion 760 comprises a tube column 762 coupled to a base plate 766. The base plate 766 has a plurality of bolt holes 770 for securing the twin rail sleeve stanchion 760 to a floor. The tube column 762 has two rail sleeves 764 that pass horizontally through the tube column 762. The rail sleeve 764 are sized and shaped for a rail to be inserted with a sliding fit. The twin rail sleeve stanchion 760 has two base stiffeners 768 coupling the tube column 762 to the base plate 766, one base stiffener 768 on either side of the column. The base stiffeners 768 run orthogonal to the axis of the rail sleeves 764 and the rails supported by the rail sleeves 764.

In the exemplary embodiment, the twin rail sleeve stanchion 760 is 24 inches high, the base plate 766 is 6 inches×6 inches wide, ¼ inch thick. The base stiffeners 768 are each 2 inches×2 inches, ¼ inch thick. The tube column 762 is a 14 gauge square tube 1¾ inches in width. The twin rail sleeve stanchion 760 is configured so that between the two rails there is a gap (beam gap) that is at least as large as a largest cross-sectional dimension of one of the two rails. This is to ensure that the rails are far enough apart to give the twin rail beam good resistance to torsional twisting. In the exemplary embodiment, the rail sleeves 764 are separated by 8½ inches. In other embodiments, there may be some variation in any of the dimensions of the twin rail sleeve stanchion 760. In other embodiments of the twin rail sleeve stanchion 760 may have additional rail sleeves 764 vertically above the other two rail sleeves 764, to support more rails in parallel with the other two rails.

In one exemplary workstation arrangement, a 50' long rail-line is supported by floor bolted twin rail sleeve stanchions 760 spaced at calculated distances apart to sufficiently support intended load forces placed upon its attached twin-rails. Arms, positioning holders and other accessories can be attached to the rails.

Eighth Embodiment Workstation Module (Twin Rail H Module)

Figure 30:
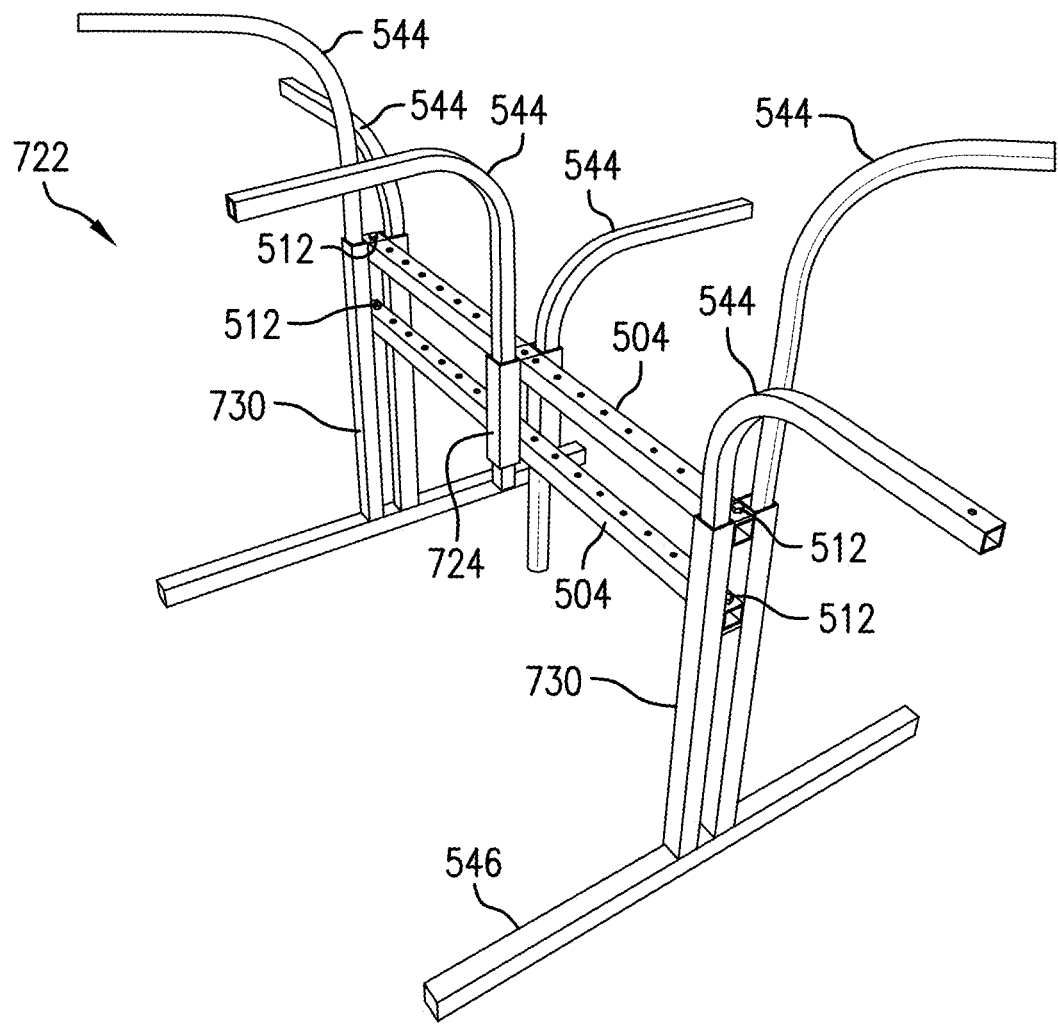
FIG. 30 shows a perspective view of a twin rail H module with a double drop-on rail clip bracket.
Figure 31B:
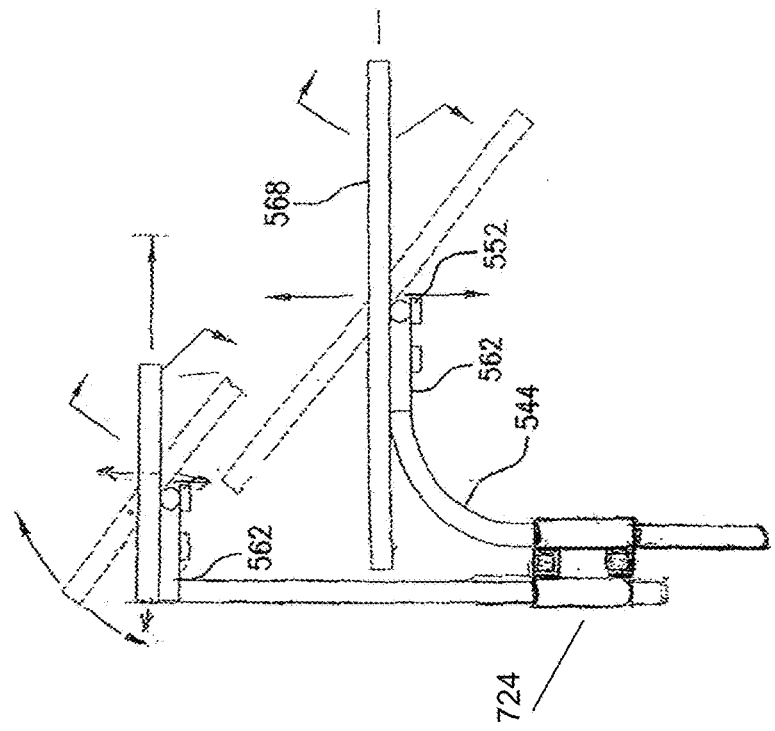
FIG. 31B shows a side view of a double drop-on rail clip bracket with arms and work surfaces attached.
Figure 31A:
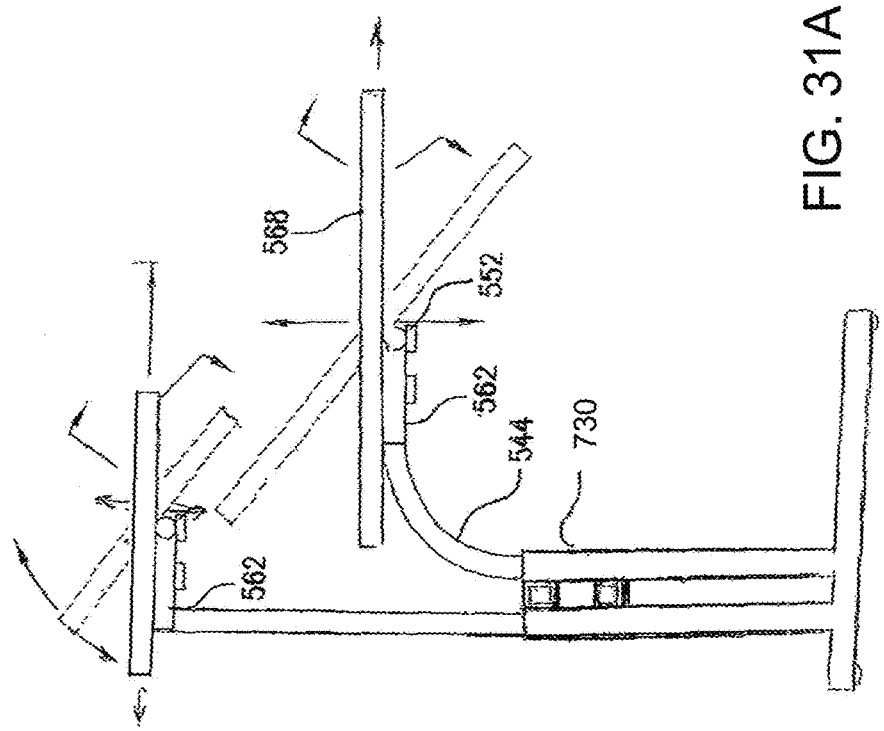
FIG. 31A shows a side view of a twin rail H module with arms and work surfaces attached.

FIG. 30 shows a representative embodiment of a twin rail H module 722 with various accessories attached, including a double drop-on rail clip bracket 724 clipped on to the rails 504 of the twin rail H module 722 and several arms 544. FIG. 31A shows a side view of a twin rail H module with arms 544, single-arm table support bracket 562, and table tops 568 attached. FIG. 31B shows a side view of a double drop-on rail clip bracket 724 with arms 544, single-arm table support bracket 562, and table tops 568 attached.

Figure 42:
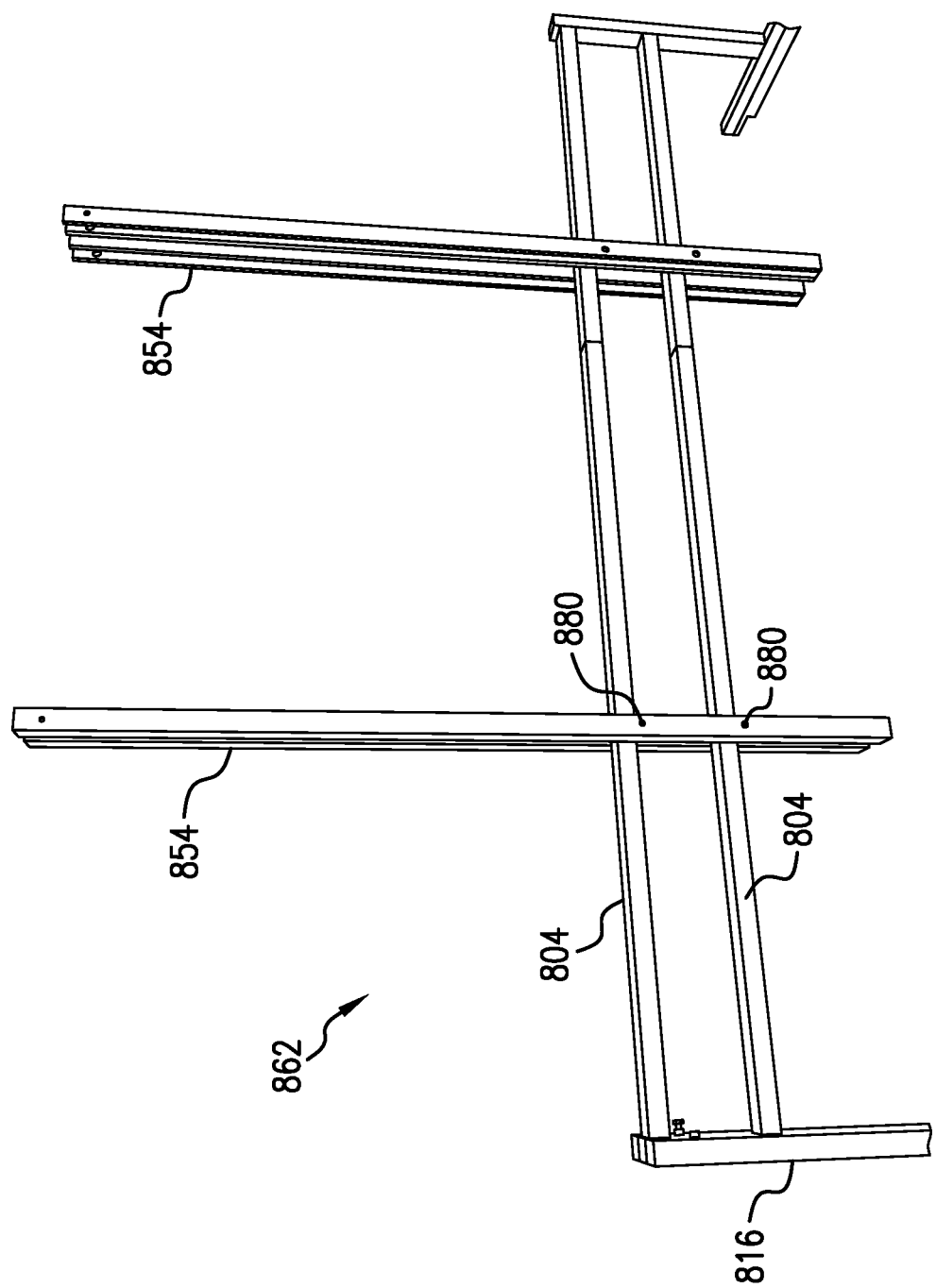
FIG. 42 shows a twin rail H module with two floating twin lateral facing channel columns.

FIG. 42 shows a twin rail H module 862 with two floating twin lateral facing channel columns 854. The twin rail H module 862 is similar to the twin rail H module 722 of FIG. 30. Each floating twin lateral facing channel column 854 comprises two channels (similar to the channel rail 922 in FIG. 50C) with the open fronts of the channels facing in the same direction laterally. Two or more bolts 880 pass through holes in the sides of the channels. When tightened, the bolts 880 draw the channels together and hold the floating twin lateral facing channel column 854 in place on the rails 804. The two floating twin lateral facing channel columns 854 are clamped to the rails 804 with the open fronts of the channels in one column 854 facing the open fronts of the channels in the other column 854. This allow for attachment of accessories between the columns 854, drawing support from both.

Figure 43:
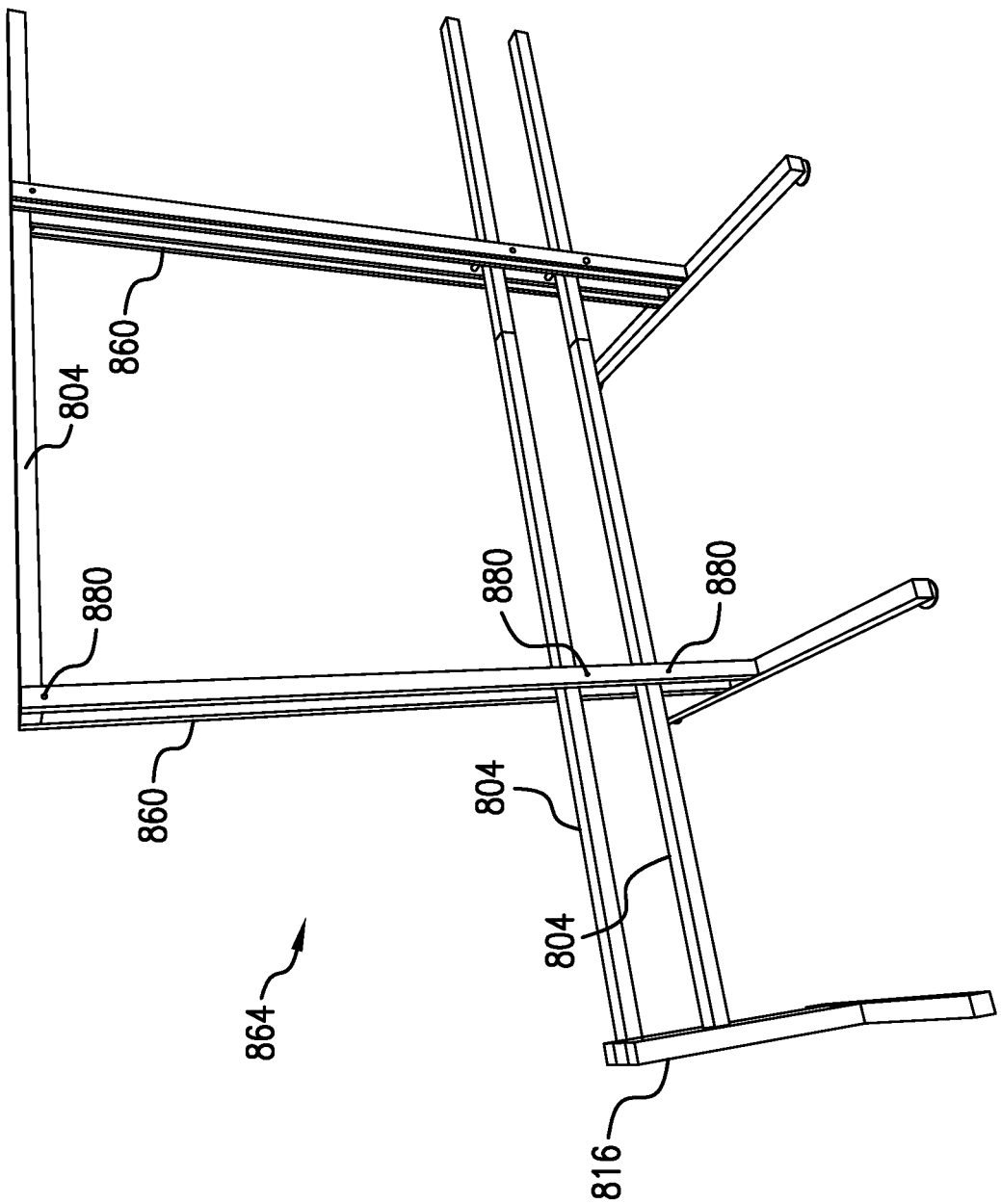
FIG. 43 shows a twin rail-triple rail hybrid module.

FIG. 43 shows a twin rail-triple rail hybrid module 864. The twin rail-triple rail hybrid module 864 comprises a twin rail-arm-leg module 816 and two rails 804 coupled thereto. Instead of a second twin rail-arm-leg module 816 to support the other ends of the two rails 804, a first standing twin lateral facing channel column 860 is coupled to the two rails 804. A second standing twin lateral facing channel column 860 is coupled to the two rails 804 between the twin rail-arm-leg module 816 and the first standing twin lateral facing channel column 860. A third rail 804 is coupled between the two standing twin lateral facing channel columns 860 at or near the tops of the standing twin lateral facing channel columns 860.

Ninth Embodiment Workstation Module (Triple Rail Extended Column H Module)

Figure 33:
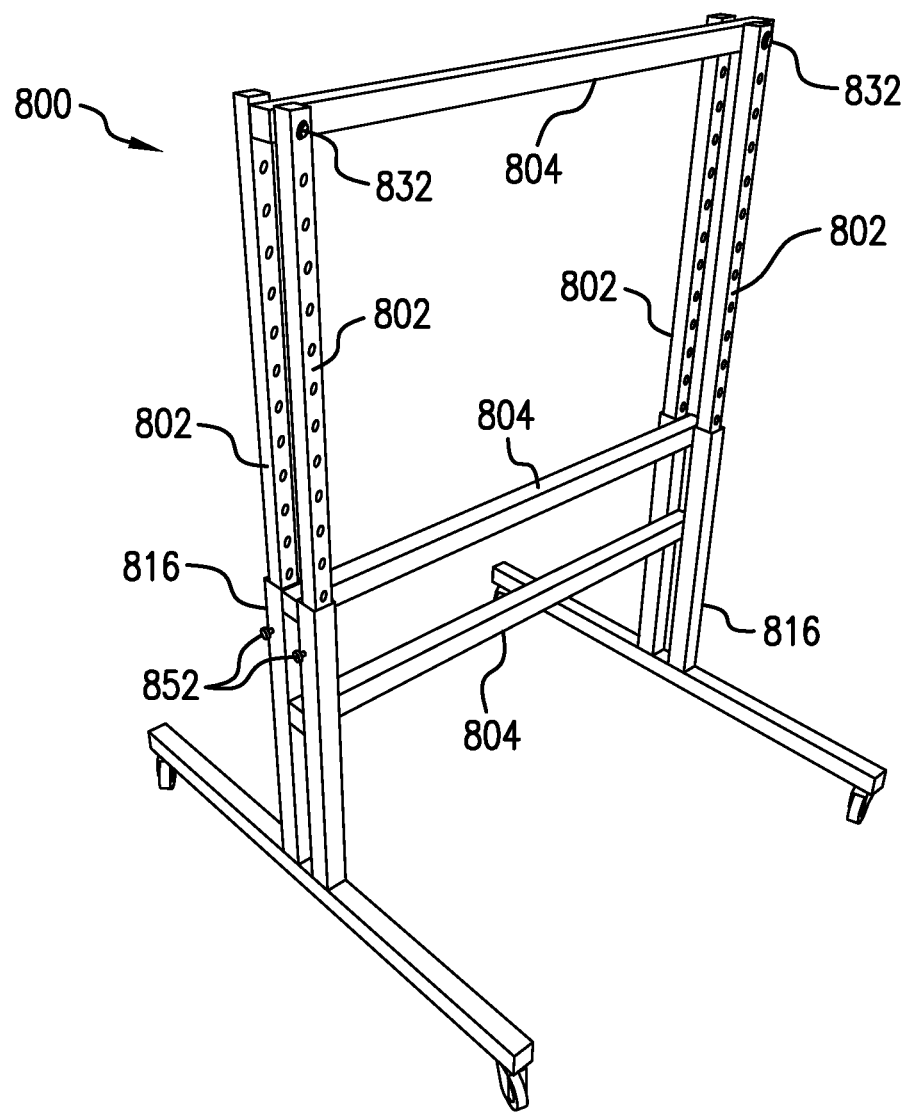
FIG. 33 shows a representative embodiment of a triple rail extended column H module.

Another substructure for use with the Three-Dimensional Positioning and Holding Modular System is a triple rail extended column H module 800. FIG. 33 shows a representative embodiment of a triple rail extended column H module 800. The triple rail extended column H module 800 comprises two twin rail-arm-leg module 816 coupled by two rails 804 (beam rails). The twin rail-arm-leg modules 816 are similar to the twin rail-arm-leg module 730 of FIG. 29, except that it has set screws 852 on one side rather than front and back. Two column extension tubes 802 are inserted with a sliding fit into each of the twin rail-arm-leg modules 816 and secured with set screws 852, forming a twin column. A third rail 804 (high rail) is coupled between the two twin columns (sets of two column extension tubes 802). At each end of the third rail 804, the rail 804 is secured to the respective twin column with a bolt 832 that passes through bolt holes in the in the column extension tubes 802.

Figure 34:
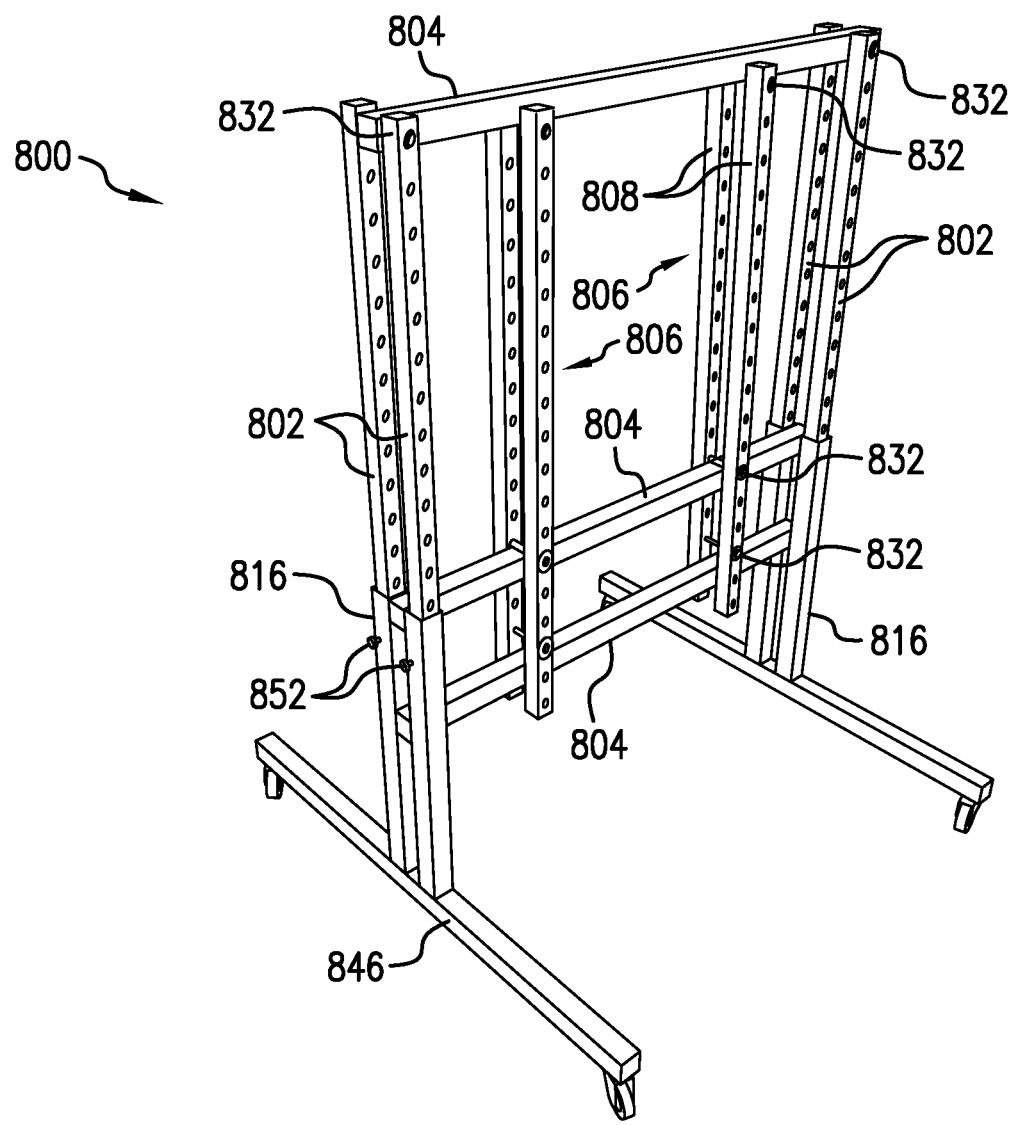
FIG. 34 shows the triple rail extended column H module with two floating twin columns.

FIG. 34 shows the triple rail extended column H module 800 with two floating twin columns 806. Each floating twin column 806 comprises two floating columns 808 coupled together with two or more bolts 832 that pass through bolt holes in the floating columns 808. The columns 808 of each floating twin column 806 pinch the rails 804 between them when their associated bolts 832 are tightened. One or more of the bolts 832 rest on one of the rails 804. The floating twin columns 806 provide additional torsion resistance to the triple rail extended column H module 800. This is may be needed if accessories are cantilevered on arms off of the high rail 804. Accessories may also be attached to the floating twin columns 806 themselves. The columns 808 of the floating twin columns 806 may have a series of bolt holes along their length to facilitate attachment of accessories as well as coupling the floating twin columns 806 to the rails 804.

The triple rail extended column H module 800 may be used to make any of workstation embodiments based on the open quad rail-arm-leg module 530 described herein, the necessary changes being made, including the H module 540, the I module 620, the L module 630, the T module 640, the X module 650, the Y module 660, and the pentagon module 670.

Standing Twin Column Module

Figure 35:
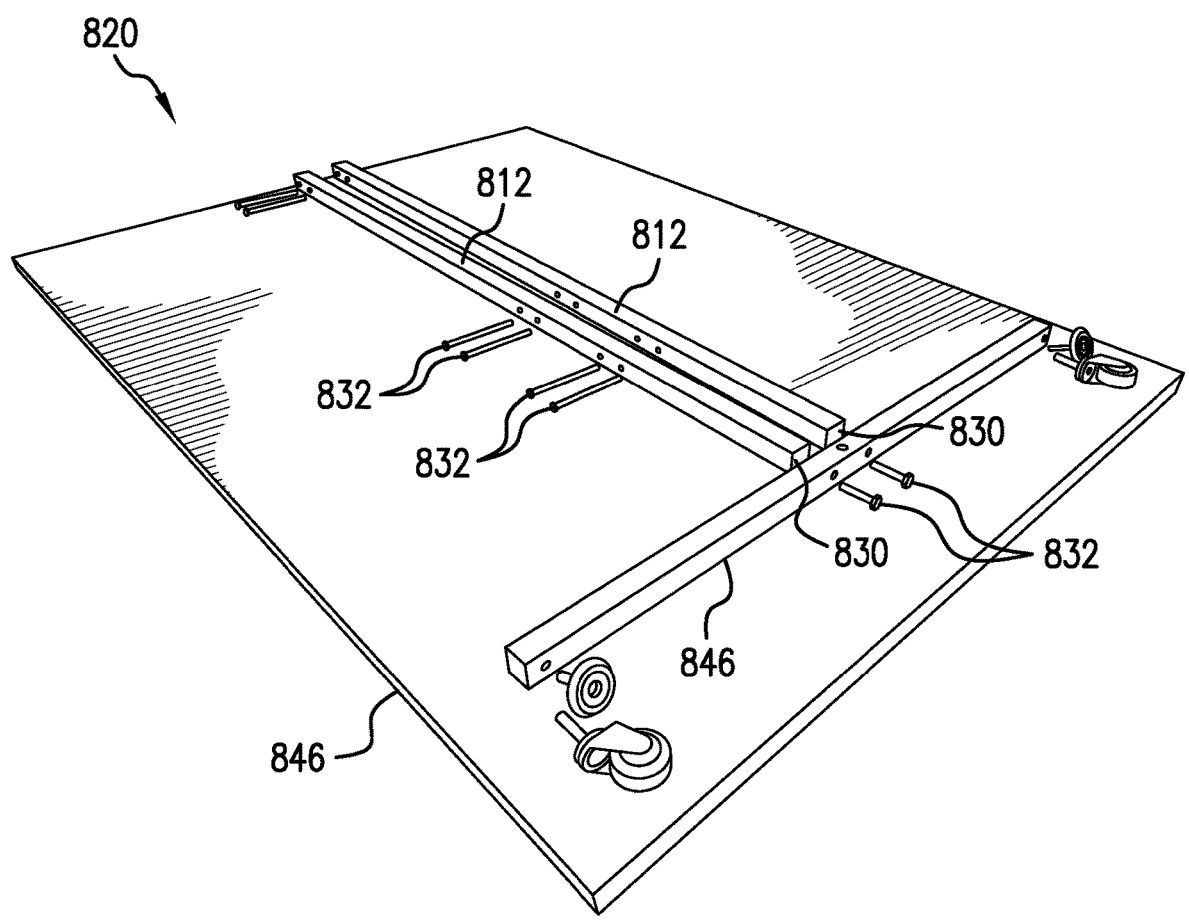
FIG. 35 shows an exploded view of an embodiment of a standing twin column module.

FIG. 35 shows an exploded view of an embodiment of a standing twin column module 820. The standing twin column module 820 comprises two standing columns 812 coupled to a horizontal leg 846. The two standing columns 812 are tubular and rectangular in cross-section and each have a bottom plate 830 coupled thereto, each bottom plate 830 having a threaded bolt hole. The two standing columns 812 are coupled to the horizontal leg 846 with bolt 832 that pass through bolt holes in the horizontal leg 846 and engage with the threaded bolt holes in the bottom plates 830 of the standing columns 812. The two standing columns 812 are separated by a standing column gap that is as wide as the rails 804 that will be used with the standing twin column module 820 (see FIG. 36).

The two standing columns 812 each have multiple bolt holes for bolts 832 to pass through. These bolt holes may be in specific locations to hold rails 804 in place, or they may be spaced along the length of the standing columns 812. There are a set of two bolt holes in each standing column 812 for each rail. There are two sets of bolt holes in each standing column 812 for lower rails 804 nearer the horizontal leg 846, the two sets spaced apart by one width of the rail 804 or more so as to provide sufficient torque resistance. There is a set of bolt holes near the top of each of the standing columns 812 for a high rail 804.

Tenth Embodiment Workstation Module (Triple Rail Twin Column H Module)

Figure 36:
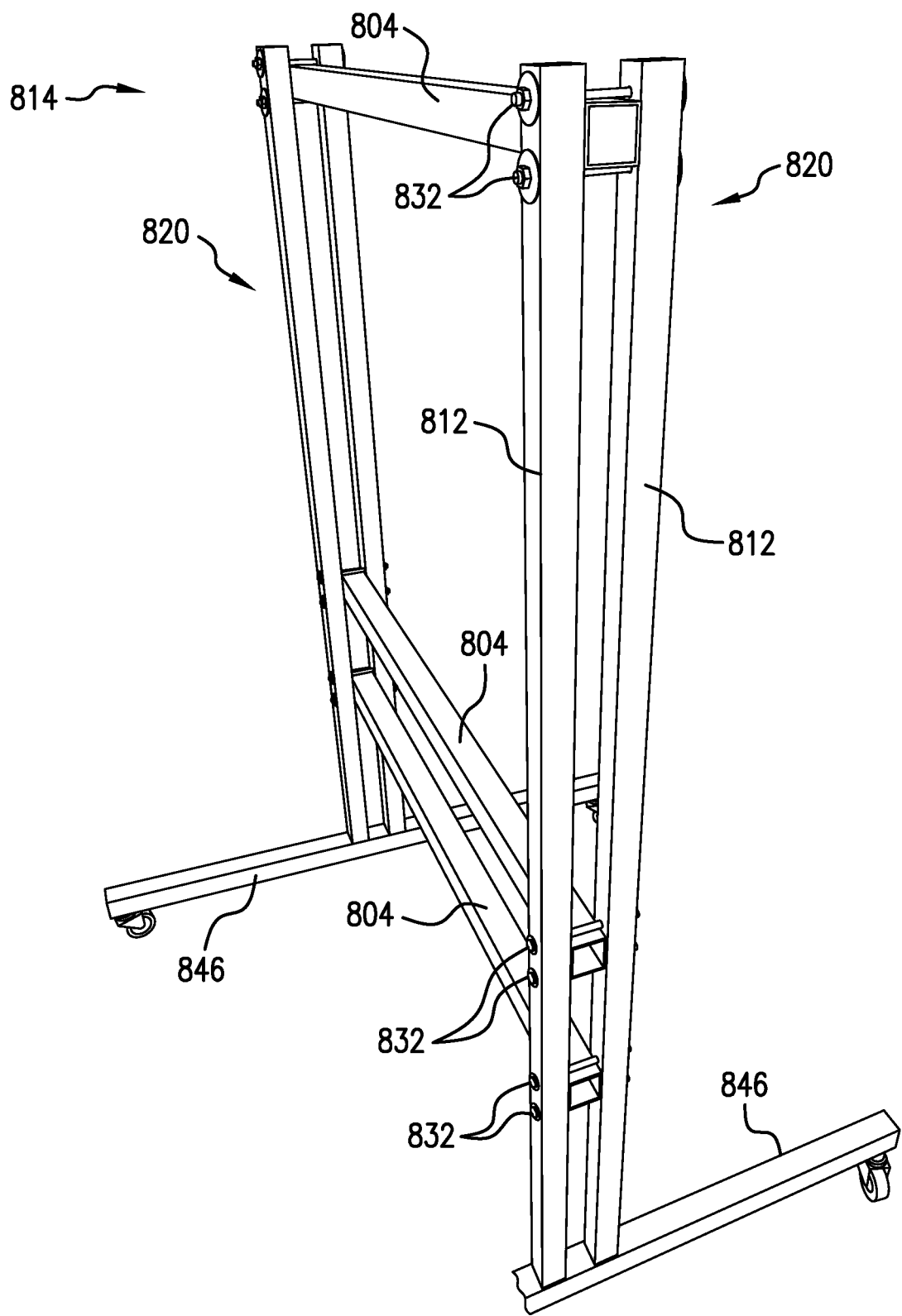
FIG. 36 shows a representative embodiment of a triple rail twin column H module.
Figure 37:
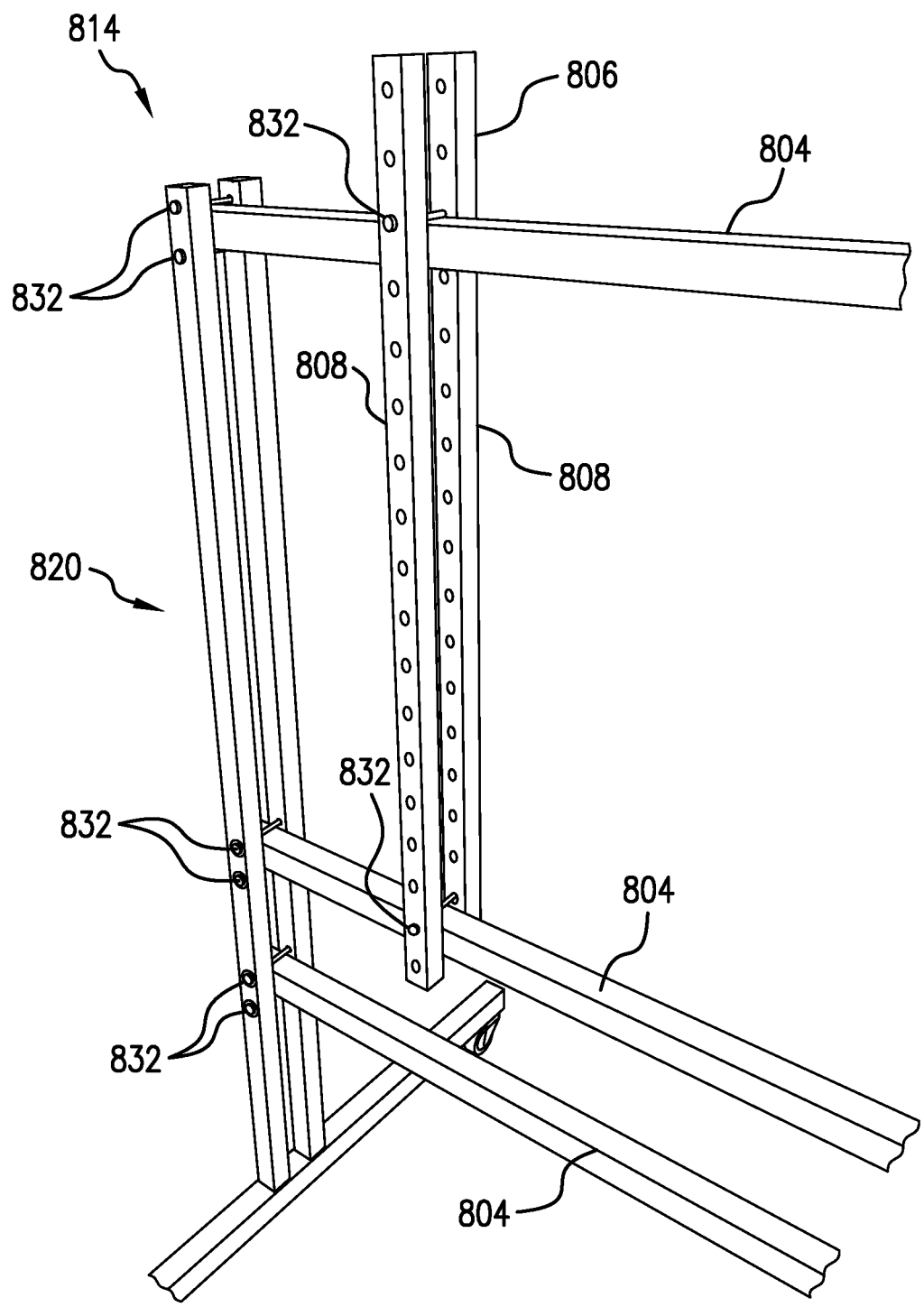
FIG. 37 shows the representative embodiment of a triple rail twin column H module with a floating twin column coupled thereto.

Another substructure for use with the Three-Dimensional Positioning and Holding Modular System is a triple rail twin column H module 814. FIG. 36 shows a representative embodiment of a triple rail twin column H module 814. The triple rail twin column H module 814 comprises two standing twin column modules 820 with three rails 804 coupled between them, two lower rails 804 and a high rail 804. The rails 804 are held in place by bolts 832 above and/or below each rail 804. Each of the rails 804 may rest on the bolt 832 below it and the rails 832 are pinched between the standing columns 812 when the bolts 832 are tightened. FIG. 37 shows the representative embodiment of a triple rail twin column H module 814 with a floating twin column 806 coupled thereto. The floating twin column 806 is structurally the same and functions the same as described in relation to the triple rail extended column H module 800.

Figure 40:
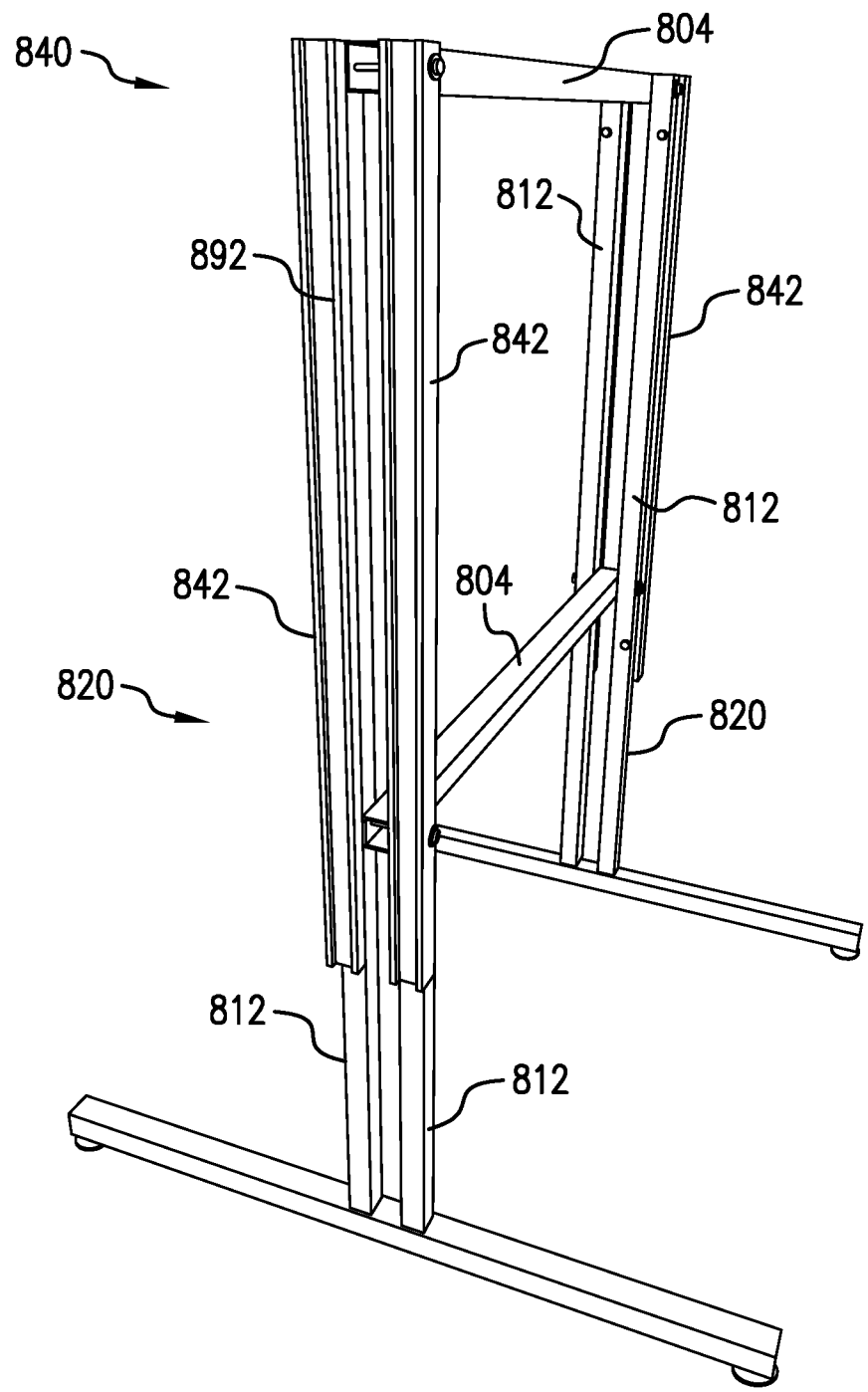
FIG. 40 shows a variant twin rail twin column H module.

FIG. 40 shows a variant twin rail twin column H module 840. This twin rail twin column H module 840 is similar to the triple rail twin column H module 814, but has only two rails 804, one low and one high. For some applications with less cantilevered loads, this will provide sufficient torsion resistance. An end column channel 842 is coupled to each of the standing columns 812 of each of the standing twin column modules 820. The end column channels 842 are oriented with the open front of the channels facing laterally outward. In some alternative embodiments, instead of end column channels 842, the standing columns 812 of the standing twin column module 820 are replaced with channels. The end column channels 842 are filled with nut retaining foam 892.

Figure 41:
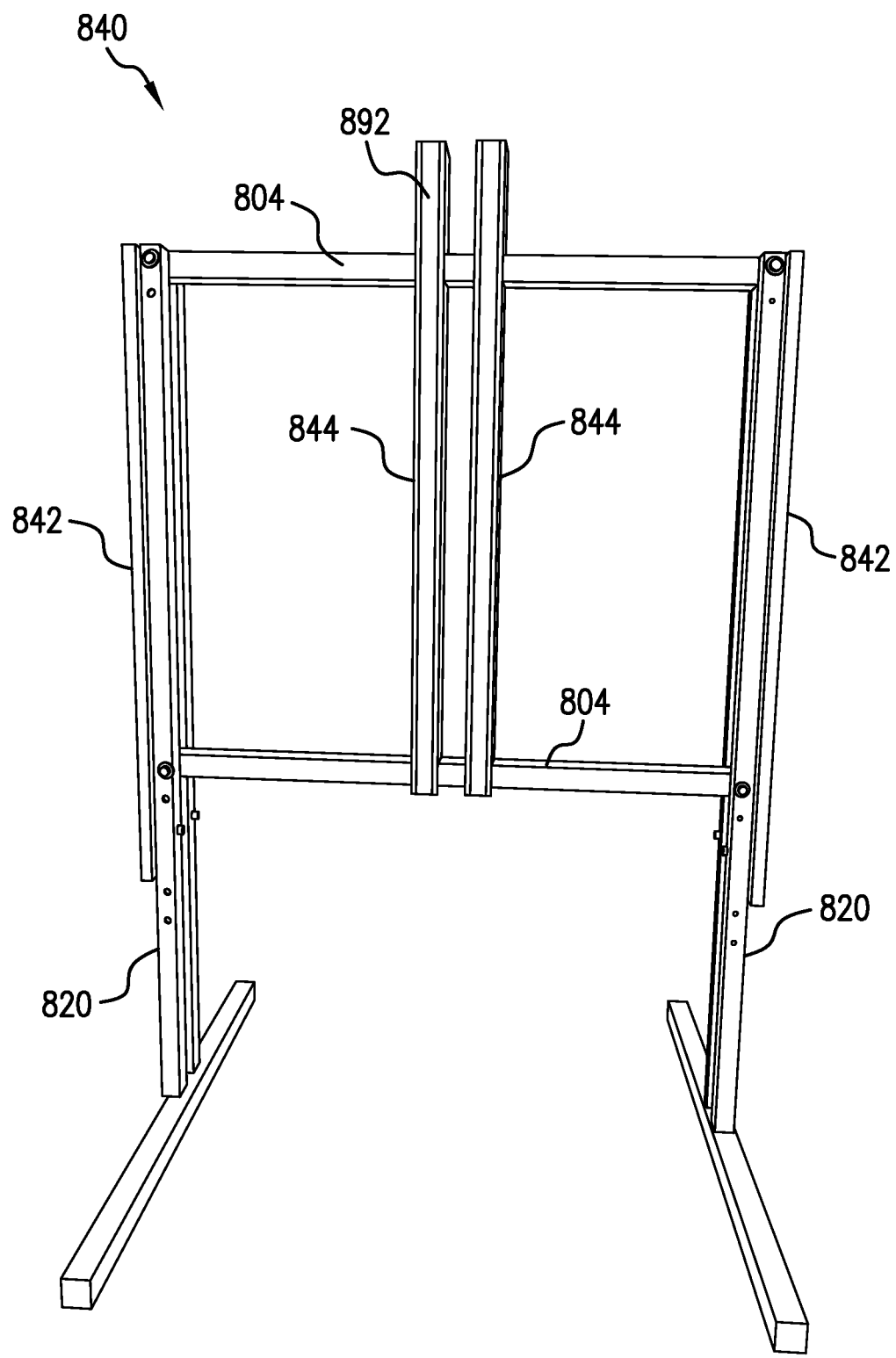
FIG. 41 shows the twin rail twin column H module with two floating twin outward facing channel column attached thereto.

FIG. 41 shows the twin rail twin column H module 840 with two floating twin outward facing channel column 844 attached thereto. Each floating twin outward facing channel column 844 comprises two channels coupled with bolts passing through bolt holes in the backs of the channels. When tightened, the bolts pinch the channels against the rails 804. Some of the bolts may also rest against the rails.

Winged Column and Standing Winged Column Module

Figure 38:
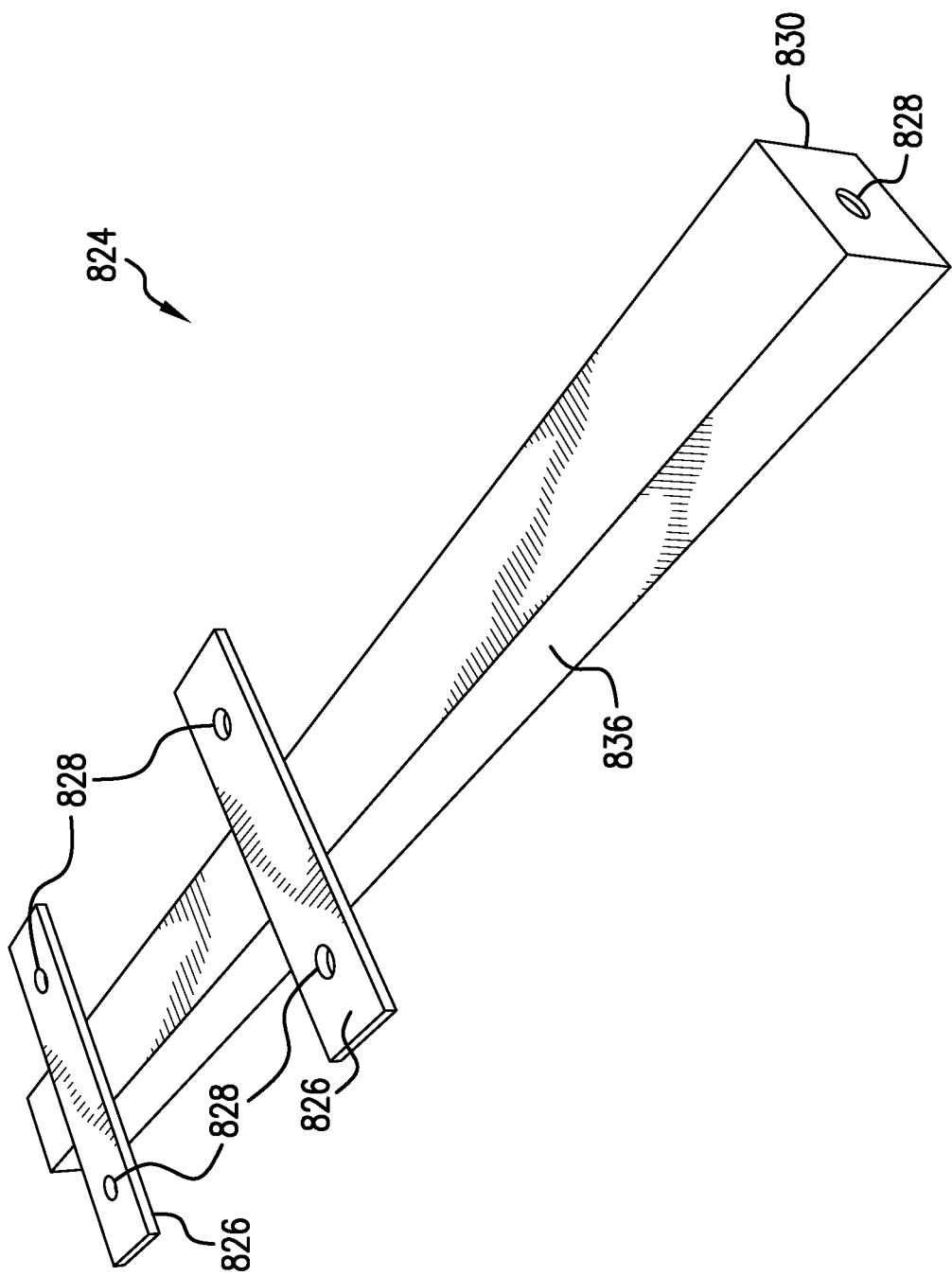
FIG. 38 shows a view of an embodiment of a winged column.

FIG. 38 shows a view of an embodiment of a winged column 824. The winged column 824 comprises a tube 836 with a bottom plate 830 couple to the bottom end, by welding or other suitable mechanism. The bottom plate 830 has bolt 832 that is threaded. Two wing plates 826 are coupled to the tube 836, by welding or other suitable mechanism. Each wing plate 826 has two bolt holes 828, one near each end of the wing plate 826. The wing plates 826 are positioned in parallel near the top of the tube 836, separated by at least a width of the tube 836 so that the rails 804 they will support have sufficient spacing to provide adequate torsion resistance.

Figure 39:
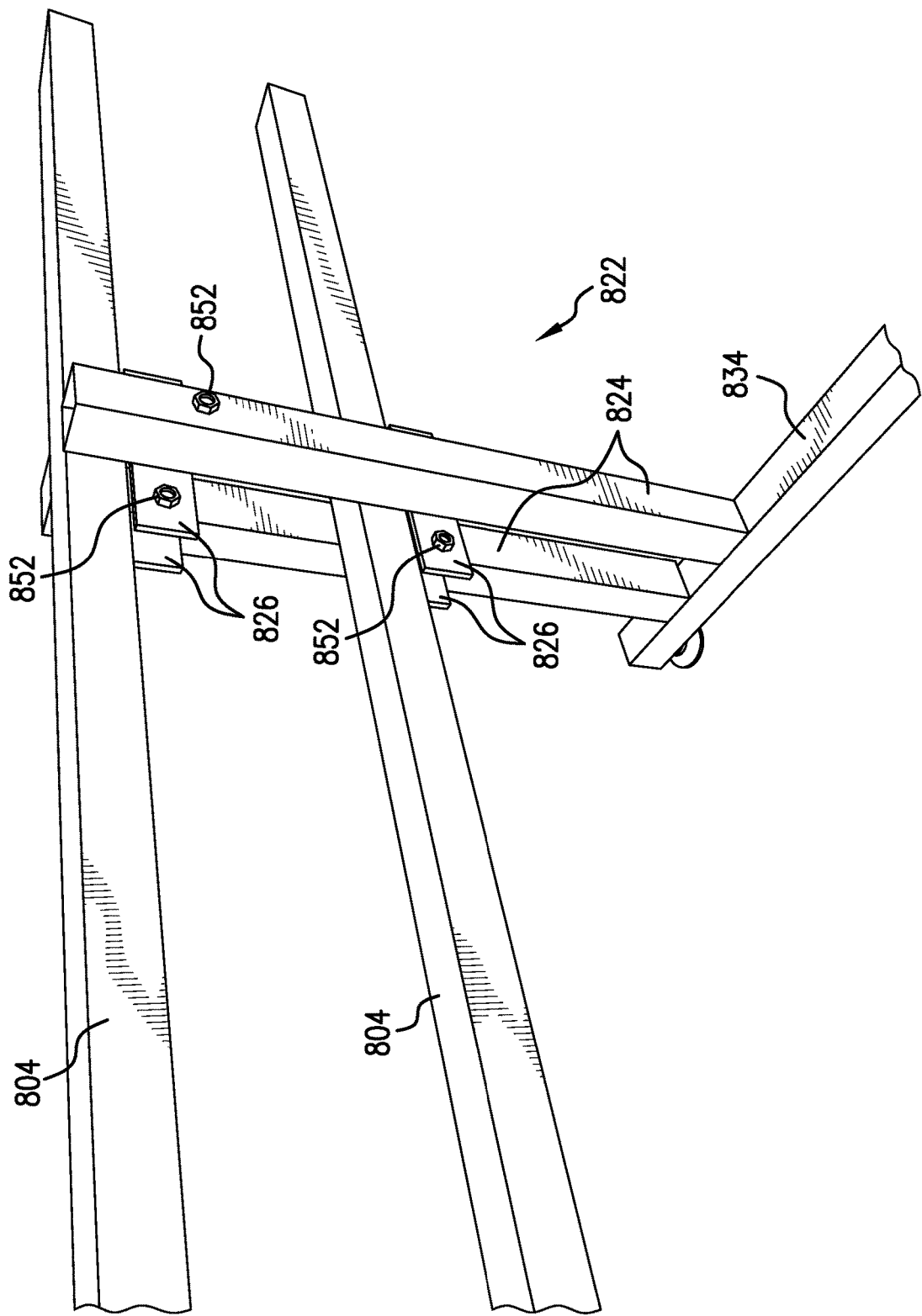
FIG. 39 shows a standing winged twin column module.

FIG. 39 shows a standing winged twin column module 822. The standing winged twin column module 822 comprises two winged columns 824 coupled to a horizontal leg 834. The horizontal leg 834 shown is offset, but in other embodiments may be balanced with an equal length on either side of the winged columns 824. The winged columns 824 are coupled to the horizontal leg 834 with bolts (not shown), but in other embodiments may be coupled by welding or other suitable mechanism. The winged columns 824 are coupled to the horizontal leg 834 with a space between the winged columns 824 that allows a rail 804 to fit between with a sliding fit. The standing winged twin column module 822 is configured to support two rails 804, a lower rail 804 resting on the lower pair of wing plates 826 and an upper rail resting on the upper pair of wing plates 826. The standing winged twin column module 822 has bolts 852 passed through the bolt holes 828 in the wing plates 826 that when tightened, pinch the rails 804 and hold them in place by friction force.

Triple Outward Facing Channel Column

Figure 44:
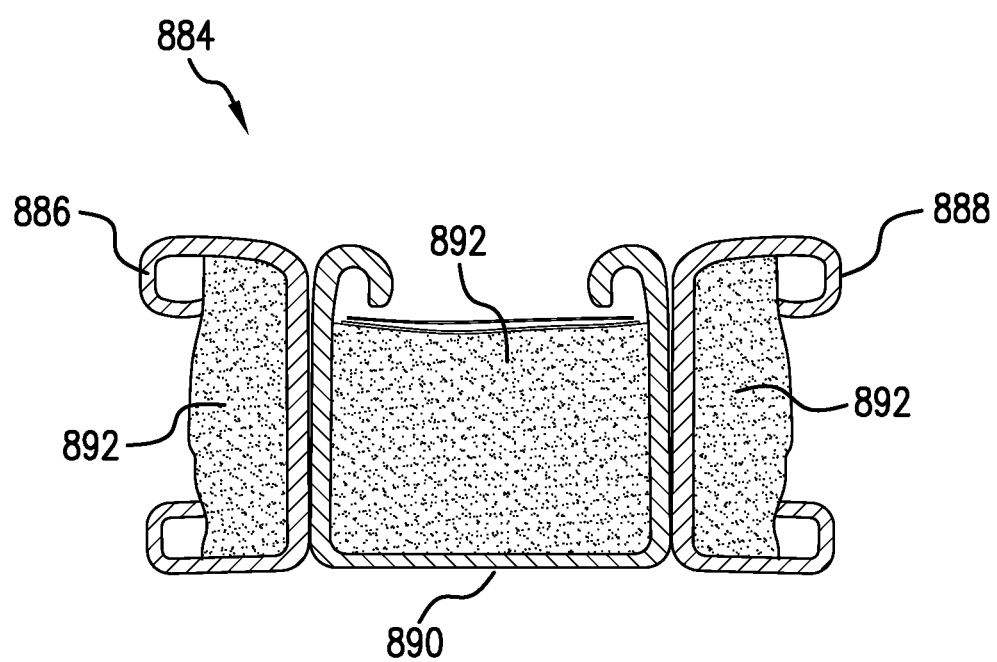
FIG. 44 shows a cross sectional view of an embodiment of a triple outward facing channel column.

FIG. 44 shows a cross sectional view of an embodiment of a triple outward facing channel column 884. The triple outward facing channel column 884 comprises a center channel 890 with a left channel 886 and a right channel 888 coupled thereto, typically by welding, but in other embodiments, by bolting or other suitable mechanism. The center channel 890, left channel 886 and right channel 888 are typically strut channels, each with lips curving into their respective channel opening, which themselves are typically filled with nut retaining foam 892. The center channel 890 is typically a perforated strut channel, similar to the perforated strut channel rail 922 in FIG. 50C or a slotted strut channel, similar to the slotted strut channel rail 920 in FIG. 50B. The left channel 886 and right channel 888 are typically half height strut channels, similar to the half-height strut channel 924 show in FIG. 50D. The triple outward facing channel column 884 has a top plate 894 and a bottom plate 896 coupled thereto, typically by welding (see FIG. 45). The bottom plate 896 typically has a plurality of bolt holes therein.

A standing triple outward facing channel column 874 can be made by taking the triple outward facing channel column 884 and coupling a horizontal leg 846 to the bottom plate 896 with a plurality of bolts 880, but in alternative embodiments, coupled by welding or other suitable mechanism. The triple outward facing channel column 884 is typically 48 inches in height from the top plate 894 to the bottom plate 896.

Eleventh Embodiment Workstation Module (Triple Channel Column Module)

Figure 45:
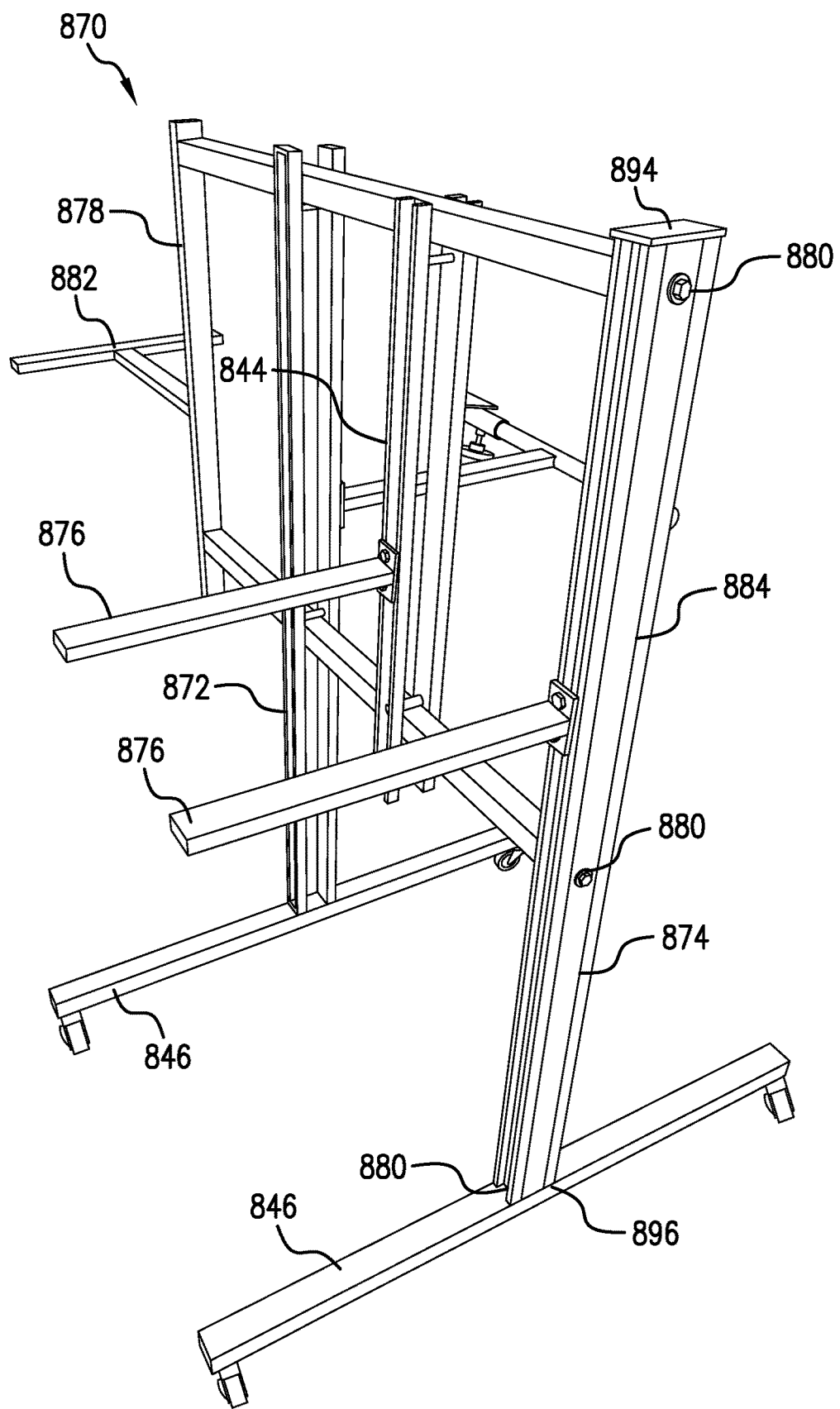
FIG. 45 shows a representative embodiment of a triple channel column module with various accessories attached thereto.

FIG. 45 shows a representative embodiment of a triple channel column module 870 with various accessories attached thereto. The triple channel column module 870 comprises a standing triple outward facing channel column 874 with two rails 804 each coupled orthogonally thereto. Typically, each of the rails 804 is coupled to the standing triple outward facing channel column 874 by a bolt 880 passing through the open front of the center channel 890 of the triple outward facing channel column 884 and then through a bolt hole in the back of the center channel 890 and through a bolt hole in an end plate of the rail 804. The rails 804 are coupled in parallel, one above the other, separated by a distance of at least one width of one of the rails 804. Typically, one rail 804 is near the top of the standing triple outward facing channel column 874 and the other rail 804 is 24 inches lower. The triple channel column module 870 further comprises an end channel 878 coupled to each of the opposite ends of the rails 804 by a bolt passing through the open front of the end channel 878 and then through a bolt hole in the back of the end channel 878 and through a bolt hole in an end plate of the rail 804.

The triple channel column module 870 is further supported by a standing twin outward facing channel column 872 clamped to the rails 804 by bolts. The standing twin outward facing channel column 872 comprises two channels, open fronts facing outward, the bottom ends of the channels coupled to a horizontal leg. Bolts pass through bolt holes 881 in the backs of the channels. The tightened bolts pinch the channels to the rails 804. The rails 804 rest on some of the bolts passing through the standing twin outward facing channel column 872, supporting the rails 804 and maintaining their vertical position. The bolts of the standing twin outward facing channel column 872 may be loosened and the standing twin outward facing channel column 872 slid along the rails 804 closer to or away from the end channel 878. This provides flexibility to the position of the standing twin outward facing channel column 872 so that it can be easily adapted to various spaces and uses.

When the standing twin outward facing channel column 872 is adjacent the end channel 878, the combination of the end channel 878 and the standing twin outward facing channel column 872 is almost functionally equivalent to the standing triple outward facing channel column 874, allowing attachment of accessories in three directions.

The triple channel column module 870 shown in FIG. 45 shows several accessories attached thereto. A support arm 876 is coupled to one of the side channels of the standing triple outward facing channel column 874. A "T" support arm 882 is coupled to the end channel 878. A floating twin outward facing channel column 844 is clamped to the rails 804 of the triple channel column module 870 and have a support arm 876 coupled to one of the channels of the floating twin outward facing channel column 844. The accessories are coupled with one or more bolts, each engaged with a strut nut inside the respective channel.

Twelfth Embodiment Workstation Module (Quad Mount Track Matrix)

Figure 46:
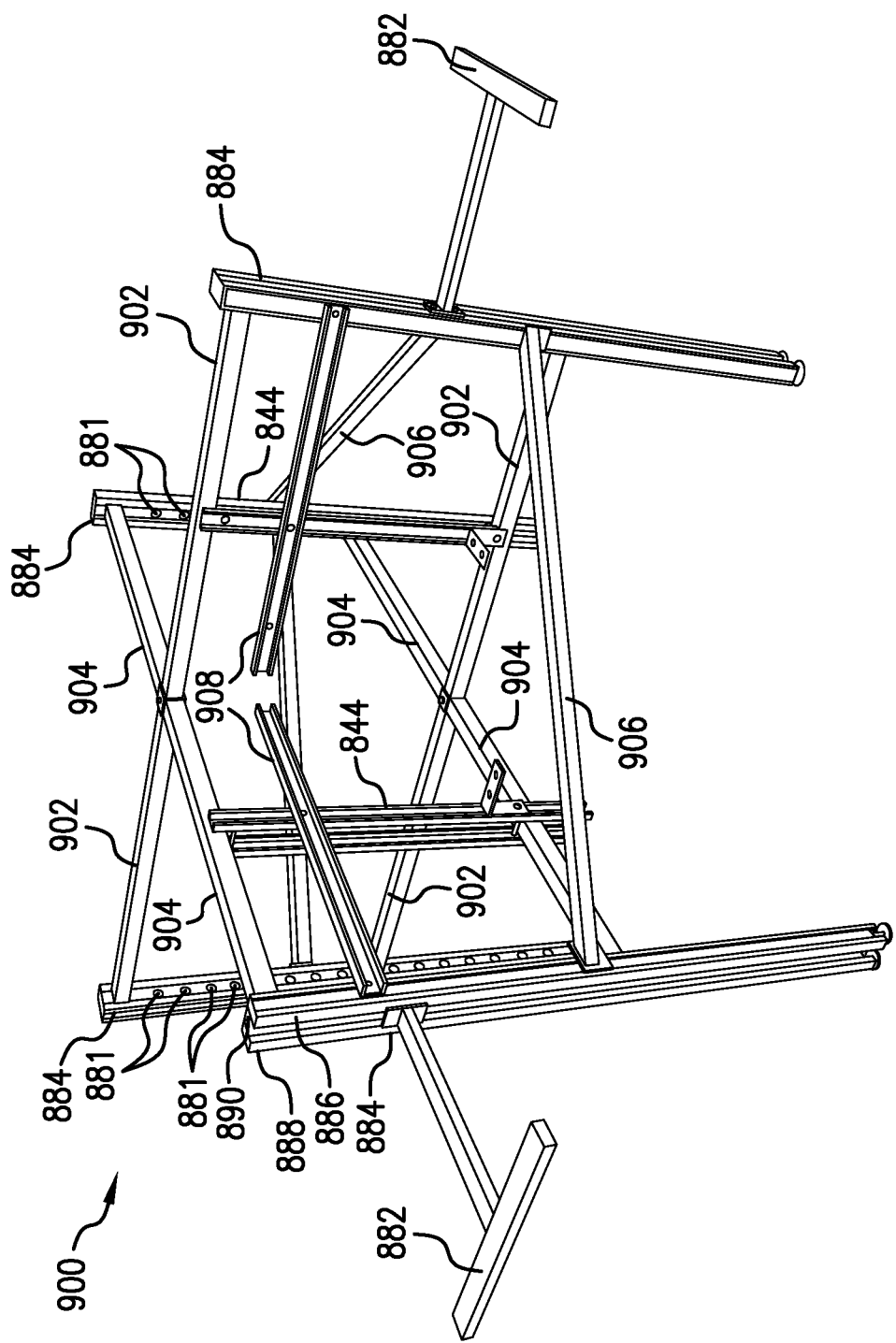
FIG. 46 shows a representative embodiment of a quad mount track matrix with various accessories attached thereto.

FIG. 46 shows a representative embodiment of a quad mount track matrix 900 with various accessories attached thereto. The quad mount track matrix 900 comprises four triple outward facing channel columns 884 arranged in a rectangle, coupled by various rails. The rails of the quad mount track matrix 900 include upper and lower cross rails 902 with ends coupled to a first triple outward facing channel columns 884 and a second triple outward facing channel column 884 on an opposite corner of the rectangle. Upper and lower center sleeve rails 904 couple a third triple outward facing channel column 884 to a fourth triple outward facing channel column 884. A sleeve in the center of each center sleeve rail 904 allows the upper and lower cross rails 902 to respectively pass through the upper and lower center sleeve rails 904. The lower cross rails 902 and lower center sleeve rails 904 are typically coupled half way up the triple outward facing channel columns 884, and the upper cross rails 902 and upper center sleeve rails 904 are typically coupled to the tops of the triple outward facing channel columns 884. A set of four lateral rails 906 connect adjacent triple outward facing channel columns 884 to each other. The lateral rails 906 have angled end plates to match the angle they meet the side channels of the triple outward facing channel columns 884. The lateral rails 906 are typically coupled to the triple outward facing channel columns 884 just above the lower cross rails 902. All the triple outward facing channel column 884 are coupled to various rails with bolts passing through bolt holes in end plates of the rails and engaging with strut nuts in the respective channels of the triple outward facing channel columns 884.

The quad mount track matrix 900 in FIG. 46 is shown with two floating twin outward facing channel columns 844, one clamped to the cross rails 902 and the other clamped to the center sleeve rails 904. Two lateral outward facing channel 908, are each coupled to their respective floating twin outward facing channel column 844 and triple outward facing channel column 884 with bolts and strut nuts in the respective channels. The floating twin outward facing channel column 844 and the lateral outward facing channels 908 provide locations to attach accessories in the interior of the quad mount track matrix 900. Two T support arms 882 are shown, coupled to different triple outward facing channel columns 884.

Figure 47:
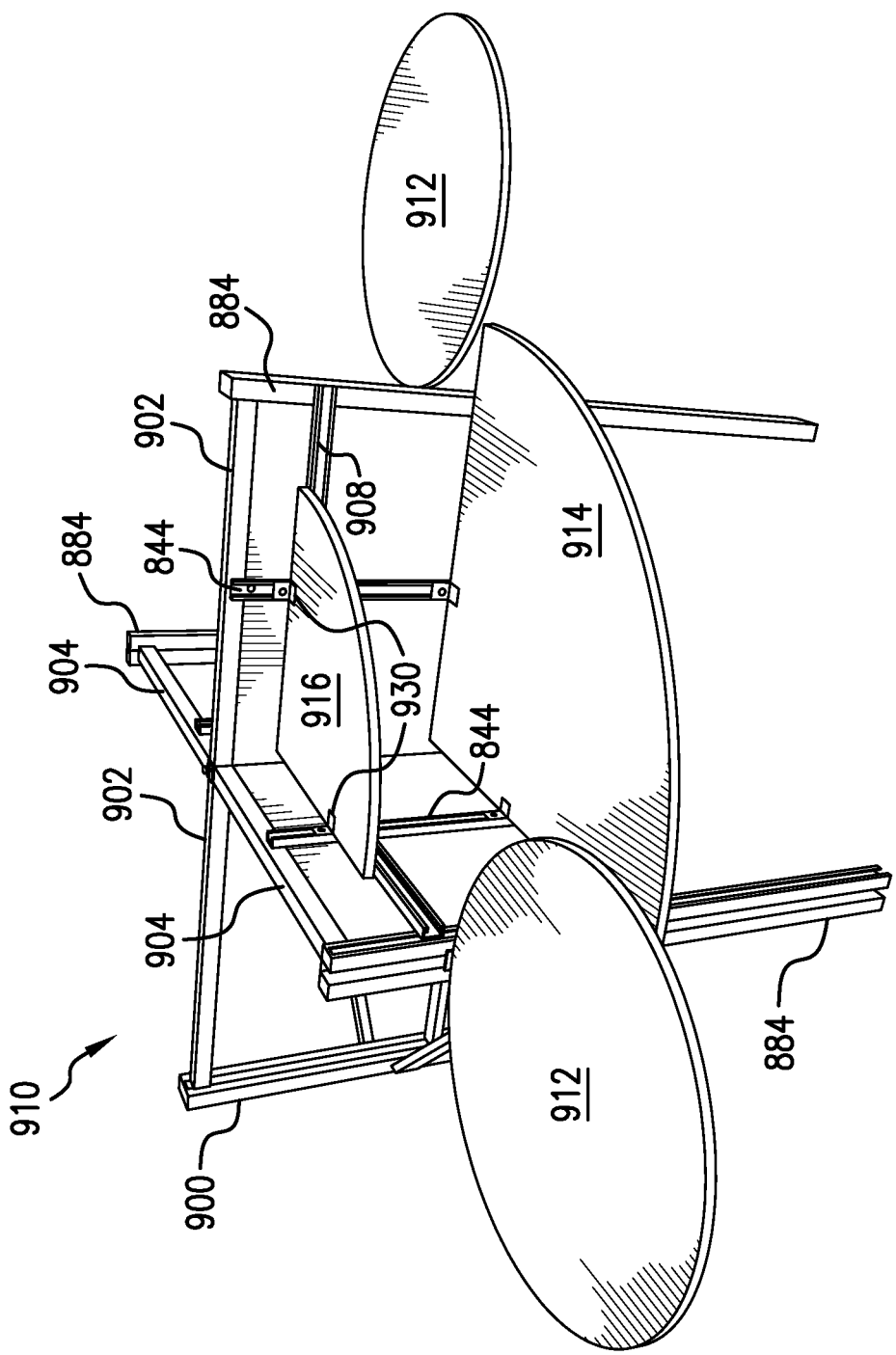
FIG. 47 shows a mount track matrix work station.

FIG. 47 shows a mount track matrix work station 910. This is a simple application of the quad mount track matrix 900. An upper quadrant table top 916 rests on the lateral outward facing channels 908 and is held in place by L brackets 930 coupled to the floating twin outward facing channel columns 844 with bolts and strut nuts. A lower quadrant table top 914 rests on one of the lateral rails 906 and is held in place above and below by L brackets 930 coupled to the floating twin outward facing channel columns 844 with bolts and strut nuts. Two circular table tops 912 are shown that are coupled to the respective T support arm 882, typically with screws.

Thirteenth Embodiment Workstation Module
(Triangle Mount Track Matrix)

Figure 51:
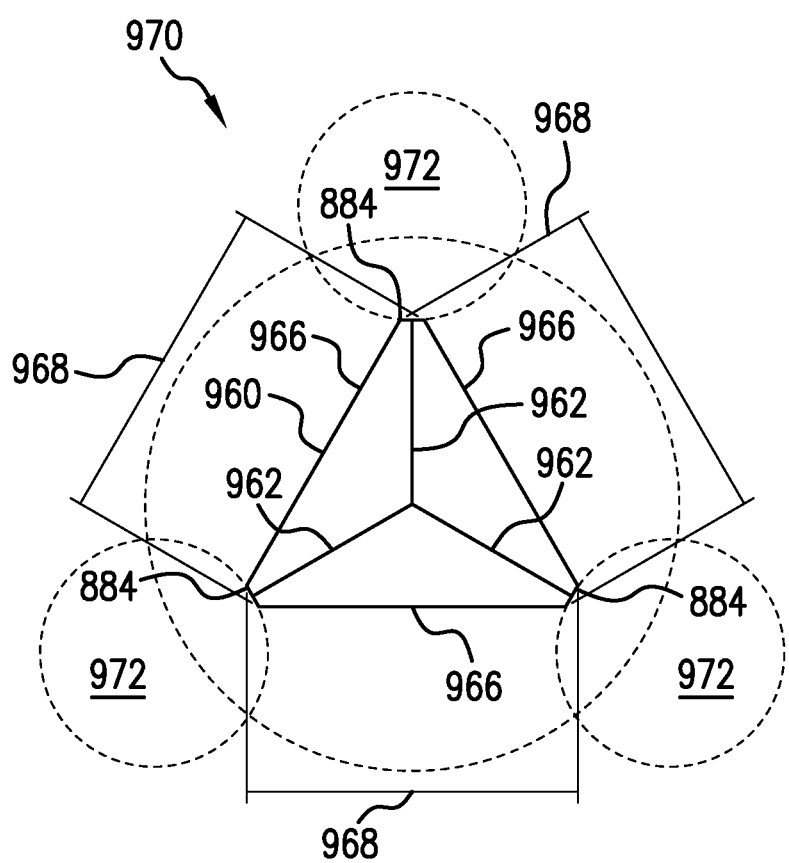
FIG. 51 shows a representative embodiment of a triangle mount track matrix work station with a triangle mount track matrix and various accessories attached thereto.

FIG. 51 shows a representative embodiment of a triangle mount track matrix work station 970 with a triangle mount track matrix 960 and various accessories attached thereto. The triangle mount track matrix 960 comprises 3 triple outward facing channel columns 884 arranged in a triangle, coupled by various rails. The rails of the triangle mount track matrix 960 include three upper and three lower cross rails 962. The three upper cross rails 962 are joined in the center with ends coupled to the outward facing channel columns 884. The three lower cross rails 962 are coupled in a similar manner on a level below the upper cross rails 962. The lower cross rails 962 are typically coupled half way up the triple outward facing channel columns 884, and the upper cross rails 962 are typically coupled to the tops of the triple outward facing channel columns 884. A set of three lateral rails 906 connect adjacent triple outward facing channel columns 884 to each other. The lateral rails 966 have angled end plates to match the angle they meet the side channels of the triple outward facing channel columns 884. The lateral rails 966 are typically coupled to the triple outward facing channel columns 884 just above the lower cross rails 962. All the triple outward facing channel column 884 are coupled to various rails with bolts passing through bolt holes in end plates of the rails and engaging with strut nuts in the respective channels of the triple outward facing channel columns. The triangle mount track matrix work station 970 has three circular table tops 972, each coupled to one of the triple outward facing channel columns 884 with T support arms 882 and three rectangular table tops 968 each coupled to one of the lateral rails 966 with T support arms 882.

Fourteenth Embodiment Workstation Module (Gap Column H Module)

Figure 52:
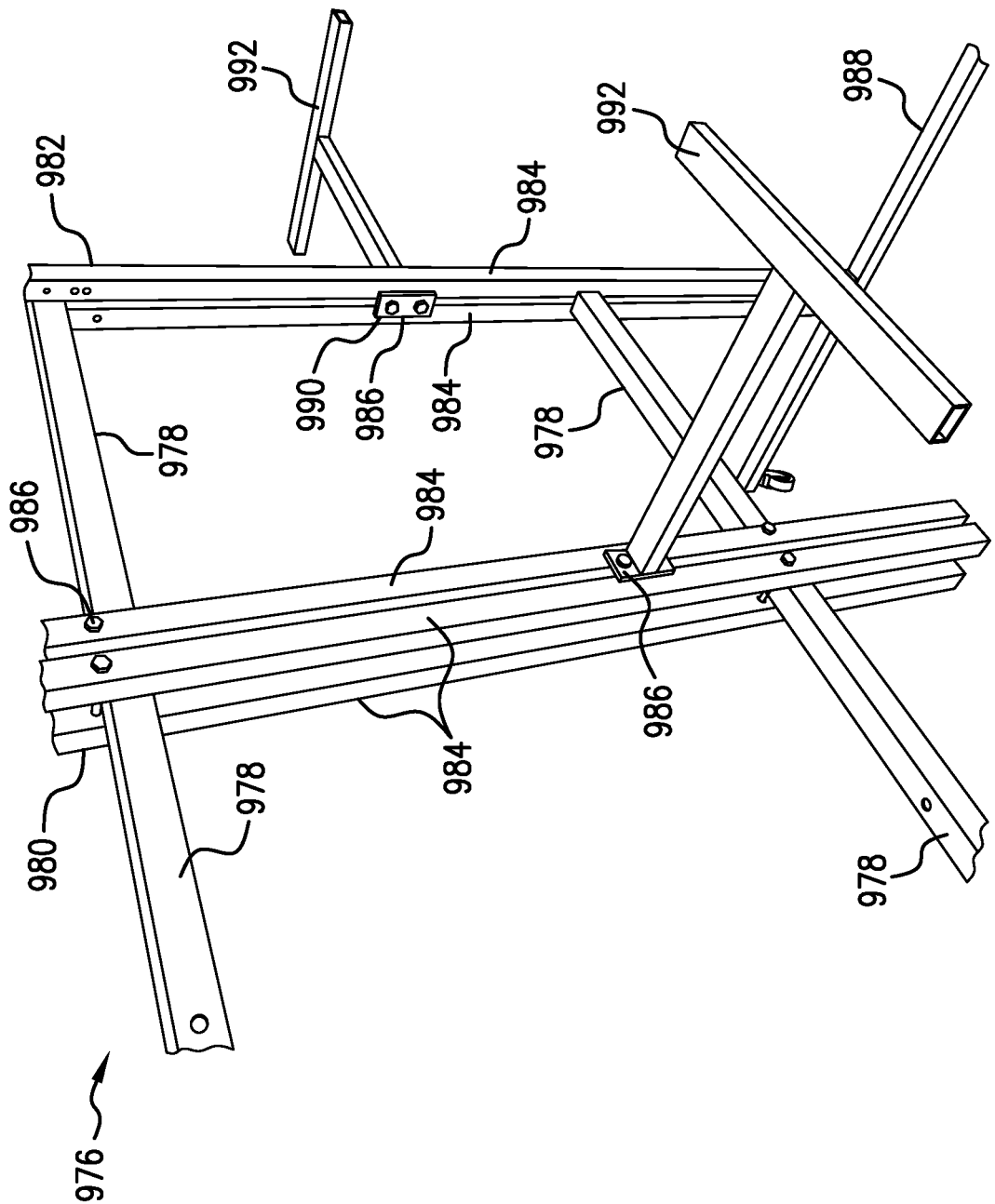
FIG. 52 shows a representative embodiment of a gap column H module.

Another substructure for use with the Three-Dimensional Positioning and Holding Modular System is a gap column H module 976. FIG. 52 shows a representative embodiment of a gap column H module 976. The gap column H module 976 comprises two standing gap column modules 982 (only one shown) with two rails 978 coupled between them. The standing gap column modules 982 each comprise two tubes 984 coupled to a horizontal leg 988 with a gap between the two tubes 984 (column gap). The gap is just wide enough to slip a standard bolt through, about ⅜ inch across, but in other embodiments may be wider or narrower. The rails 978 have end plates with threaded bolt holes. The rails 978 are held in place by bolts 986 passing through a bolt plate (not shown) on the outside of the standing gap column module 982, passing the gap in the tubes 984 and engaging with the bolt holes in the end plates of the rails 978.

A floating quad column 980 is coupled to gap column H module 976. The floating quad column 980 comprises four tubes 984. The tubes 984 do not have contact with the ground, hence the "floating." Two of the tubes 984 are positioned on the front side of the rails 978 with a gap between them and two tubes 984 are positioned on the back side with a similar gap between them. Each of the two front side tubes 984 have bolts 986 passing through them and through the corresponding back side tube 984. The tubes 984 of floating quad column 980 pinch the rails 978 between them when their associated bolts 986 are tightened. The bolts 986 may rest on the rails 986. The floating quad column 980 provides additional torsion resistance to gap column H module 976.

A first T support arm 992 is coupled to the standing gap column module 982. The T support arm 992 has an end plate with two bolt holes through which two bolts 986 pass. The bolts 986 then pass through the gap between the tubes 984 of the standing gap column module 982, then engage with the threaded bolt holes in the bolt plate 990. A second T support arm 992 is coupled to the floating quad column 980. The T support arm 992 has an end plate with two bolt holes through which two bolts 986 pass. The bolts 986 then pass through the gap between the tubes 984 of the floating quad column 980, then engage with the threaded bolt holes in the bolt plate 990.

Arms and Positioning Holders

The Three-Dimensional Positioning and Holding Modular System includes positioning holders for holding workstation accessories such as table tops, lighting fixtures, cabinets, tool holders, computer monitors, etc. Positioning holders for use with the Three-Dimensional Positioning and Holding Modular System are configured for attaching to rails 504 or modules (e. g. an open quad rail-arm-leg module 530). The positioning holders typically are configured to allow repositioning of the accessory and in some cases, of the positioning holder itself. Some of the positioning holders hold accessories directly, but most do so indirectly though arms 544 that attach directly to the positioning holder. Objects are attached by bolting, pinning, clamping, telescoping, clipping (plastics), wedging or nesting.

The arms 544 in the Three-Dimensional Positioning and Holding Modular System are shaped and sized to have a sliding fit when inserted into the top opening of the columns 532 (or 752) of any of the rail-arm-leg modules (e.g. 530, 730, 750) or any the positioning holders as described herein. (See e.g. FIGS. 16, 23, 24, 30, 31A, 31B). The arms 544 typically have a rectangular cross-section, but may have a circular cross-section, or a cross-section of some other shape. Once inserted and in a desired position, an arm 544 is held in that position with a set screw 552 (See e.g. FIGS.

16, 24) engaged with a threaded hole 516 in the rail support arm bracket 542 or open quad rail-arm-leg module 530. Alternative embodiments may have other suitable mechanisms for locking the arm 544 in position.

Figure 14:
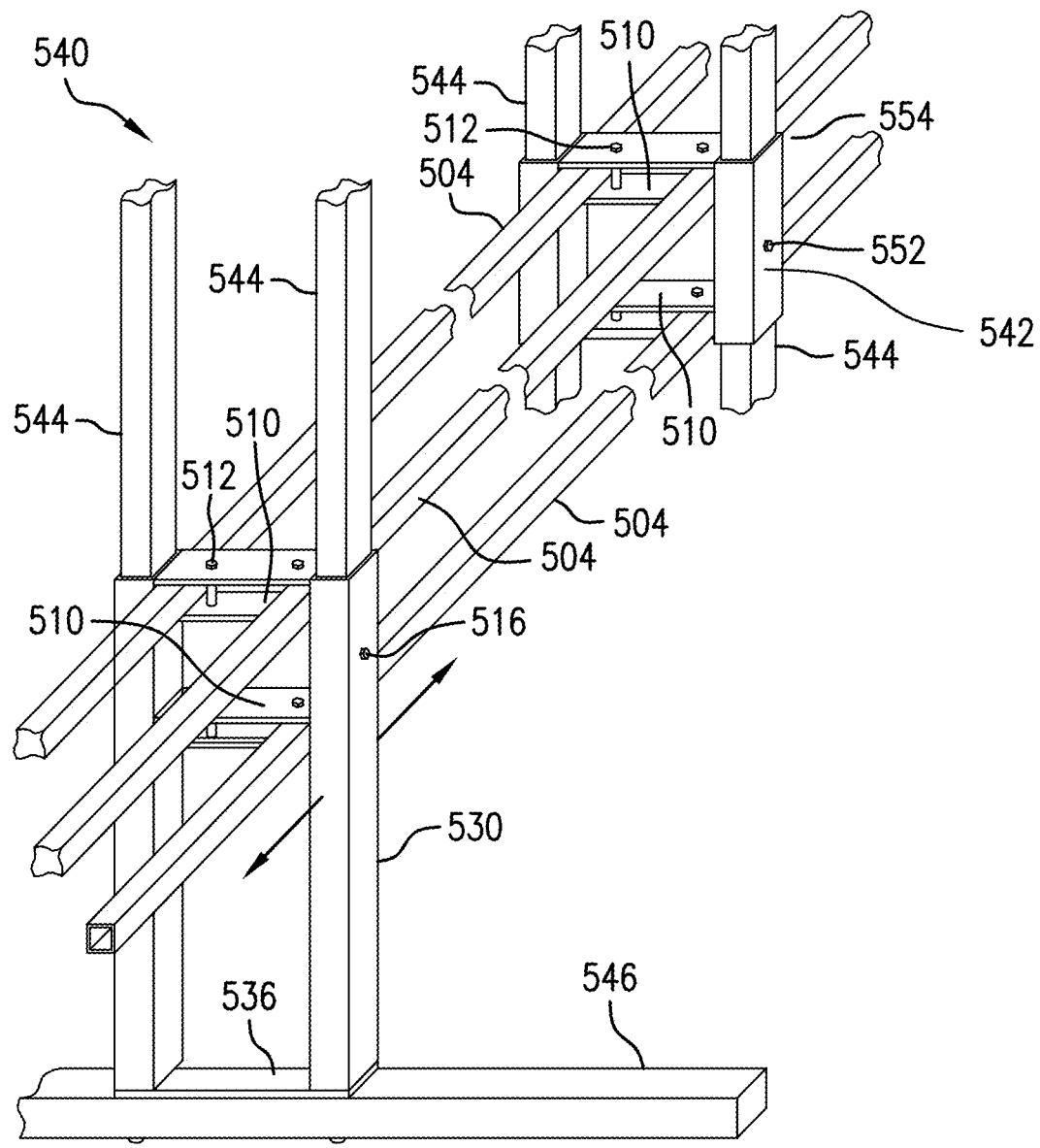
FIG. 14 shows part of a first embodiment workstation module with arms attached and a rail support arm bracket.

FIG. 14 shows a rail support arm bracket 542 attached to the rails 504 of a quad-rail beam 500 with arms 544 inserted into the rail support arm bracket 542 and into open ends of the columns 532 of a quad rail-arm-leg module 530. The rail support arm bracket 542 has a function similar to that of the rail support bracket 508, providing support to the rails 504, but additionally has the function of providing attachment points for arms 544. The top and bottom of the rails and arm support bracket 542 have fastener holes 514 for fasteners 512 to pass through, as in the rail support bracket 508, but the sides are arm tubes 554, shaped and sized to provide a sliding fit with the arms 544 to be used with them. Once inserted and in a desired position, an arm 544 is held in that position with a set screw 552 turned into a threaded hole in the side of the rail support arm bracket 542. Alternative embodiments may have other suitable mechanisms for locking the arm 544 in position. The rail support arm bracket 542 may be used at a part of the H module 540 where arms are desired, but horizontal legs 546 are not.

Figure 15A:
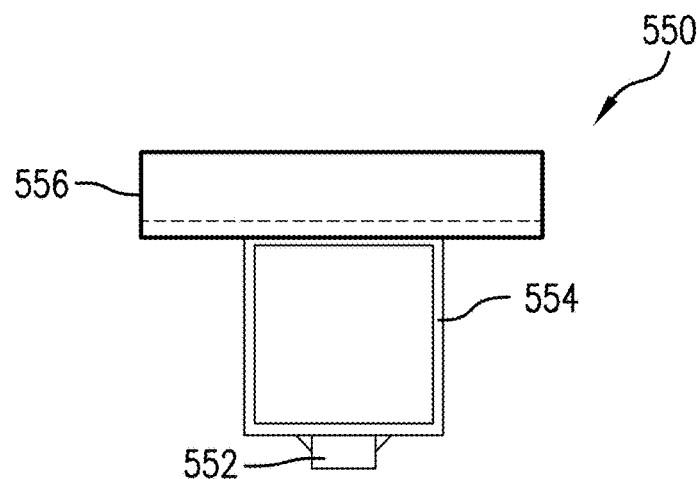
FIGS. 15A, 15B, and 15C respectively show top, front, and side views of a side mount clamp-on arm bracket.
Figure 15B:
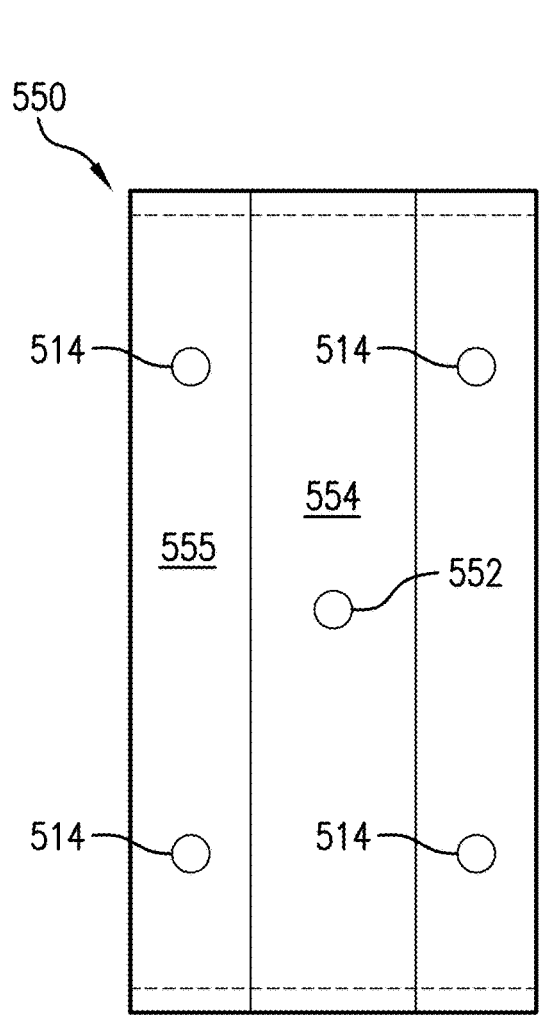
Figure 15C:
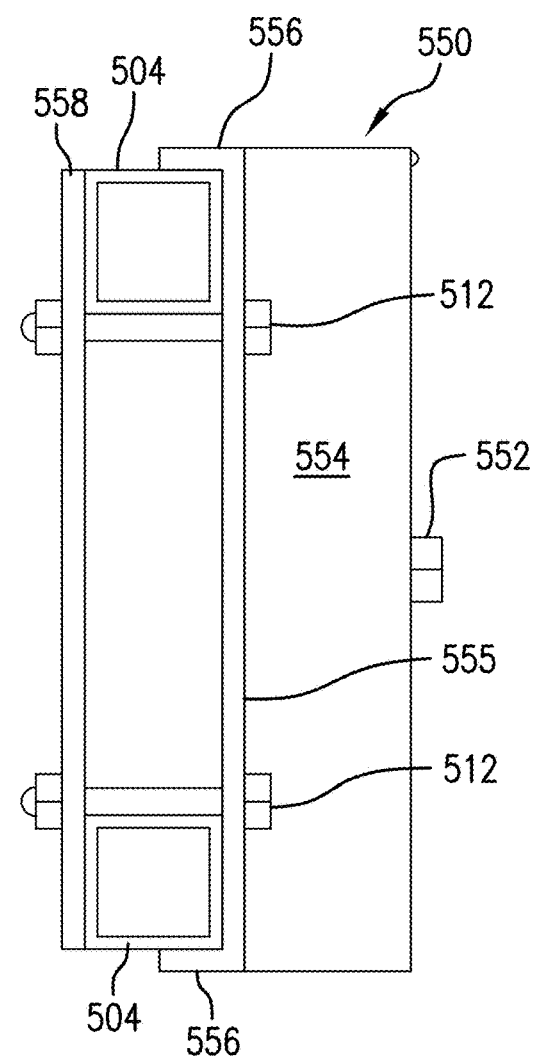

A side mount clamp-on arm bracket 550 is another positioning holder for use with the Three-Dimensional Positioning and Holding Modular System. FIGS. 15A, 15B, and 15C respectively show top, front, and side views of a side mount clamp-on arm bracket 550. The side mount clamp-on arm bracket 550 comprises an arm tube 554 coupled to an arm bracket plate 555. The arm bracket plate 555 is configured to clamp onto two parallel rails 504 of a quad-rail beam 500, a twin rail beam 720, or one of the workstation modules. The arm bracket plate 555 has two arm bracket lips 556 that are sized and positioned to match the distance across the rails and hold the side mount clamp-on arm bracket 550 onto the rails 504. The arm bracket plate 555 has a plurality of fastener holes 514. Fasteners 512 may pass to these fastener holes 514 and through matching fastener holes 514 in a clamp plate 558 to secure the side mount clamp-on arm bracket 550 to the rails 504. The arm tube 554 is shaped and sized to provide a sliding fit to the arms 544 to be used with it. The arm tube 554 has a set screw 552 coupled thereto, which is configured to hold in position an arm 544 that has been inserted into the arm tube 554.

Figure 16:
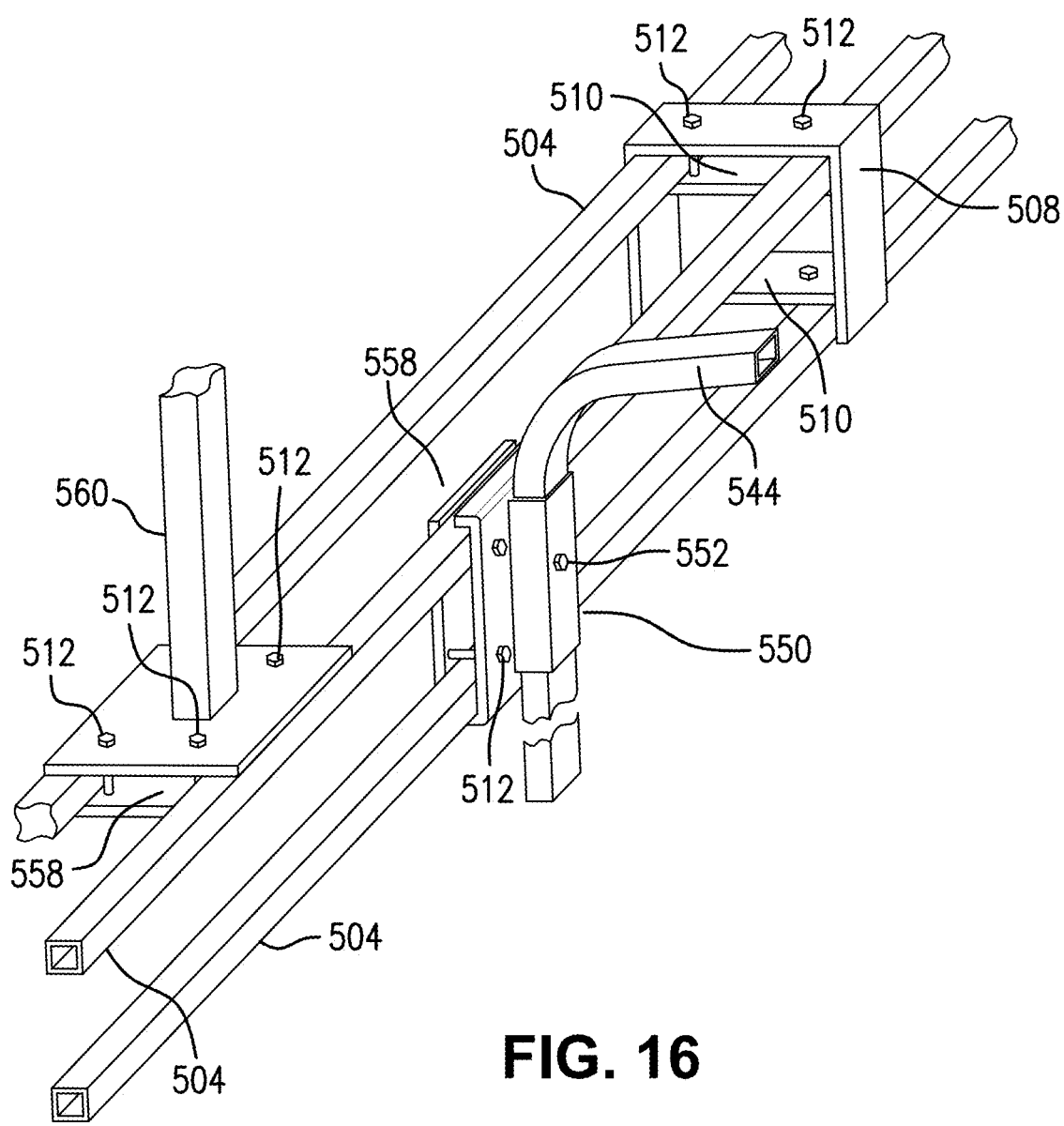
FIG. 16 shows various brackets for use with the first representative embodiment quad-rail beam or first embodiment workstation module.

FIG. 16 shows various positioning holders, including the side mount clamp-on arm bracket 550 and the rail support bracket 508, discussed elsewhere herein, and a top mount clamp-on arm bracket 560 for use with one of the quad-rail beams. The top mount clamp-on arm bracket 560 is configured to attach to the top side of two rails 504 with a clamp plate 558. The top mount clamp-on arm bracket 560 is intended to support work station accessories computer monitors, tool holders, light fixtures, etc. The top mount clamp-on arm bracket 560 may have a solid bar extending up from the clamp plate or may have an arm tube 554 extending up from the clamp plate.

Figure 17:
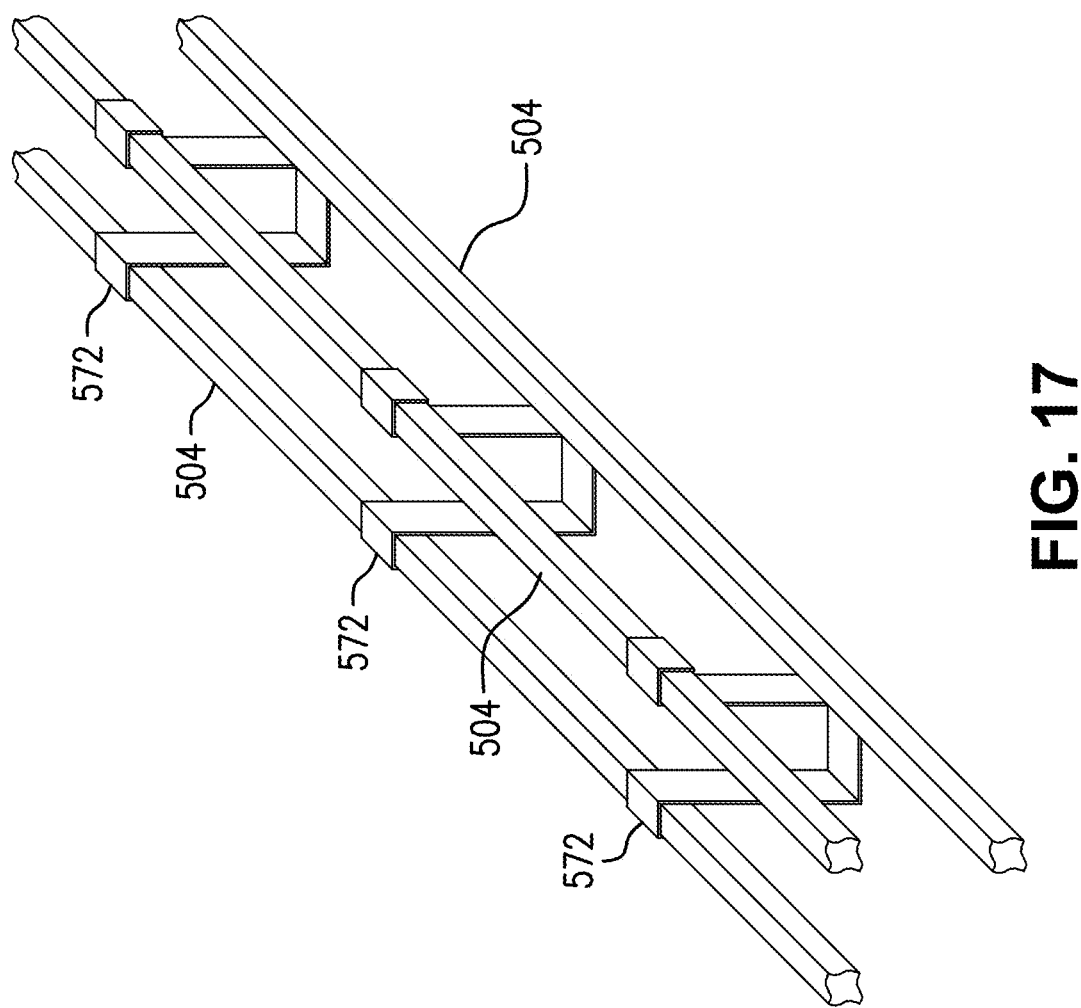
FIG. 17 shows quad rail cable cradles for use with the quad-rail beam or the workstation module.

A quad rail cable cradle 572 is another type of positioning holder for use with the Three-Dimensional Positioning and Holding Modular System. FIG. 17 shows several quad rail cable cradles 572 attached to the top two rails 504 of a quad-rail beam 500 or one of the workstation module embodiments. The quad rail cable cradles 572 insert between the rails 504 clip onto the rails 504. Typically, a quad rail cable cradle 572 has a sliding fit on the rails 504 and is held in place primarily by gravity, but other quad rail cable cradles 572 may have a tighter fit to hold them in place. Power and communications cables may be run to workstation accessories using the quad rail cable cradles 572.

An S clip mounting 614 is another type of positioning holder for use with the Three-Dimensional Positioning and Holding Modular System. FIG. 18 shows an S clip mounting 614 comprising two S clips 590 and a rail mount plate 588. The two S clips 590 each have a fastener hole 514 and the rail mount plate 588 has two corresponding fastener holes 514 positioned within the rail mount plate 588. When S clips 590 are position on opposing surfaces of two parallel rails 504 of a quad-rail beam 500, a twin rail beam 720 or one of the workstation modules, the fastener holes 514 of the rail mount plate 588 line up with the fastener holes 514 of the S clips 590. A fastener 512 is passed through each of the fastener holes 514 of the rail mount plate 588 and through the fastener hole 514 of the corresponding S clip 590. The S clips 590 and the rail mount plate 588 pinch the two parallel rails 504 between them, holding the s clip mounting 614 securely in place. The rail mount plate 588 may have accessories attached directly thereto, or indirectly via other positioning holders attached to the rail mount plate 588. The fastener 512 may be a rivet, a threaded cap screw and nut or other appropriate type of fastener. The fastener holes 514 are typically unthreaded but may be threaded.

A channel-to-rail mounting 616 is another type of positioning holder for use with the Three-Dimensional Positioning and Holding Modular System. FIG. 19 shows a channel-to-rail mounting 616 comprising a channel bar 618 and a rail mount plate 588. Two fastener holes 514 positioned within the rail mount plate 588 such that when two fasteners 512 are passed through the two fastener holes 514, the two fasteners 512 contact opposing surfaces of two parallel rails 504 of a quad-rail beam 500, a twin rail beam 720 or one of the workstation modules. The fasteners 512, which are threaded, engage with a strut-nut within the channel of the channel bar 618. The channel bar 618 and the rail mount plate 588 pinch the two parallel rails 504 between them, holding the channel-to-rail mounting 616 securely in place. The rail mount plate 588 may have accessories attached directly thereto, or indirectly via other positioning holders attached to the rail mount plate 588.

A single drop-on rail clip bracket 602 is another type of positioning holder for use with the Three-Dimensional Positioning and Holding Modular System. FIG. 20 shows a single drop-on rail clip bracket 602 comprising an arm tube 554 coupled with two tube nesting brackets 604. Each tube nesting bracket 604 comprises two plates coupled at right angles. The single drop-on rail clip bracket 602 is configured so that it can be dropped onto a set of two parallel rails 504 of a quad-rail beam 500, a twin rail beam 720 or one of the workstation modules, where one rail 504 is positioned over the other rail 504. Each of the two rails 504 enters a space created between one of the two tube nesting brackets 604 and the arm tube 554 with a sliding fit (or looser). Each tube nesting bracket 604 rests on the top of its respective rail 504. The single drop-on rail clip bracket 602 is held in place by gravity alone, although in some alternative embodiments, one or both of the tube nesting brackets 604 has a threaded fastener hole and set screw to hold the single drop-on rail clip bracket 602 in place. The single drop-on rail clip bracket 602 function and purpose is similar to that of the side mount clamp-on arm bracket 550 (See FIGS. 15A-15C), but with a different way of mounting to the rails 504. The arm tube 554 is shaped and sized to provide a sliding fit to the arms 544 to be used with it. The arm tube 554 may have a threaded fastener hole with a set screw, which is configured to hold in position an arm 544 that has been inserted into the arm tube 554. The single drop-on rail clip bracket 602 may also be configured so that it can be dropped onto the two parallel rails 504 of a twin rail beam 720. In which case, the single drop-on rail clip bracket 602 may have fastener holes 514 in the tube nesting bracket 604 to match up with the fastener holes 514 in the rails 504 of the twin rail beam 720, allowing a fastener to pass through and couple the single drop-on rail clip bracket 602 to the rails 504.

Figure 23:
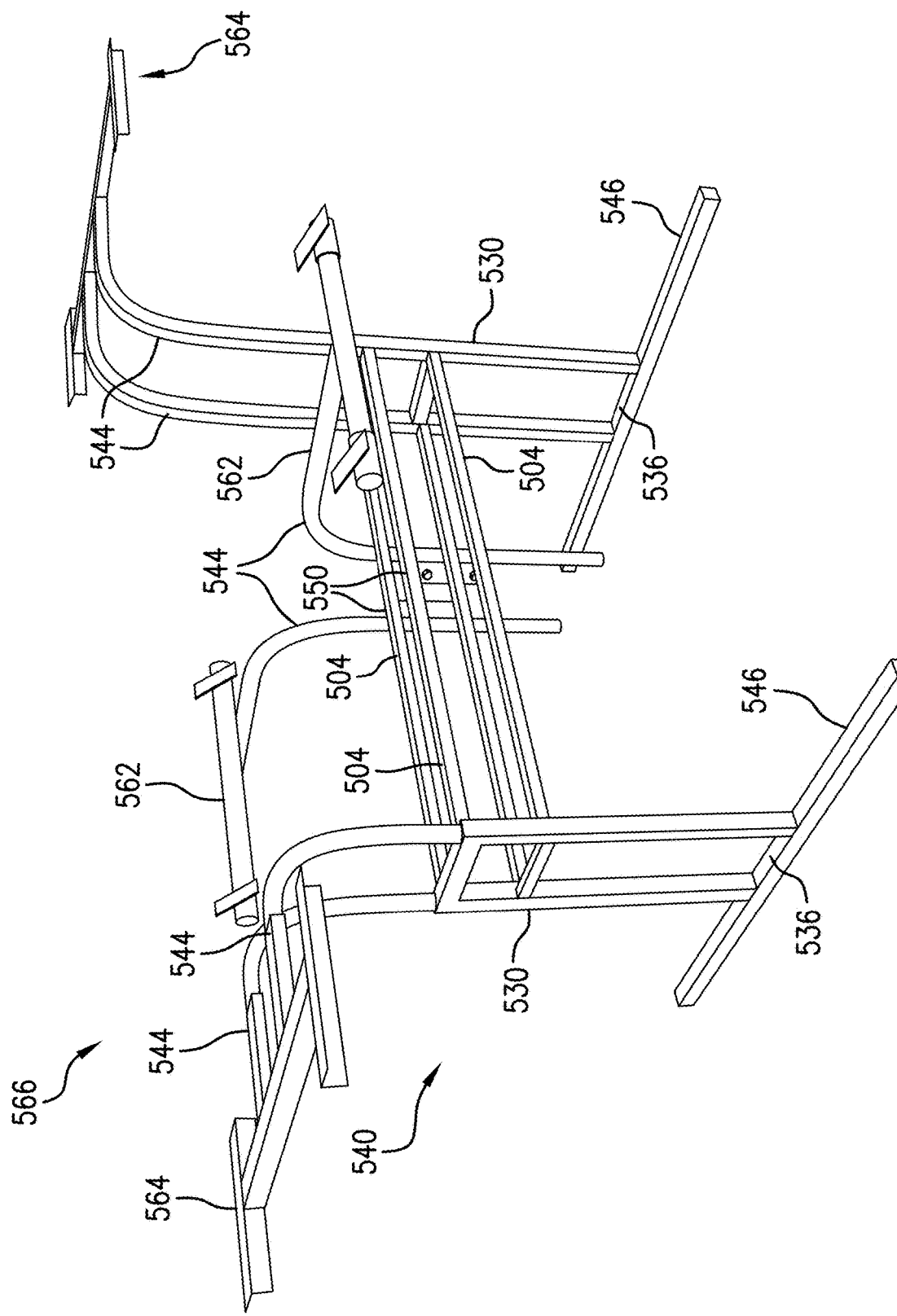
FIG. 23 shows a perspective view of a first representative workstation arrangement based on a first embodiment workstation module.

FIGS. 21-23 show several single rail holders. FIG. 21A shows a perspective view of a single rail single fastener clip 606. The single rail single fastener clip 606 is configured to clip onto a single rail 504. The single rail single fastener clip 606 has a tab with a fastener hole 514 to which may be attached a small workstation accessory. The single rail single fastener clip 606 is configured as a short three-sided rectangular tube, with a lip that on the fourth side. The single rail single fastener clip 606 is slightly larger than the rails 504 to which it is designed to clip around with a tight fit. The single rail single fastener clip 606 is made of a flexible, elastic material, typically plastic, that allows the opening on the fourth side to expand enough for the lip to pass around the rail 504, then snap back when the rail 504 is fully nested in the single rail single fastener clip 606 with the lip preventing the single rail single fastener clip 606 from slipping off the rail 504. FIG. 21B show a perspective view of a single rail double fastener clip 610. The single rail double fastener clip 610 is similar to the single rail single fastener clip 606 but does not have a lip on the fourth side, which instead is completely open. The single rail double fastener clip 610 has an additional tab with a fastener hole 514. To prevent the single rail double fastener clip 610 from slipping off the rail 504, the single rail double fastener clip 610 relies on the accessory attaching to both fastener holes 514 with fasteners.

FIG. 22A shows a perspective view of a single rail wire holding clip 608. The single rail wire holding clip 608 is similar to the single rail single fastener clip 606 except instead of the tab with the fastener hole 514, the single rail wire holding clip 608 has a trough with cable retaining material 594. The intended use for the single rail wire holding clip 608 is to clip to a rail 504 in a workstation and guide cables for power or communications. An alternative way to guide cables is shown in FIG. 22B which shows a perspective view of a Velcro strip 600 holding a service cable 592 to a rail 504.

A double drop-on rail clip bracket 724 is another type of positioning holder for use with the Three-Dimensional Positioning and Holding Modular System. FIG. 30 shows a double drop-on rail clip bracket 724 clipped on to the rails 504 of a twin rail H module 722. The double drop-on rail clip bracket 724 comprises two arm tubes 554 coupled by a single bolt plate 740 a single fastener hole 514. The double drop-on rail clip bracket 724 is configured to drop on to the twin rail beam 720 with a sliding fit. The double drop-on rail clip bracket 724 is coupled to the twin rail beam 720 with a single fastener that passes through the fastener hole 514 in the bolt plate 740 of the double drop-on rail clip bracket 724 and through the fastener hole 514 of a high rail 504 of the twin rail beam 720.

A top mount bolt-on arm bracket 758 is another type of positioning holder for use with the Three-Dimensional Positioning and Holding Modular System. FIG. 32 shows a top mount bolt-on arm bracket 758 that has an arm tube 554 coupled to two bolt plates 740. The bolt plates 740 each have a single fastener hole 514. The fastener hole 514 of one of the two bolt plates 740 is configured to line up with a fastener hole 514 in one of the upper rails 504 of a second embodiment quad-rail beam 754 and the fastener hole 514 of the other of the two bolt plates 740 is configured to line up with a fastener hole 514 in the other of the upper rails 504 of a second embodiment quad-rail beam 754. Once so aligned, fasteners may be passed through the fastener hole 514 to couple the top mount bolt-on arm bracket 758 to the rails 504.

A side mount bolt-on arm bracket 756 is another type of positioning holder for use with the Three-Dimensional Positioning and Holding Modular System. FIG. 32 shows a side mount bolt-on arm bracket 756 that is similar to the side mount clamp-on arm bracket 550 (see FIG. 16). The side mount bolt-on arm bracket 756 has an arm tube 554 and two bolt plates 738 for coupling with the rails 504 of a second embodiment quad-rail beam 754. The bolt plates 738 each have two fastener holes 514 that are configured to line up with the fastener holes 514 in the rails 504 of a second embodiment quad-rail beam 754, the fastener holes 514 in the upper bolt plate 738 lining up with the fastener holes 514 in the upper two rails 504, and the fastener holes 514 in the lower bolt plate 738 lining up with the fastener holes 514 in the lower two rails 504. Once so aligned, fasteners may be passed through the fastener hole 514 to couple the side mount bolt-on arm bracket 756 to the rails 504. Some side mount bolt-on arm bracket 756 may be configured for coupling with the rails 504 of a twin rail beam 720, with shorter bolt plates 738, each with only a single fastener hole 514.

Workstation Arrangements Based on the Workstation Modules

FIG. 23 shows a perspective view of a first representative workstation arrangement 566 based on a first embodiment workstation module (H module) 540, which in turn may be based on two open quad rail-arm-leg modules 530 with four rails 504 or two twin rail-arm-leg modules 730 with two rails 504. The workstation arrangement 566 comprises a H module 540 with two double-arm table support brackets 564 and two single-arm table support brackets 562. Tables are omitted in FIG. 23 to better show the underlying structure of the workstation arrangement 566. Each of the two double-arm table support brackets 564 is coupled to two arms 544, which insert into the columns 532 of one of the two quad rail-arm-leg modules 530 (alternatively, the two twin rail-arm-leg modules 730) of the H module 540. Each of the single-arm table support brackets 562 is coupled to an arm 544, which is inserted into a side mount clamp-on arm bracket 550 mounted to two of the rails 504.

Figure 24:
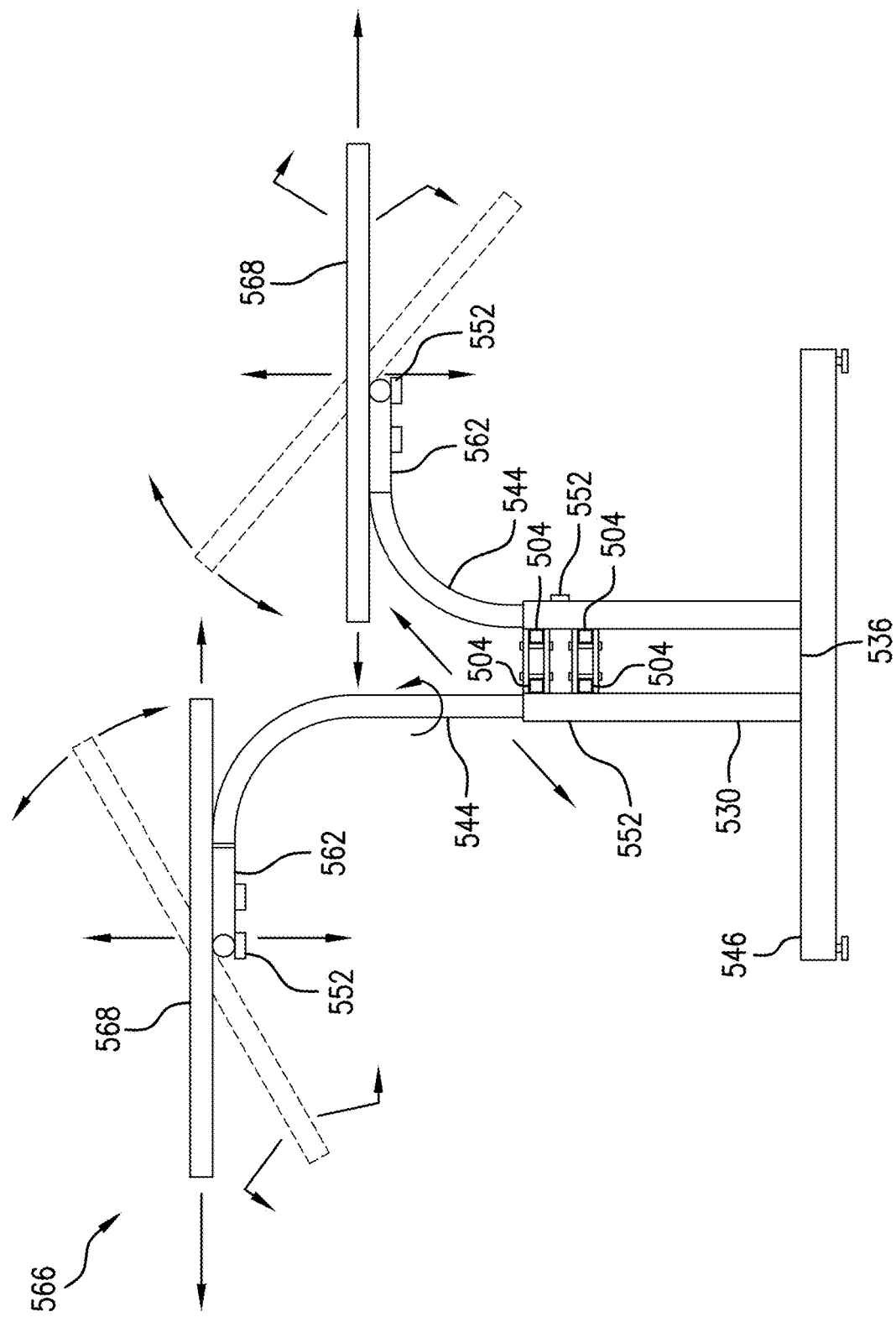
FIG. 24 shows a side view of the first representative workstation arrangement based on a first embodiment workstation module.

FIG. 24 shows a side view of the first representative workstation arrangement 566 based on a first embodiment workstation module (H module) 540. The double-arm table support bracket 564 are not shown to better illustrate the operation of the single-arm table support brackets 562. Table tops 568 are coupled to the single-arm table support brackets 562. The single-arm table support brackets 562 are configured to allow the table tops 568 to tilt to a desired work position. The tilt and height of each table top 568 can be adjusted independently and locked in a desired position with the set screws 552 on the single-arm table support bracket 562 and side mount clamp-on arm bracket 550 respectively.

Figure 25:
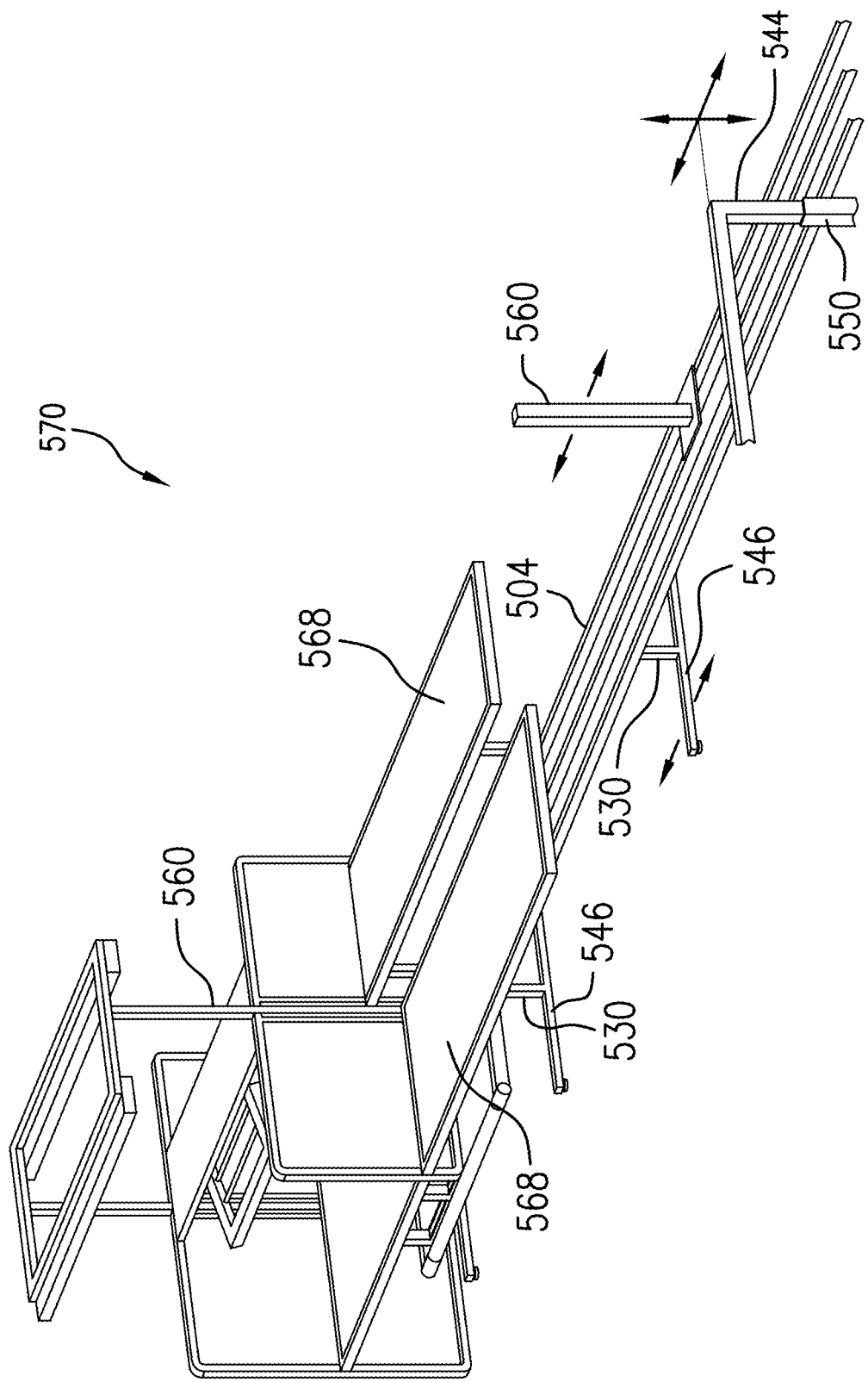
FIG. 25 shows a perspective view of a second representative workstation arrangement based on a first embodiment workstation module.

FIG. 25 shows a perspective view of a second representative workstation arrangement 570 based on a first embodiment workstation module (H module) 540 with various positioning holders. This second embodiment workstation arrangement 570 has multiple first embodiment rail-arm-leg assemblies 540 connected in series. Quad rail-arm-leg modules 530 are used to splice different sections of rails 504. A similar workstation arrangement can be made with the workstation module (H module) 540 with twin rail-arm-leg modules 730 and two rails 504.

Figure 26:
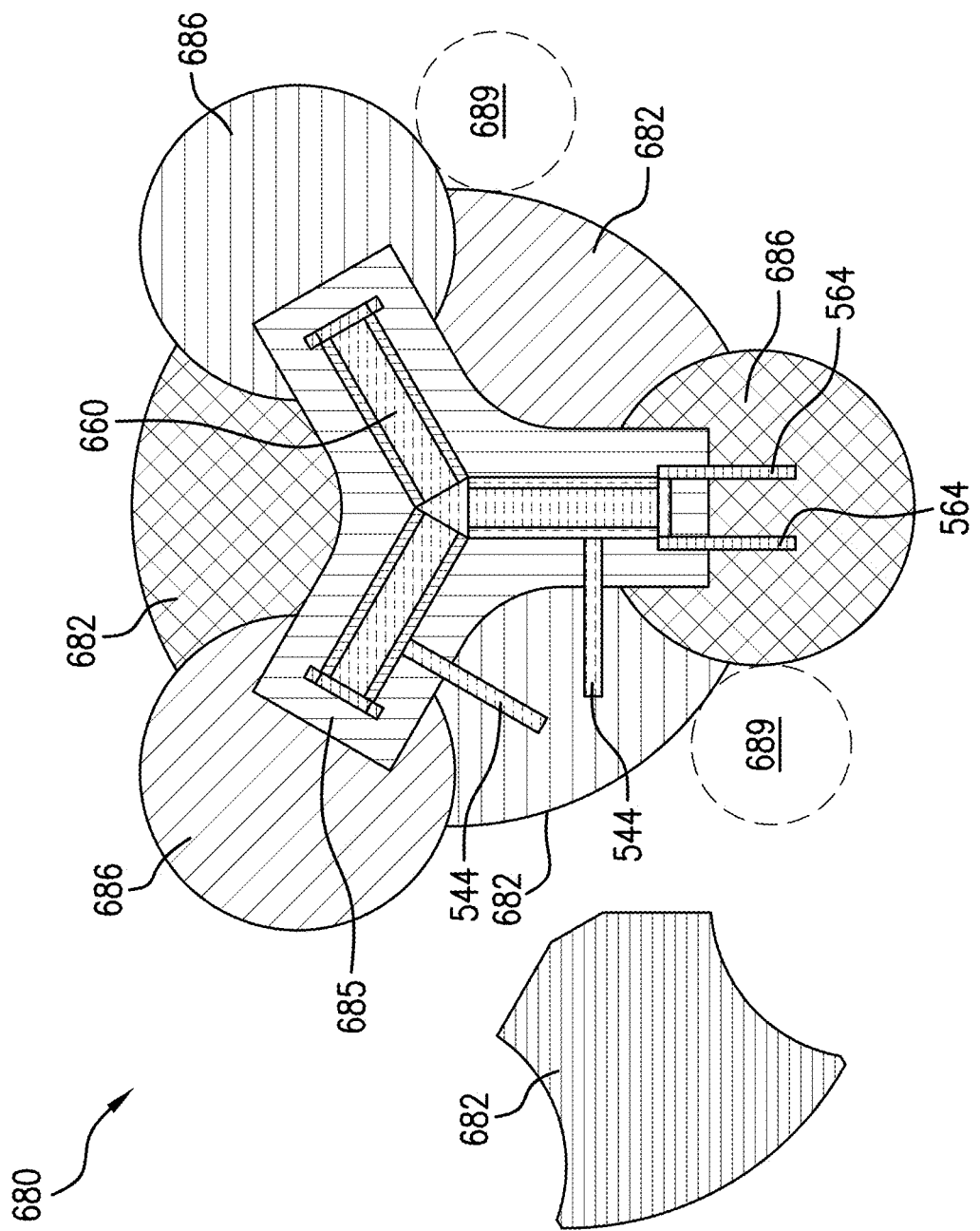
FIG. 26 shows a perspective view of a third embodiment workstation arrangement based on the sixth embodiment workstation module (Y module).

FIG. 26 shows a perspective view of a third embodiment workstation arrangement 680 based on the sixth embodiment workstation module 660 (Y module). A Y-shaped table top 685 is positioned over and coupled to the Y module 660 with a plurality of arms 544 and double-arm table support bracket 564. Three circular table top 686 are attached at the end of each point of the Y module 660 on double-arm table support brackets 564. Three Y module interstitial table tops 682 are attached on arms 544 between the Y-shaped table top 685 and the three circular table tops 686. The locations of two stools 689 are shown as they may be used with third embodiment workstation arrangement 680.

Figure 27:
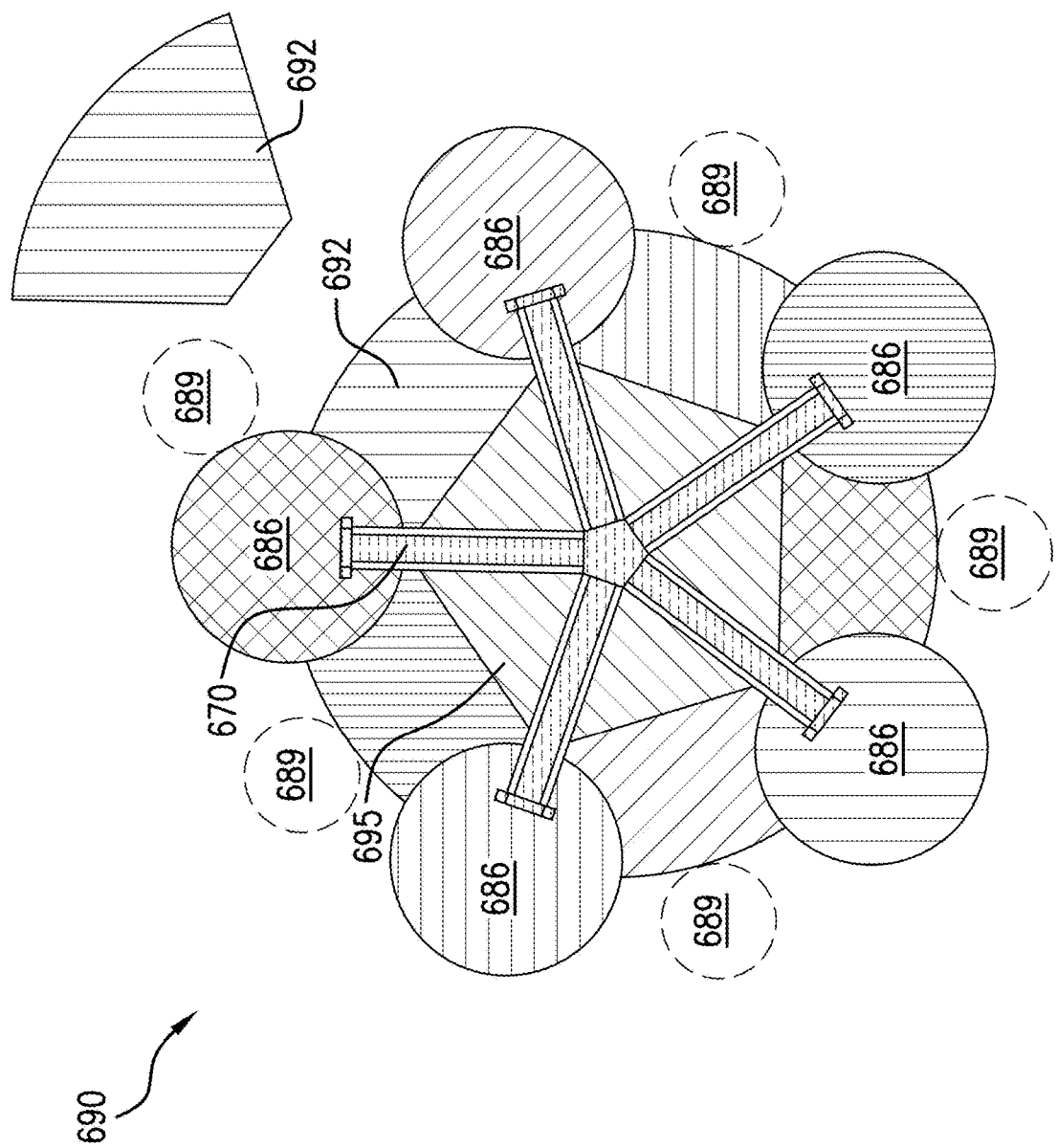
FIG. 27 shows a perspective view of a fourth embodiment workstation arrangement based on the seventh embodiment workstation module (pentagon module).

FIG. 27 shows a perspective view of a fourth embodiment workstation arrangement 690 based on the seventh embodiment workstation module 670 (pentagon module). A pentagon-shaped table top 695 is positioned over and coupled to the pentagon module 670. Five circular table top 686 are attached at the end of each point of the pentagon module 670 on double-arm table support brackets 564. Three pentagon module interstitial table top 692 are attached on arms 544 between the pentagon-shaped table top 695 and the five circular table tops 686. The locations of five stools 689 are shown as they may be used with fourth embodiment workstation arrangement 690.

Figure 28:
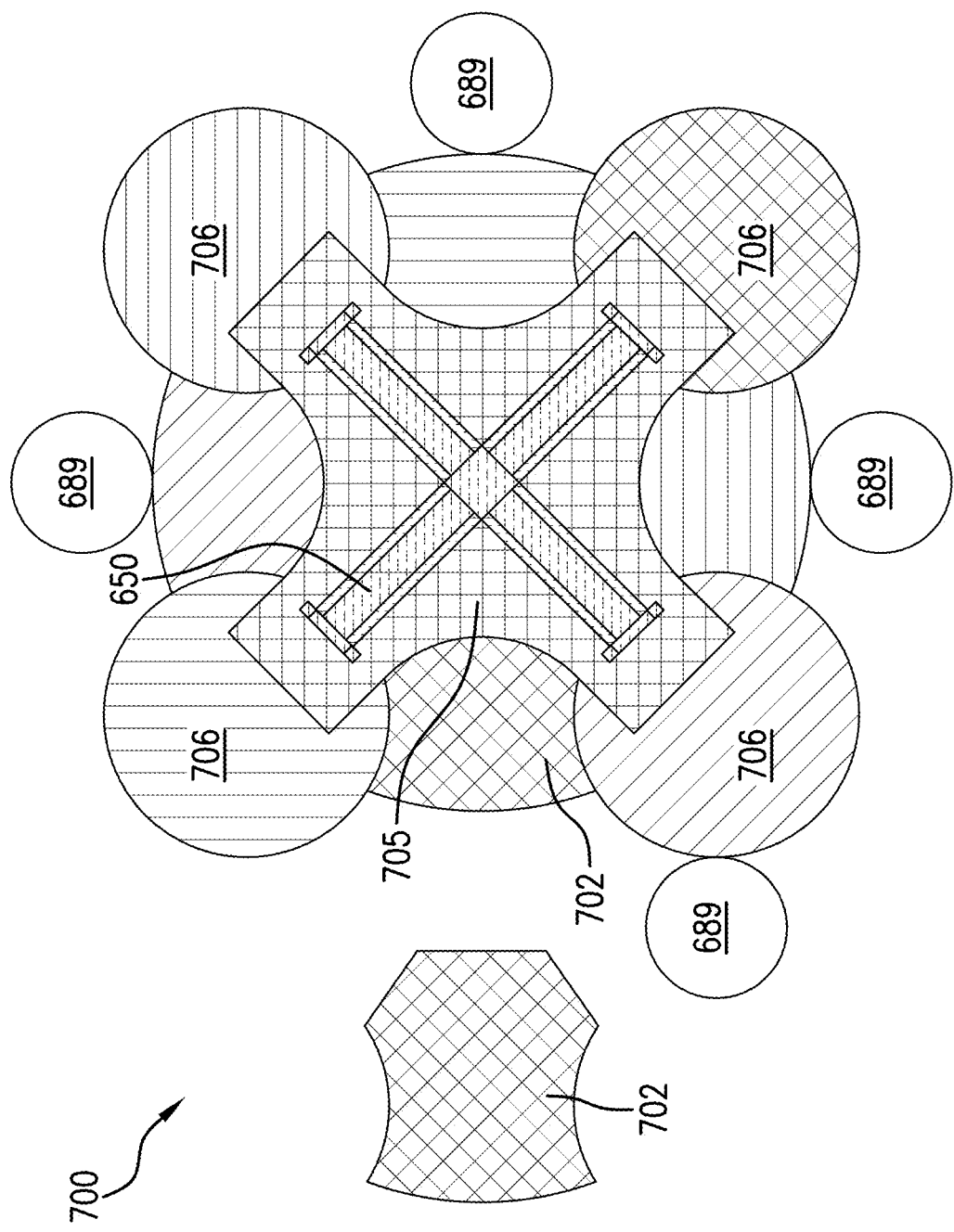
FIG. 28 shows a perspective view of a fifth embodiment workstation arrangement based on the fifth embodiment workstation module (X module).

FIG. 28 shows a perspective view of a fifth embodiment workstation arrangement 700 based on the fifth embodiment workstation module 650 (X module). A X-shaped table top 705 is positioned over and coupled to the X module 650. Four circular table top 686 are attached at the end of each point of the X module 650 on double-arm table support brackets 564. Four X module interstitial table tops 702 are attached on arms 544 between the X-shaped table top 705 and the four circular table tops 686. The locations of four stools 689 are shown as they may be used with fifth embodiment workstation arrangement 700.

Figure 48:
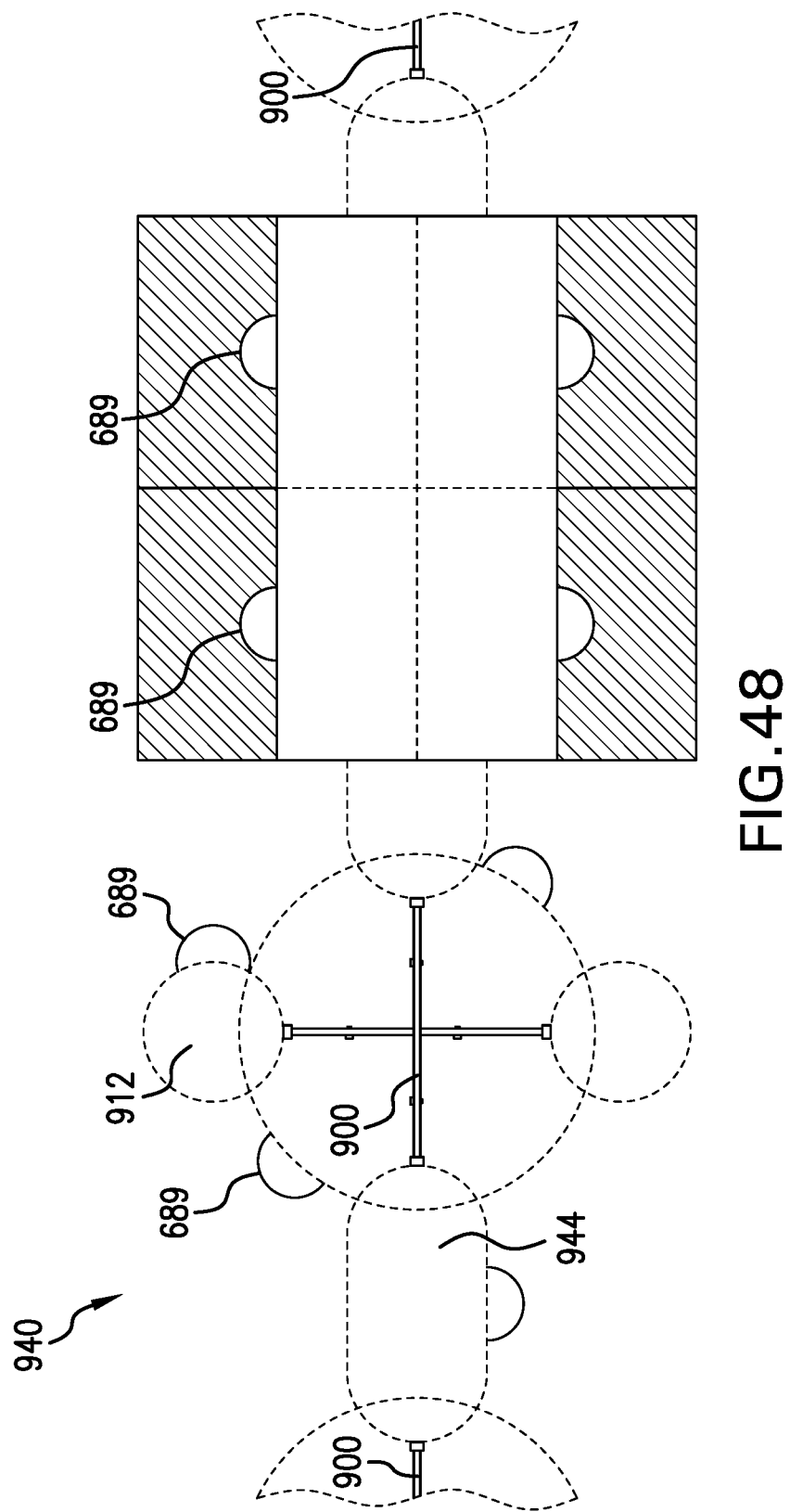
FIG. 48 shows a sixth embodiment workstation arrangement.
Figure 49:
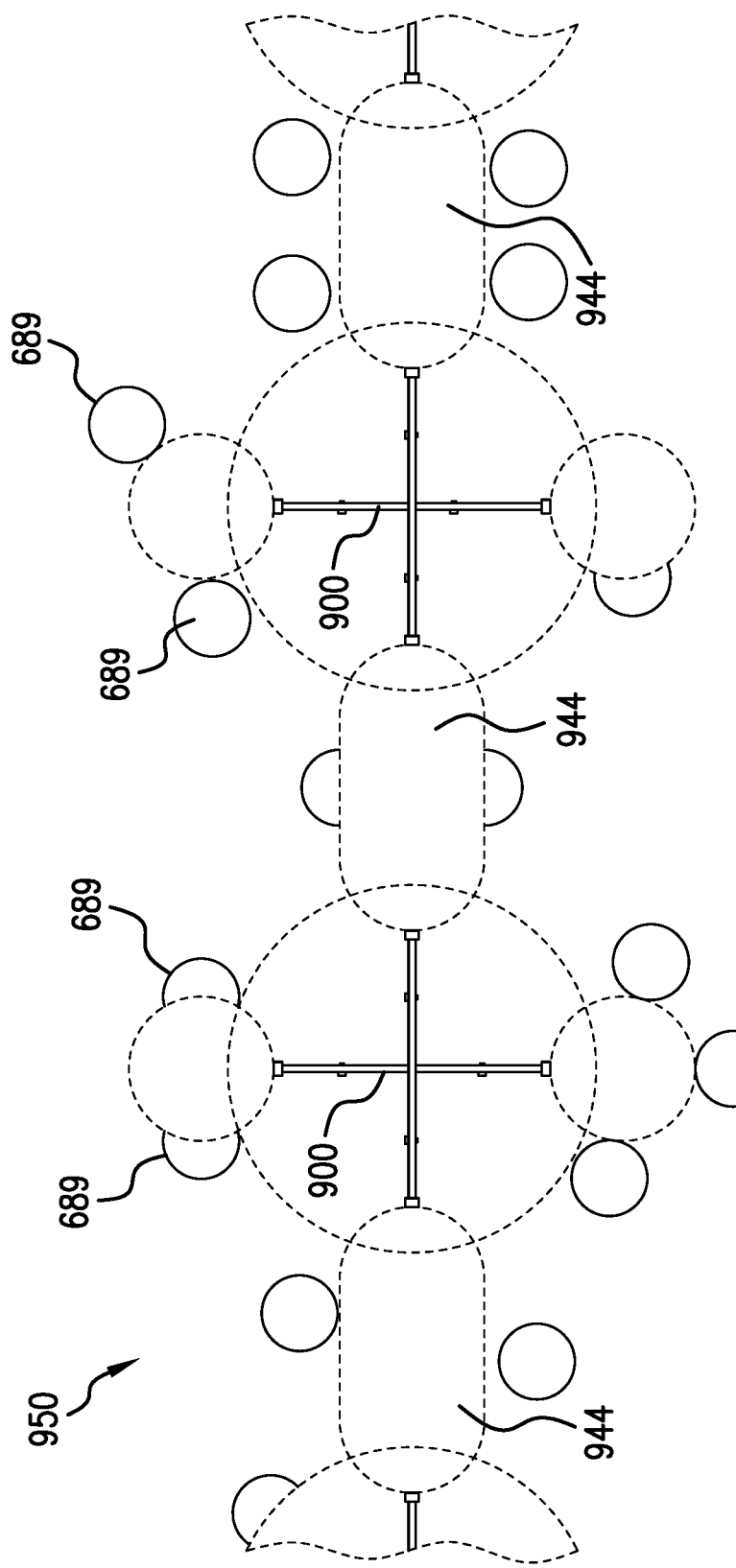
FIG. 49 shows a seventh embodiment workstation arrangement.

FIG. 48 shows a sixth embodiment workstation arrangement 940 and FIG. 49 shows a seventh embodiment workstation arrangement 950. These workstation arrangements 940, 950 are based on chains of mount track matrixes 900. Various accessories such as circular table tops 912 and cantilevered table top 944 are attached thereto and provide multiple workstations (indicated by stools 689).

What is claimed is:

1. A workstation module comprising:
four standing triple channel columns arranged in a rectangle, including a first triple channel column, a second triple channel column, a third triple channel column, and a fourth triple channel column, each triple channel column comprising a center channel, a left channel and a right channel coupled to sides of the center channel, open fronts of the center channels facing outward, a back of the center channel having a plurality of bolt holes, a horizontal leg coupled to a bottom end of the center channel, wherein the center channel is a rectangular strut channel, where the left channel and the right channel are rectangular half-height strut channels;
a first cross rail with ends coupled to the first triple channel columns and the second triple channel column;
a first center sleeve rail with ends coupled to the third triple channel column and the fourth triple channel column, the first center sleeve rail with a sleeve in a center of the first center sleeve rail through which passes the first cross rail;
a first lateral rail with ends coupled to the first triple channel columns and the third triple channel column;
a second lateral rail with ends coupled to the first triple channel columns and the fourth triple channel column;
a third lateral rail with ends coupled to the second triple channel columns and the third triple channel column;
a fourth lateral rail with ends coupled to the second triple channel columns and the fourth triple channel column; and
wherein the first cross rail and the first sleeve rail are mounted above the lateral rails.

2. A workstation module comprising:
four standing triple channel columns arranged in a rectangle, including a first triple channel column, a second triple channel column, a third triple channel column, and a fourth triple channel column, each triple channel column comprising a center channel, a left channel and a right channel coupled to sides of the center-channel, open fronts of the center channels facing outward, a back of the center channel having a plurality of bolt holes, a horizontal leg coupled to a bottom end of the center channel, wherein the center channel is a strut channel, where the left channel and the right channel are half-height strut channels,
a first cross rail with ends coupled to the first triple channel columns and the second triple channel column;
a first center sleeve rail with ends coupled to the third triple channel column and the fourth triple channel column, the first center sleeve rail with a sleeve in a center of the first center sleeve rail through which passes the first cross rails;
a first lateral rail with ends coupled to the first triple channel columns and the third triple channel column;
a second lateral rail with ends coupled to the first triple channel columns and the fourth triple channel column;
third triple channel column;
a fourth lateral rail with ends coupled to the second triple channel columns and the fourth triple channel column;
wherein the first cross rail and the first sleeve rail are mounted above the lateral rails;
a second cross rail with ends coupled to the first triple channel columns and the second triple channel column;
a second center sleeve rail with ends coupled to the third triple channel column and the fourth triple channel column, the second center sleeve rail with a sleeve in a center of the second center sleeve rail through which passes the first cross rail; and
wherein the first cross rail and the first center sleeve rail are mounted above the second cross rail and the second center sleeve rail.

3. A workstation module:
four standing triple channel columns arranged in a rectangle, including a first triple channel column, a second triple channel column, a third triple channel column, and a fourth triple channel column, each triple channel column comprising a center channel, a left channel and a right channel coupled to sides of the center channel, open fronts of the center channels facing outward, a back of the center channel having a plurality of bolt holes, a horizontal leg coupled to a bottom end of the center channel, wherein the center channel is a strut channel, where the left channel and the right channel are half-height strut channels;

a first cross rail with ends coupled to the first triple channel columns and the second triple channel column;

a first center sleeve rail with ends coupled to the third triple channel column and the fourth triple channel column, the first center sleeve rail with a sleeve in a center of the first center sleeve rail through which passes the first cross rail;

a first lateral rail with ends coupled to the first triple channel columns and the third triple channel column;

fourth triple channel column, a third lateral rail with ends coupled to the second triple channel columns and the third triple channel column;

a forth lateral rail with ends coupled to the second triple channel columns and the fourth triple channel column;

wherein the first cross rail and the first sleeve rail are mounted above the lateral rails;

a second cross rail with ends coupled to the third triple channel columns and the fourth triple channel column;

a second center sleeve rail with ends coupled to the first triple channel column and the second triple channel column, the second center sleeve rail with a sleeve in a center of the center sleeve rail through which passes the first cross rail; and wherein the first cross rail and the first sleeve rail are mounted above the second cross rail and the second sleeve rail.

\* \* \* \* \*